(12) United States Patent
Laughlin et al.

(10) Patent No.: US 10,288,357 B2
(45) Date of Patent: May 14, 2019

(54) HYBRID PUMPED THERMAL SYSTEMS

(71) Applicant: Malta Inc., Cambridge, MA (US)

(72) Inventors: Robert B. Laughlin, Mountain View, CA (US); Philippe Larochelle, Mountain View, CA (US); Nicholas Cizek, Mountain View, CA (US)

(73) Assignee: Malta Inc., Cambridge, MA (US)

( * ) Notice: Subject to any disclaimer, the term of this patent is extended or adjusted under 35 U.S.C. 154(b) by 267 days.

(21) Appl. No.: 15/440,308

(22) Filed: Feb. 23, 2017

(65) Prior Publication Data
US 2017/0159499 A1 Jun. 8, 2017

Related U.S. Application Data

(63) Continuation of application No. 14/668,610, filed on Mar. 25, 2015, now Pat. No. 10,012,448, which is a
(Continued)

(51) Int. Cl.
*F01K 3/00* (2006.01)
*F01K 3/12* (2006.01)
(Continued)

(52) U.S. Cl.
CPC ............... *F28D 20/00* (2013.01); *F01K 3/00* (2013.01); *F01K 3/12* (2013.01); *F01K 3/185* (2013.01);
(Continued)

(58) Field of Classification Search
CPC .......... F01K 3/00–3/267; F01K 17/005; Y02E 60/14–60/145; F02C 1/04–1/105; F24S 60/00–60/30
(Continued)

(56) References Cited

U.S. PATENT DOCUMENTS

| 2,065,974 | A | 12/1936 | Marguerre |
| 2,246,513 | A | 6/1941 | Hammond |

(Continued)

FOREIGN PATENT DOCUMENTS

| DE | 202013004654 | 8/2014 |
| EP | 0003980 | 9/1979 |

(Continued)

OTHER PUBLICATIONS

Non-Final Office Action dated Mar. 28, 2013, issued in connection with U.S. Appl. No. 12/932,775, filed Mar. 4, 2011, 12 pages.
(Continued)

*Primary Examiner* — Laert Dounis
(74) *Attorney, Agent, or Firm* — McDonnell Boehnen Hulbert & Berghoff LLP

(57) ABSTRACT

The present disclosure provides pumped thermal energy storage systems that can be used to store electrical energy. A pumped thermal energy storage system of the present disclosure can store energy by operating as a heat pump or refrigerator, whereby net work input can be used to transfer heat from the cold side to the hot side. A working fluid of the system is capable of efficient heat exchange with heat storage fluids on a hot side of the system and on a cold side of the system. The system can extract energy by operating as a heat engine transferring heat from the hot side to the cold side, which can result in net work output. Systems of the present disclosure can employ solar heating for improved storage efficiency.

19 Claims, 41 Drawing Sheets

Related U.S. Application Data continuation of application No. PCT/US2013/062469, filed on Sep. 27, 2013.

(60) Provisional application No. 61/868,070, filed on Aug. 20, 2013, provisional application No. 61/706,337, filed on Sep. 27, 2012.

(51) Int. Cl.

| | | |
|---|---|---|
| *F01K 3/18* | (2006.01) | |
| *F01K 3/20* | (2006.01) | |
| *F02C 1/10* | (2006.01) | |
| *F02C 6/14* | (2006.01) | |
| *F24S 60/00* | (2018.01) | |
| *F28D 15/00* | (2006.01) | |
| *F28D 20/00* | (2006.01) | |

(52) U.S. Cl.
CPC ............... *F01K 3/20* (2013.01); *F02C 1/10* (2013.01); *F02C 6/14* (2013.01); *F24S 60/00* (2018.05); *F28D 15/00* (2013.01); *Y02E 20/14* (2013.01); *Y02E 20/16* (2013.01); *Y02E 60/14* (2013.01)

(58) Field of Classification Search
USPC ........................................ 60/659, 641.1–682
See application file for complete search history.

(56) References Cited

U.S. PATENT DOCUMENTS

| | | |
|---|---|---|
| 2,791,204 A | 5/1957 | Andrus |
| 2,860,493 A | 11/1958 | Capps et al. |
| 3,152,442 A | 10/1964 | Rowekamp |
| 3,220,191 A | 11/1965 | Berchtold |
| 3,630,022 A | 12/1971 | Jubb |
| 3,897,170 A | 7/1975 | Darvishian |
| 3,955,359 A | 5/1976 | Yannone et al. |
| 4,024,908 A | 5/1977 | Meckler |
| 4,054,124 A | 10/1977 | Knoos |
| 4,089,744 A | 5/1978 | Cahn |
| 4,094,148 A | 6/1978 | Nelson |
| 4,110,987 A | 9/1978 | Cahn et al. |
| 4,117,682 A * | 10/1978 | Smith ................. F03G 6/065 60/641.8 |
| 4,148,191 A | 4/1979 | Frutschi |
| 4,158,384 A | 6/1979 | Brautigam |
| 4,215,553 A | 8/1980 | Poirier et al. |
| 4,408,654 A | 10/1983 | Doomernik |
| 4,430,241 A | 2/1984 | Fiorucci |
| 4,444,024 A | 4/1984 | McFee |
| 4,438,630 A | 10/1984 | Yamaoka et al. |
| 4,479,352 A | 10/1984 | Yamaoka et al. |
| 4,523,629 A | 6/1985 | Copeland |
| 4,583,372 A | 4/1986 | Egan et al. |
| 4,628,692 A | 12/1986 | Pierce |
| 4,643,212 A | 2/1987 | Rothrock |
| 4,727,930 A | 3/1988 | Bruckner et al. |
| 5,269,145 A | 12/1993 | Krause et al. |
| 5,537,822 A | 7/1996 | Shnaid et al. |
| 5,644,928 A | 7/1997 | Uda et al. |
| 5,653,656 A | 8/1997 | Thomas et al. |
| 5,653,670 A | 8/1997 | Endelman |
| 6,119,682 A | 9/2000 | Hazan |
| 6,532,745 B1 * | 3/2003 | Neary ................. F02C 1/005 60/39.52 |
| 6,629,413 B1 | 10/2003 | Wendt et al. |
| 6,644,062 B1 | 11/2003 | Hays |
| 6,701,711 B1 | 3/2004 | Litwin |
| 7,028,481 B1 | 4/2006 | Morrow |
| 7,086,231 B2 | 8/2006 | Pinkerton |
| 7,299,633 B2 | 11/2007 | Murphy et al. |
| 7,458,418 B2 | 12/2008 | Siennel |
| 7,603,858 B2 | 10/2009 | Bennett |
| 7,937,930 B1 | 5/2011 | Dunn |
| 7,954,320 B2 | 6/2011 | Ellensohn et al. |
| 8,113,011 B2 | 2/2012 | Howes et al. |
| 8,136,358 B1 * | 3/2012 | Brostmeyer ............ F01K 13/00 60/659 |
| 8,206,075 B2 | 6/2012 | White et al. |
| 8,403,613 B2 | 3/2013 | van der Meulen |
| 8,424,284 B2 | 4/2013 | Staffend et al. |
| 8,453,677 B2 | 6/2013 | Howes et al. |
| 8,496,026 B2 | 7/2013 | Howes et al. |
| 8,500,388 B2 | 8/2013 | van der Meulen et al. |
| 8,613,195 B2 | 12/2013 | Held et al. |
| 8,656,712 B2 | 2/2014 | Howes et al. |
| 8,671,686 B2 | 3/2014 | Pinkerton et al. |
| 8,826,664 B2 | 9/2014 | Howes et al. |
| 8,833,079 B2 | 9/2014 | Smith |
| 8,833,101 B2 | 9/2014 | Howes et al. |
| 8,863,641 B2 | 10/2014 | Howes |
| 8,904,793 B2 | 12/2014 | Hemrle et al. |
| 9,316,121 B2 | 4/2016 | Davidson et al. |
| 9,518,786 B2 | 12/2016 | Howes et al. |
| 9,932,830 B2 | 4/2018 | Laughlin |
| 2001/0054449 A1 | 12/2001 | Jones et al. |
| 2003/0131623 A1 | 7/2003 | Suppes |
| 2004/0008010 A1 | 1/2004 | Ebrahim et al. |
| 2004/0083731 A1 | 5/2004 | Lasker |
| 2004/0088980 A1 | 5/2004 | Emmel et al. |
| 2005/0126171 A1 | 6/2005 | Lasker |
| 2006/0035591 A1 | 2/2006 | Young et al. |
| 2006/0053792 A1 | 3/2006 | Bourgeois |
| 2006/0137869 A1 | 6/2006 | Steinhauser |
| 2006/0185626 A1 | 8/2006 | Allen et al. |
| 2006/0248886 A1 | 11/2006 | Ma |
| 2007/0295673 A1 | 12/2007 | Enis et al. |
| 2008/0121387 A1 | 5/2008 | Taniguchi et al. |
| 2009/0126377 A1 | 5/2009 | Shibata et al. |
| 2009/0179429 A1 | 7/2009 | Ellis et al. |
| 2010/0024421 A1 | 2/2010 | Litwin et al. |
| 2010/0175365 A1 * | 7/2010 | Ota ..................... F01K 23/10 60/39.181 |
| 2010/0218500 A1 * | 9/2010 | Ruer ..................... F01K 3/12 60/659 |
| 2010/0251711 A1 | 10/2010 | Howes et al. |
| 2010/0251712 A1 | 10/2010 | Nakhamkin |
| 2010/0257862 A1 | 10/2010 | Howes et al. |
| 2010/0275616 A1 | 11/2010 | Saji et al. |
| 2010/0301062 A1 | 12/2010 | Litwin et al. |
| 2010/0301614 A1 * | 12/2010 | Ruer ..................... F01K 3/12 290/1 A |
| 2011/0100010 A1 | 5/2011 | Freund et al. |
| 2011/0100011 A1 | 5/2011 | Staffend |
| 2011/0100356 A1 | 5/2011 | Bliesner |
| 2011/0100611 A1 | 5/2011 | Ohler et al. |
| 2011/0126539 A1 | 6/2011 | Ramaswamy et al. |
| 2011/0139407 A1 | 6/2011 | Ohler et al. |
| 2011/0196542 A1 | 8/2011 | Pinkerton et al. |
| 2011/0227066 A1 | 9/2011 | Umezaki |
| 2011/0259007 A1 * | 10/2011 | Aoyama ................. F02C 1/05 60/641.14 |
| 2011/0262269 A1 | 10/2011 | Lior |
| 2011/0277471 A1 | 11/2011 | Shinnar |
| 2011/0283700 A1 | 11/2011 | Zohar et al. |
| 2011/0289941 A1 | 12/2011 | Gonzalez et al. |
| 2011/0314839 A1 | 12/2011 | Brook et al. |
| 2012/0039701 A1 | 2/2012 | Diddi et al. |
| 2012/0047892 A1 | 3/2012 | Held et al. |
| 2012/0055661 A1 | 3/2012 | Feher |
| 2012/0060501 A1 | 3/2012 | Hemrle et al. |
| 2012/0080161 A1 * | 4/2012 | Kelly ..................... F28D 20/00 165/10 |
| 2012/0080168 A1 * | 4/2012 | Hemrle ..................... F01K 3/12 165/104.19 |
| 2012/0222423 A1 | 9/2012 | Mercangoez et al. |
| 2012/0267955 A1 | 10/2012 | Zhan et al. |
| 2012/0312496 A1 | 12/2012 | Howes et al. |
| 2012/0319410 A1 | 12/2012 | Ambrosek et al. |
| 2013/0197704 A1 | 4/2013 | Pan et al. |
| 2013/0105127 A1 | 5/2013 | Postma et al. |
| 2013/0118344 A1 | 5/2013 | Howes et al. |

(56) References Cited

U.S. PATENT DOCUMENTS

| | | | |
|---|---|---|---|
| 2013/0125546 | A1 | 5/2013 | Barmeier et al. |
| 2013/0147197 | A1* | 6/2013 | Goebel ............... F01K 3/12 290/52 |
| 2013/0276917 | A1 | 10/2013 | Howes et al. |
| 2014/0008033 | A1 | 1/2014 | Howes et al. |
| 2014/0014290 | A1 | 1/2014 | Howes et al. |
| 2014/0014302 | A1 | 1/2014 | Gutai |
| 2014/0060051 | A1 | 3/2014 | Ohler et al. |
| 2014/0075970 | A1 | 3/2014 | Benson |
| 2014/0224447 | A1* | 8/2014 | Reznik ............ F28D 20/0056 165/10 |
| 2015/0034188 | A1 | 2/2015 | Howes |
| 2015/0069758 | A1 | 3/2015 | Davidson et al. |
| 2015/0084567 | A1 | 3/2015 | Howes |
| 2015/0113940 | A1 | 4/2015 | Sinatov et al. |
| 2015/0114217 | A1 | 4/2015 | Howes |
| 2015/0114591 | A1 | 4/2015 | Howes et al. |
| 2015/0211386 | A1 | 7/2015 | Howes et al. |
| 2015/0260463 | A1 | 9/2015 | Laughlin et al. |
| 2015/0267612 | A1 | 9/2015 | Bannari |
| 2015/0361832 | A1 | 12/2015 | Franke et al. |
| 2016/0018134 | A1 | 1/2016 | Ueda et al. |
| 2016/0030856 | A1 | 2/2016 | Kaplan et al. |
| 2016/0032783 | A1 | 2/2016 | Howes et al. |
| 2016/0248299 | A1 | 8/2016 | Ouvry |
| 2016/0290281 | A1 | 10/2016 | Schmatz |
| 2016/0298455 | A1 | 10/2016 | Laughlin |
| 2016/0298495 | A1 | 10/2016 | Laughlin |

FOREIGN PATENT DOCUMENTS

| | | |
|---|---|---|
| EP | 1577548 | 9/2005 |
| EP | 1857614 | 11/2007 |
| EP | 2241737 | 10/2010 |
| EP | 2275649 | 1/2011 |
| EP | 2312129 | 4/2011 |
| EP | 2390473 | 11/2011 |
| EP | 2400120 | 12/2011 |
| EP | 2441925 | 4/2012 |
| EP | 2441926 | 4/2012 |
| EP | 2532843 | 12/2012 |
| JP | 08-93633 | 4/1996 |
| JP | 2011106755 | 6/2011 |
| KR | 1020040045337 | 6/2004 |
| KR | 1020120042921 | 5/2012 |
| KR | 101370843 | 3/2014 |
| KR | 1020150089110 | 8/2015 |
| WO | 2005/019756 | 3/2005 |
| WO | 2011/161094 | 12/2011 |
| WO | 2013/094905 | 6/2013 |
| WO | 2013/164563 | 11/2013 |
| WO | 2014/052927 | 4/2014 |
| WO | 2015/185891 | 10/2015 |
| WO | 2016/000016 | 1/2016 |

OTHER PUBLICATIONS

Non-Final Office Action dated Jan. 9, 2014, issued in connection with U.S. Appl. No. 12/932,775, filed Mar. 4, 2011, 12 pages.
Non-Final Office Action dated Feb. 26, 2015, issued in connection with U.S. Appl. No. 12/932,775, filed Mar. 4, 2011, 14 pages.
Non-Final Office Action dated Nov. 3, 2016, issued in connection with U.S. Appl. No. 12/932,775, filed Mar. 4, 2011, 17 pages.
Non-Final Office Action dated Nov. 6, 2015, issued in connection with U.S. Appl. No. 12/932,775, filed Mar. 4, 2011, 16 pages.
Final Office Action dated Jul. 25, 2017, issued in connection with U.S. Appl. No. 12/932,775, filed Mar. 4, 2011, 19 pages.
Non-Final Office Action dated Dec. 4, 2015, issued in connection with U.S. Appl. No. 13/965,048, filed Aug. 12, 2014, 11 pages.
Non-Final Office Action dated Feb. 8, 2018, issued in connection with U.S. Appl. No. 15/396,461, filed Dec. 31, 2016, 9 pages.
Non-Final Office Action dated May 14, 2018, issued in connection with U.S. Appl. No. 15/392,657, filed Dec. 28, 2016, 27 pages.
Non-Final Office Action dated May 14, 2018, issued in connection with U.S. Appl. No. 15/392,653, filed Dec. 28, 2016, 26 pages.
Non-Final Office Action dated May 25, 2018, issued in connection with U.S. Appl. No. 15/393,874, filed Dec. 29, 2016, 28 pages.
International Searching Authority, International Search Report and Written Opinion, dated Jan. 2, 2014, issued in connection with International Patent Application No. PCT/US2013/062469, filed on Sep. 27, 2013, 11 pages.
International Searching Authority, International Preliminary Report on Patentability, dated Mar. 31, 2015, issued in connection with International Patent Application No. PCT/US2013/062469, filed Sep. 27, 2013, 9 pages.
Laughlin, Robert B., U.S. Appl. No. 12/932,775, filed Mar. 4, 2011, 27 pages.
Laughlin, Robert B., U.S. Appl. No. 13/965,048, filed Aug. 12, 2013, 27 pages.
Laughlin et al., U.S. Appl. No. 14/668,610, filed Mar. 25, 2015, 119 pages.
Apte et al., U.S. Appl. No. 15/392,523, filed Dec. 28, 2016, 36 pages.
Apte et al., U.S. Appl. No. 15/392,542, filed Dec. 28, 2016, 56 pages.
Larochelle et al., U.S. Appl. No. 15/392,571, filed Dec. 28, 2016, 113 pages.
Apte et al., U.S. Appl. No. 15/392,653, filed Dec. 28, 2016, 110 pages.
Larochelle et al., U.S. Appl. No. 15/392,657, filed Dec. 28, 2016, 101 pages.
Apte et al., U.S. Appl. No. 15/392,927, filed Dec. 28, 2016, 131 pages.
Apte et al., U.S. Appl. No. 15/393,874, filed Dec. 29, 2016, 54 pages.
Apte et al., U.S. Appl. No. 15/393,891, filed Dec. 29, 2016, 42 pages.
Apte et al., U.S. Appl. No. 15/394,572, filed Dec. 29, 2016, 114 pages.
Apte et al., U.S. Appl. No. 15/395,040, filed Dec. 30, 2016, 53 pages.
Apte et al., U.S. Appl. No. 15/395,622, filed Dec. 30, 2016, 101 pages.
Laughlin, Robert B., U.S. Appl. No. 61/339,577, filed Mar. 4, 2010, 18 pages.
Laughlin et al., U.S. Appl. No. 61/706,337, filed Sep. 27, 2012, 28 pages.
Laughlin et al., U.S. Appl. No. 61/868,070, filed Aug. 20, 2013, 31 pages.
International Searching Authority, International Search Report and Written Opinion, dated Feb. 22, 2018, issued in connection with International Patent Application No. PCT/US2017/062117, filed Nov. 17, 2017, 17 pages.
International Searching Authority, International Search Report and Written Opinion, dated Apr. 16, 2018, issued in connection with International Patent Application No. PCT/US2017/063289, filed Nov. 27, 2017, 17 pages.
International Searching Authority, International Search Report and Written Opinion, dated Mar. 12, 2018, issued in connection with International Patent Application No. PCT/US2017/063521, filed Nov. 28, 2017, 18 pages.
International Searching Authority, International Search Report and Written Opinion, dated Apr. 12, 2018, issued in connection with International Patent Application No. PCT/US2017/063519, field Nov. 28, 2017, 16 pages.
International Searching Authority, International Search Report and Written Opinion, dated Feb. 26, 2018, issued in connection with International Patent Application No. PCT/US2017/064074, filed Nov. 30, 2017, 13 pages.
International Searching Authority, International Search Report and Written Opinion, dated Mar. 20, 2018, issued in connection with International Patent Application No. PCT/US2017/064839, filed Dec. 6, 2017, 13 pages.

(56) References Cited

OTHER PUBLICATIONS

International Searching Authority, International Search Report and Written Opinion, dated Mar. 26, 2018, issued in connection with International Patent Application No. PCT/US2017/065200, filed on Dec. 7, 2017, 15 pages.

International Searching Authority, International Search Report and Written Opinion, dated Mar. 27, 2018, issued in connection with International Patent Application No. PCT/US2017/065201, filed Dec. 7, 2017, 13 pages.

International Searching Authority, International Search Report and Written Opinion, dated Mar. 29, 2018, issued in connection with International Patent Application No. PCT/US2017/065643, filed on Dec. 11, 2017, 17 pages.

International Searching Authority, International Search Report and Written Opinion, dated Mar. 26, 2018, issued in connection with International Patent Application No. PCT/US2017/065645, filed Dec. 11, 2017, 16 pages.

International Searching Authority, International Search Report and Written Opinion, dated Mar. 29, 2018, issued in connection with International Patent Application No. PCT/US2017/067049, filed Dec. 18, 2017, 16 pages.

Bauer et al., "Sodium nitrate for high temperature latent heat storage," 11th International Conference, Thermal Energy Storage Effstock, Jun. 14, 2009, 8 pages.

Boyce, Meherwan P., "Axial-Flow compressors," 2003 (date estimated), Internet, 33 pages.

Bradshaw et al., "Molten Nitrate Salt Development for Thermal Energy Storage inParabolic Trough Solar Power Systems," ES2008-54174, ASME 2008 2nd International Conference on Energy Sustainability, 2008, p. 631, vol. 2.

Desrues et al., "A Thermal Energy Storage Process for Large Scale Electric Applications," Applied Thermal Engineering, Oct. 14, 2009, 2010, pp. 425-432, vol. 30.

Dewing, Ernest W., "Heat Capacities of Liquid Sodium and Potassium Nitrates," Journal of Chemical and Engineering Data, 1975, pp. 221-223, vol. 20, No. 3.

Diguilio et al., "The Thermal Conductivity of the Molten NaNO3-KNO3 Eutectic Between 525 and 590 K," International Journal of Thermophysics, 1992, pp. 575-592, vol. 13, No. 4.

Freeman, Eli S., "The Kinetics of the Thermal Decomposition of Sodium Nitrate and of the Reaction Between Sodium Nitrate and Oxygen," J. Ohys. Chern., Nov. 1956, pp. 1487-1493, vol. 60, No. 11.

Frutschi, Hans Ulrich, "Closed-Cycle Gas Turbies—Operating Experience and Future Potential," New York, NY, ASME, 2005, <http://ebooks.smedigitalcollection.asme.org/books.aspx>, Jan. 29, 2016, 144 pages.

Isentropic, "A new era in electrical energy storage and recovery," 2014, <http://www.isentropic.co.uk/our-phes-technology>, 2 pages.

Laughlin, Robert, "Here Comes the Sun," Stanford Physics Department Colloquium, Jan. 5, 2010, 23 pages.

MacNaghten, James, "Commercial potential of different large scale thermal storage technologies under development globally," Isentropic LTD, Jun. 9, 2016, 21 pages.

Nunes et al., "Viscosity of Molten Sodium Nitrate," International Journal of Thermophysics, Nov. 2006, pp. 1638-1649, vol. 27, No. 6.

Parsons, "Cost Estimates for Thermal Peaking Power Plant," Parsons Brinckerhoff New Zealand Ltd., Jun. 2008, 26 pages, Version 2.

Peng et al., "High-temperature thermal stability of molten salt materials," Int. J. Energy Res., 2008, pp. 1164-1174, vol. 32.

Pickett et al., "Heated Turbulent Flow of Helium-Argon Mixtures in Tubes," International Journal of Heat and Mass Transfer, 1979, pp. 705-719, vol. 22.

Raade et al., "Development of Molten Salt Heat Transfer Fluid With Low Melting Point and High Thermal Stability," Journal of Solar Energy Engineering, 2011, pp. 031013-1-031013-6, vol. 133.

Ruer et al., "Pumped Heat Energy Storage," Saipem SA, Apr. 2010, pp. 1-14.

Silverman, et al., "Survey of Technology for Storage of Thermal Energy in Heat Transfer Salt," Oak Ridge National Laboratory, ORNL/TM-5682, Jan. 1977, 32 pages.

Turchi, Craig, "NREL Advanced Concepts," Solar Energy Technologies Program Peer Review, May 27, 2010, 13 pages.

Vanco, Michael R., "Analytical Comparison of Relative Heat-Transfer Coefficients and Pressure Drops of Inert Gases and Their Binary Mixtures," U.S. National Aeronautics and Space Administration, NASA TN D-2677, Feb. 1965, 18 pages.

Way, Julie, "Storing the Sun: Molten Salt Provides Highly Efficient Thermal Storage," <http://www.renewableenergyworld.com/articles/2008/06/storing-the-sun-molten-salt-provides-highly-efficient-thermal-storage-52873.html>, Jun. 26, 2008, 2 pages.

Wesoff, Eric, "Breakthrough in Energy Storage: Isentropic Energy," <https://www.greentechmedia.com/articles/read/breakthrough-in-utility-scale-energy-storage-isentropic>, Feb. 23, 2010, 3 pages.

Yergovich et al., "Density and Viscosity of Aqueous Solutions of Methanol and Acetone from the Freezing Point to 10° C.," Journal of Chemical and Engineering Data, 1971, pp. 222-226, vol. 16, No. 2.

Zabransky et al., "Heat Capacities of Organic Compounds in the liquid State I. C1 to C18 1-Alkanols," Journal of Physical and Chemical Reference Data, 1990, pp. 719-762, vol. 19, No. 3.

Final Office Action dated Jun. 6, 2018, issued in connection with U.S. Appl. No. 15/396,461, filed Dec. 31, 2016, 10 pages.

International Searching Authority, International Search Report and Written Opinion dated Jul. 30, 2018, issued in connection with International Patent Application No. PCT/US2017/064076, filed on Nov. 30, 2017, 15 pages.

Non-Final Office Action dated Jun. 28, 2018, issued in connection with U.S. Appl. No. 15/392,927, filed Dec. 28, 2016, 11 pages.

* cited by examiner

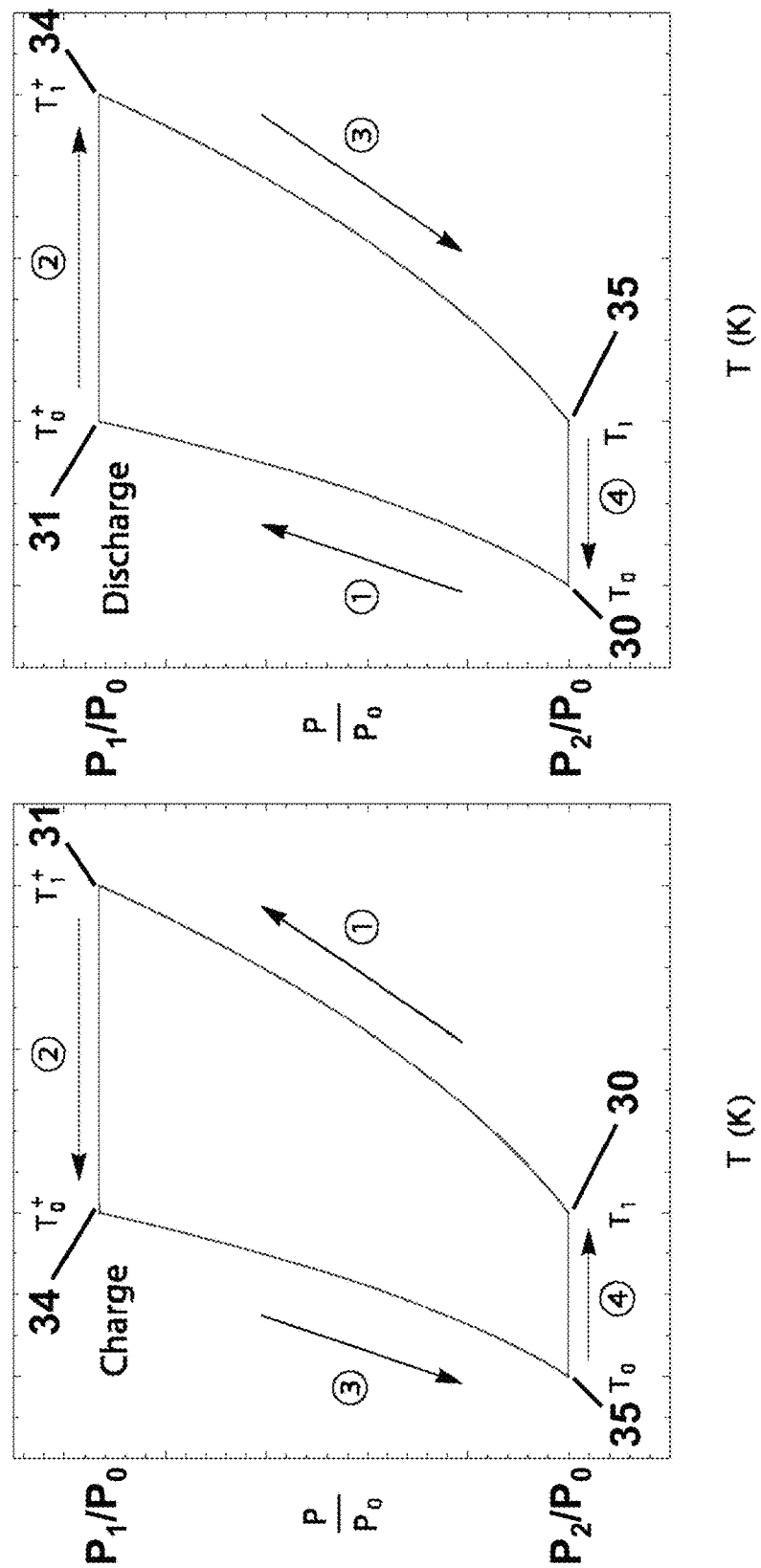

HYBRID PUMPED THERMAL SYSTEMS

CROSS-REFERENCE

This application is a continuation U.S. patent application Ser. No. 14/668,610, filed Mar. 25, 2015 ("SYSTEMS AND METHODS FOR ENERGY STORAGE AND RETRIEVAL"), which claims priority to Patent Cooperation Treaty Application Serial No. PCT/US2013/062469 filed Sep. 27, 2013 ("SYSTEMS AND METHODS FOR ENERGY STORAGE AND RETRIEVAL"), which claims priority to U.S. Provisional Patent Application Ser. No. 61/706,337, filed Sep. 27, 2012 ("SYSTEMS AND METHODS FOR ADIABATIC SALT ENERGY STORAGE"), and U.S. Provisional Patent Application Ser. No. 61/868,070, filed Aug. 20, 2013 ("SYSTEMS AND METHODS FOR ENERGY STORAGE AND RETRIEVAL"), each of which is entirely incorporated herein by reference.

BACKGROUND

An energy storage system is capable of storing one or more forms of energy for later extraction and use. In some instances, energy storage systems can employ one or more energy conversion processes in order to store and extract energy. Energy storage systems can be charged (storage) and discharged (extraction). Some energy storage systems are used to store electrical energy.

Energy storage systems may be employed for use in delivering electrical energy to or removing electrical energy from an electrical energy distribution system, such as a power grid. A power grid may be used to deliver electrical energy to end users.

SUMMARY

This disclosure provides pumped thermal energy storage systems (also "energy storage systems," "pumped thermal systems", "pumped thermal electric systems" or "systems" herein). Energy inputs to the systems provided herein can include electrical energy (electricity), in some cases converted from non-electrical types of energy (such as electromagnetic energy (radiation) or mechanical energy), thermal energy (heat), chemical energy, mechanical energy, in some cases converted from electrical energy, or a combination thereof. Energy outputs from the systems provided herein can include electrical energy (electricity) converted from mechanical energy, thermal energy (heat), mechanical energy, or a combination thereof. For instance, electrical energy can be stored by the systems of the disclosure. In some cases, the electrical energy can be input in combination with thermal energy provided through solar heating or combustion of a combustible substance such as, for example, a fossil fuel or biomass. In some situations, the systems herein can be augmented by or be directly utilized as energy conversion systems through the use of thermal energy from combusting a fossil fuel or biomass.

Large scale energy storage systems can be utilized in power generation and distribution systems. Existing alternatives include pumped hydroelectric storage for storing electrical energy, and solar thermal systems for storing thermal energy (as sensible energy).

Recognized herein is the need to provide large scale energy storage systems with high efficiency and reliability, and at low capital costs. The energy storage systems of the disclosure are not geographically or resource-limited and are capable of storing electrical energy as well as, in some cases, electromagnetic energy or thermal energy (as sensible energy). Furthermore, the systems of the disclosure can be augmented by additional energy conversion processes, or be directly utilized as energy conversion systems (without energy storage). In some instances, the systems of the disclosure may accept or provide one or more waste energy streams, such as waste heat or waste cold streams.

Energy storage systems of the disclosure can include a working fluid flowing in a closed cycle. In some cases, the closed cycle can include a compressor and a turbine. The working fluid can be capable of efficient heat exchange with heat storage fluids on a hot side of the system and on a cold side of the system. The system can operate as a heat engine by transferring heat from the hot side to the cold side, resulting in net mechanical work output. The system can also operate as a heat pump or refrigerator, whereby net mechanical work input is used to transfer heat from the cold side to the hot side. The mechanical work inputs and/or outputs may be converted from/to electrical work using a motor/generator. The compressor, the turbine and the motor/generator can be located on a common shaft. Heat exchange (sensible energy transfer) between the working fluid of the system and the heat storage fluids can occur in counter-flow heat exchangers. The hot side and cold side heat storage fluids can each have a corresponding pair of storage tanks, where heat transfer to/from a heat storage fluid entails flow of the heat storage fluid between its two corresponding storage tanks. While traveling from a first storage tank to a second tank, the heat storage fluid can enter a heat exchanger where it either receives or donates heat to the working fluid of a thermodynamic cycle. Each heat storage fluid with corresponding heat exchanger and pair of storage tanks can constitute a heat storage unit.

An aspect of the present disclosure provides an energy storage and retrieval system comprising a compressor, a first heat storage unit, a turbine, a second heat storage unit, a working fluid that flows along a fluid flow path in a closed cycle including, in sequence, the compressor, the first heat storage unit, the turbine, and the second heat storage unit, and an auxiliary tank comprising the working fluid. The auxiliary tank is in fluid communication with the fluid flow path of the closed cycle. The system alternately operates as both (i) a heat engine to provide mechanical work from heat and (ii) as a heat pump to use mechanical work to store heat.

Another aspect of the present disclosure provides a method for storing and releasing energy comprising (a) providing a system comprising a closed cycle comprising, in sequence, a compressor, a first heat storage unit, a turbine, and a second heat storage unit. The system further comprises an auxiliary tank for a working fluid. The first and second heat storage units exchange heat with the working fluid flowing through the closed cycle. The method further comprises (b) alternately and sequentially operating the system in a refrigerator mode and a heat engine mode. In the refrigerator mode, mechanical work is used to transfer thermal energy from the second heat storage unit to the first heat storage unit. In the heat engine mode, thermal energy transferred from the first heat storage unit to the second heat storage unit is used to provide mechanical work.

Another aspect of the present disclosure is directed to a method. for storing and releasing energy comprising (a) increasing the pressure of a working fluid, operating in a closed cycle, from a first pressure to a second pressure with the aid of a compressor, thereby increasing the temperature of the working fluid. The method further comprises (b) using a first heat storage unit downstream of the compressor and in thermal communication with the working fluid for (i) in a storing mode, removing heat from the working fluid and decreasing the temperature of the working fluid, which decrease in temperature is at substantially the second pressure, or (ii) in a releasing mode, supplying heat to the working fluid and increasing the temperature of the working fluid, which increase in temperature is at substantially the second pressure. The method further comprises (c) decreasing the pressure of the working fluid from the second pressure to the first pressure with the aid of a turbine, thereby decreasing the temperature of the working fluid. The method further comprises (d) using a second heat storage unit downstream of the turbine and in thermal communication with the working fluid for (i) in a storing mode, supplying heat to the working fluid and increasing the temperature of the working fluid, which decrease in temperature is at substantially the first pressure, or (ii) in a releasing mode, removing heat from the working fluid and decreasing the temperature of the working fluid, which decrease in temperature is at substantially the first pressure. The working fluid does not undergo a phase change. Heat is supplied to or removed from the working fluid with the aid of a recuperator.

A further aspect of the present disclosure provides a pumped thermal energy storage system comprising a closed fluid flow path configured to circulate a working fluid. A first thermal storage medium is in thermal communication with the working fluid. The first thermal storage medium is capable of exchanging heat with the working fluid between a first low temperature and a first high temperature. A second thermal storage medium is in thermal communication with the working fluid. The second thermal store medium is capable of exchanging heat with the working fluid between a second low temperature and a second high temperature. The first low temperature is higher than the second high temperature. A recuperator is in fluid communication with the fluid flow path. The recuperator exchanges heat with the working fluid between the first low temperature and the second high temperature. The working fluid does not undergo a phase change.

A further aspect of the present disclosure is directed to a system for storing and extracting electrical energy comprising an electrical energy input and an electrical energy output. A ratio of the electrical energy output to the electrical energy input is greater than 1. The system stores or extracts electrical energy using at least one heat exchanger system comprising a thermal storage fluid that directs thermal energy into or extracts thermal energy from a circulatory fluid flow path. The system comprises a controller that is programmed to regulate (i) a temperature difference between any two thermally coupled fluid elements of the heat exchanger system, and/or (ii) one or more fluid properties of the fluid elements of the heat exchanger system such that entropy generation in the heat exchanger system is minimized during operation of the system.

Another aspect of the present disclosure is directed to a method for storing electrical energy comprising alternately and sequentially (i) providing an electrical work input to a heat pump in thermal communication with two thermal storage media, thereby storing energy, and (ii) providing an electrical work output from a heat engine in thermal communication with the two thermal storage media, thereby extracting energy. The heat pump and the heat engine comprise a working fluid flowing through a circulatory fluid flow path. The electrical input or the electrical output is varied by varying an absolute pressure of the working fluid.

In another aspect of the present disclosure, an energy storage and conversion system is provided. The energy storage and conversion system comprises a compressor, a first heat exchanger, a turbine, a second heat exchanger, a working fluid that flows along a fluid flow path in a closed cycle including, in sequence, the compressor, the first heat exchanger unit, the turbine, and the second heat exchanger, and a third heat exchanger in thermal communication with the working fluid. The system alternately operates as both (i) an electricity storage and retrieval cycle, and (ii) a heat engine to ambient cycle. In the electricity storage and retrieval cycle, the first heat exchanger exchanges heat between the working fluid and a first thermal storage medium and the second heat exchanger exchanges heat between the working fluid and a second thermal storage medium. In the heat engine to ambient cycle, the first heat exchanger transfers heat from the first thermal storage medium to the working fluid and the third heat exchanger transfers heat from the working fluid to the ambient environment.

Another aspect of the present disclosure relates to an energy storage and conversion system comprising a compressor a first heat exchanger, a turbine, a second heat exchanger, a working fluid that flows along a fluid flow path in a closed cycle including, in sequence, the compressor, the first heat exchanger unit, the turbine, and the second heat exchanger, and a third heat exchanger in thermal communication with the working fluid. The system alternately operates as both (i) an electricity storage and retrieval cycle, and (ii) a refrigerator to ambient cycle. In the electricity storage and retrieval cycle, the first heat exchanger exchanges heat between the working fluid and a first thermal storage medium and the second heat exchanger exchanges heat between the working fluid and a second thermal storage medium. In the refrigerator to ambient cycle, the third heat exchanger transfers heat from the working fluid to the ambient environment and the second heat exchanger transfers heat from the second thermal storage medium to the working fluid.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIG. 3A is a schematic pressure and temperature diagram of the working fluid as it undergoes the charge cycle in FIG. 2A.

FIG. 3B is a schematic pressure and temperature diagram of the working fluid as it undergoes the discharge cycle in FIG. 2B.

DETAILED DESCRIPTION

Figure 1:
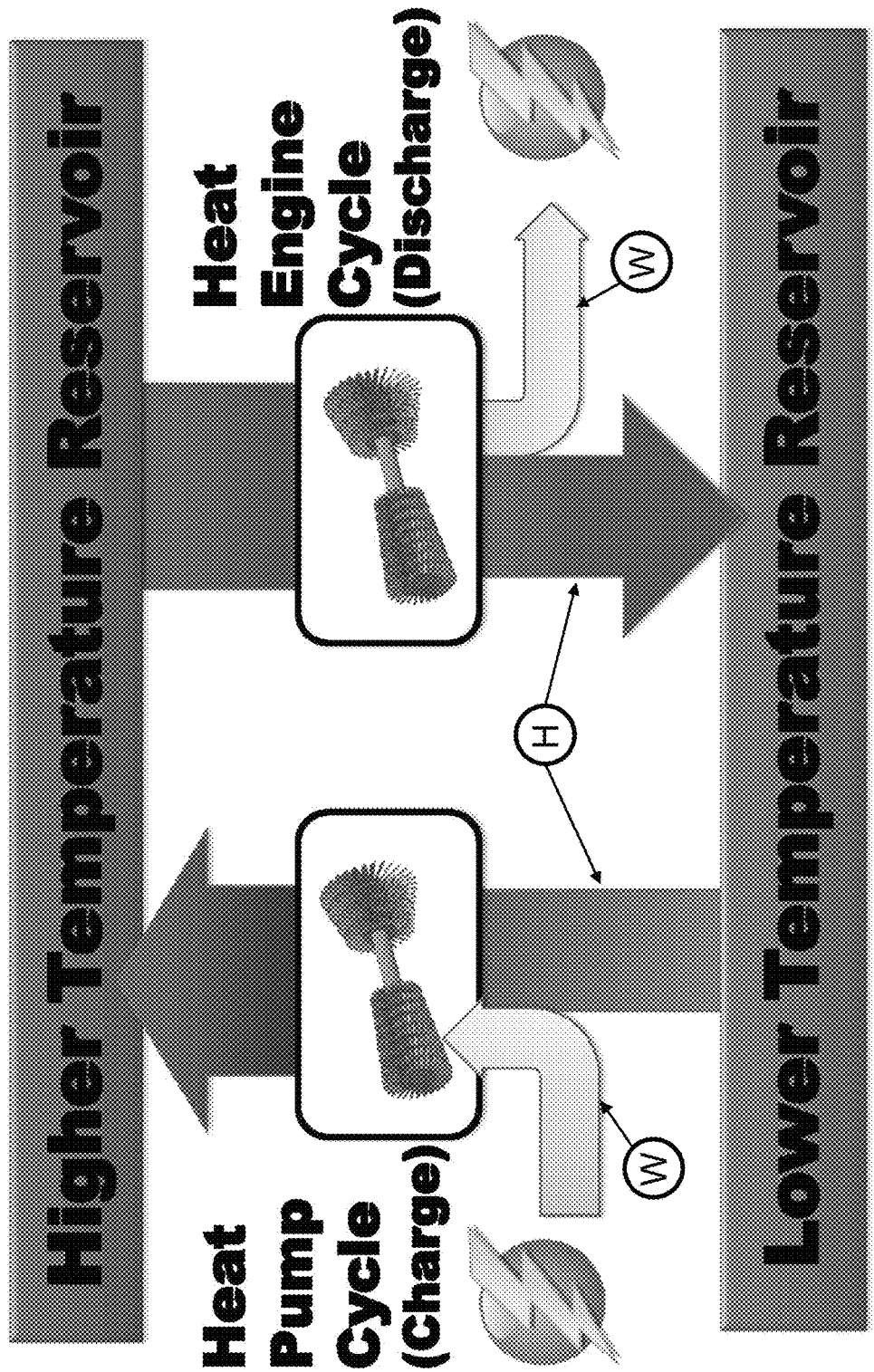
FIG. 1 schematically illustrates operation of a pumped thermal electric storage system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "reversible," as used herein, generally refers to a process or operation that can be reversed via infinitesimal changes in some property of the process or operation without substantial entropy production (e.g., dissipation of energy). A reversible process may be approximated by a process that is at thermodynamic equilibrium. In some examples, in a reversible process, the direction of flow of energy is reversible. As an alternative, or in addition to, the general direction of operation of a reversible process (e.g., the direction of fluid flow) can be reversed, such as, e.g., from clockwise to counterclockwise, and vice versa.

The term "sequence," as used herein, generally refers to elements (e.g., unit operations) in order. Such order can refer to process order, such as, for example, the order in which a fluid flows from one element to another. In an example, a compressor, heat storage unit and turbine in sequence includes the compressor upstream of the heat exchange unit, and the heat exchange unit upstream of the turbine. In such a case, a fluid can flow from the compressor to the heat exchange unit and from the heat exchange unit to the turbine. A fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

Pumped Thermal Systems

The disclosure provides pumped thermal systems capable of storing electrical energy and/or heat, and releasing energy (e.g., producing electricity) at a later time. The pumped thermal systems of the disclosure may include a heat engine, and a heat pump (or refrigerator). In some cases, the heat engine can be operated in reverse as a heat pump. In some cases, the heat engine can be operated in reverse as a refrigerator. Any description of heat pump/heat engine systems or refrigerator/heat engine systems capable of reverse operation herein may also be applied to systems comprising separate and/or a combination of separate and reverse-operable heat engine system(s), heat pump system(s) and/or refrigerator system(s). Further, as heat pumps and refrigerators share the same operating principles (albeit with differing objectives), any description of configurations or operation of heat pumps herein may also be applied to configurations or operation of refrigerators, and vice versa.

Systems of the present disclosure can operate as heat engines or heat pumps (or refrigerators). In some situations, systems of the disclosure can alternately operate as heat engines and heat pumps. In some examples, a system can operate as a heat engine to generate power, and subsequently operate as a heat pump to store energy, or vice versa. Such systems can alternately and sequentially operate as heat engines as heat pumps. In some cases, such systems reversibly or substantially reversibly operate as heat engines as heat pumps.

Reference will now be made to the figures, wherein like numerals refer to like parts throughout. It will be appreciated that the figures and features therein are not necessarily drawn to scale.

FIG. 1 schematically illustrates operating principles of pumped thermal electric storage using a heat pump/heat engine electricity storage system. Electricity may be stored in the form of thermal energy of two materials or media at different temperatures (e.g., thermal energy reservoirs comprising heat storage fluids or thermal storage media) by using a combined heat pump/heat engine system. In a charging or heat pump mode, work may be consumed by the system for transferring heat from a cold material or medium to a hot material or medium, thus lowering the temperature (e.g., sensible energy) of the cold material and increasing the temperature (i.e., sensible energy) of the hot material. In a discharging or heat engine mode, work may be produced by the system by transferring heat from the hot material to the cold material, thus lowering the temperature (i.e., sensible energy) of the hot material and increasing the temperature (i.e., sensible energy) of the cold material. The system may be configured to ensure that the work produced by the system on discharge is a favorable fraction of the energy consumed on charge. The system may be configured to achieve high roundtrip efficiency, defined herein as the work produced by the system on discharge divided by the work consumed by the system on charge. Further, the system may be configured to achieve the high roundtrip efficiency using components of a desired (e.g., acceptably low) cost. Arrows H and W in FIG. 1 represent directions of heat flow and work, respectively.

Heat engines, heat pumps and refrigerators of the disclosure may involve a working fluid to and from which heat is transferred while undergoing a thermodynamic cycle. The heat engines, heat pumps and refrigerators of the disclosure may operate in a closed cycle. Closed cycles allow, for example, a broader selection of working fluids, operation at elevated cold side pressures, operation at lower cold side temperatures, improved efficiency, and reduced risk of turbine damage. One or more aspects of the disclosure described in relation to systems having working fluids undergoing closed cycles may also be applied to systems having working fluids undergoing open cycles.

In one example, the heat engines may operate on a Brayton cycle and the heat pumps/refrigerators may operate on a reverse Brayton cycle (also known as a gas refrigeration cycle). Other examples of thermodynamic cycles that the working fluid may undergo or approximate include the Rankine cycle, the ideal vapor-compression refrigeration cycle, the Stirling cycle, the Ericsson cycle or any other cycle advantageously employed in concert with heat exchange with heat storage fluids of the disclosure.

The working fluid can undergo a thermodynamic cycle operating at one, two or more pressure levels. For example, the working fluid may operate in a closed cycle between a low pressure limit on a cold side of the system and a high pressure limit on a hot side of the system. In some implementations, a low pressure limit of about 10 atmospheres (atm) or greater can be used. In some instances, the low pressure limit may be at least about 1 atm, at least about 2 atm, at least about 5 atm, at least about 10 atm, at least about 15 atm, at least about 20 atm, at least about 30 atm, at least about 40 atm, at least about 60 atm, at least about 80 atm, at least about 100 atm, at least about 120 atm, at least about 160 atm, or at least about 200 atm, 500 atm, 1000 atm, or more. In some instances, a sub-atmospheric low pressure limit may be used. For example, the low pressure limit may be less than about 0.1 atm, less than about 0.2 atm, less than about 0.5 atm, or less than about 1 atm. In some instances, the low pressure limit may be about 1 atmosphere (atm). In the case of a working fluid operating in an open cycle, the low pressure limit may be about 1 atm or equal to ambient pressure.

In some cases, the value of the low pressure limit may be selected based on desired power output and/or power input requirements of the thermodynamic cycle. For example, a pumped thermal system with a low pressure limit of about 10 atm may be able to provide a power output comparable to an industrial gas turbine with ambient (1 atm) air intake. The value of the low pressure limit may also be subject to cost/safety tradeoffs. Further, the value of the low pressure limit may be limited by the value of the high pressure limit, the operating ranges of the hot side and cold side heat storage media (e.g., pressure and temperature ranges over which the heat storage media are stable), pressure ratios and operating conditions (e.g., operating limits, optimal operating conditions, pressure drop) achievable by turbomachinery and/or other system components, or any combination thereof. The high pressure limit may be determined in accordance with these system constraints. In some instances, higher values of the high pressure limit may lead to improved heat transfer between the working fluid and the hot side storage medium.

Working fluids used in pumped thermal systems may include air, argon, other noble gases, carbon dioxide, hydrogen, oxygen, or any combination thereof, and/or other fluids in gaseous, liquid, critical, or supercritical state (e.g., supercritical $CO_2$). The working fluid can be a gas or a low viscosity liquid (e.g., viscosity below about $500 \times 10^{-6}$ Poise at 1 atm), satisfying the requirement that the flow be continual. In some implementations, a gas with a high specific heat ratio may be used to achieve higher cycle efficiency than a gas with a low specific heat ratio. For example, argon (e.g., specific heat ratio of about 1.66) may be used to substitute air (e.g., specific heat ratio of about 1.4). In some cases, the working fluid may be a blend of one, two, three or more fluids. In one example, helium (having a high thermal conductivity and a high specific heat) may be added to the working fluid (e.g., argon) to improve heat transfer rates in heat exchangers.

Pumped thermal systems herein may utilize heat storage media or materials, such as one or more heat storage fluids. The heat storage media can be gases or low viscosity liquids, satisfying the requirement that the flow be continual. The systems may utilize a first heat storage medium on a hot side of the system ("hot side thermal storage (HTS) medium" or "HTS" herein) and a second heat storage medium on a cold side of the system ("cold side thermal storage (CTS) medium" or "CTS" herein). The thermal storage media (e.g., low viscosity liquids) can have high heat capacities per unit volume (e.g., heat capacities above about 1400 Joule (kilogram Kelvin)$^{-1}$) and high thermal conductivities (e.g., thermal conductivities above about 0.7 Watt (meter Kelvin)$^{-1}$). In some implementations, several different thermal storage media (also "heat storage media" herein) on either the hot side, cold side or both the hot side and the cold side may be used.

The operating temperatures of the hot side thermal storage medium can be in the liquid range of the hot side thermal storage medium, and the operating temperatures of the cold side thermal storage medium can be in the liquid range of the cold side thermal storage medium. In some examples, liquids may enable a more rapid exchange of large amounts of heat by convective counter-flow than solids or gases. Thus, in some cases, liquid HTS and CTS media may advantageously be used. Pumped thermal systems utilizing thermal storage media herein may advantageously provide a safe, non-toxic and geography-independent energy (e.g., electricity) storage alternative.

In some implementations, the hot side thermal storage medium can be a molten salt or a mixture of molten salts. Any salt or salt mixture that is liquid over the operating temperature range of the hot side thermal storage medium may be employed. Molten salts can provide numerous advantages as thermal energy storage media, such as low vapor pressure, lack of toxicity, chemical stability, low chemical reactivity with typical steels (e.g., melting point below the creep temperature of steels, low corrosiveness, low capacity to dissolve iron and nickel), and low cost. In one example, the HTS is a mixture of sodium nitrate and potassium nitrate. In some examples, the HTS is a eutectic mixture of sodium nitrate and potassium nitrate. In some examples, the HTS is a mixture of sodium nitrate and potassium nitrate having a lowered melting point than the individual constituents, an increased boiling point than the individual constituents, or a combination thereof. Other examples include potassium nitrate, calcium nitrate, sodium nitrate, sodium nitrite, lithium nitrate, mineral oil, or any combination thereof. Further examples include any gaseous (including compressed gases), liquid or solid media (e.g., powdered solids) having suitable (e.g., high) thermal storage capacities and/or capable of achieving suitable (e.g., high) heat transfer rates with the working fluid. For example, a mix of 60% sodium nitrate and 40% potassium nitrate (also referred to as a solar salt in some situations) can have a heat capacity of approximately 1500 Joule (Kelvin mole)$^{-1}$ and a thermal conductivity of approximately 0.75 Watt (meter Kelvin)$^{-1}$ within a temperature range of interest. The hot side thermal storage medium may be operated in a temperature range that structural steels can handle.

In some cases, liquid water at temperatures of about 0° C. to 100° C. (about 273 K-373 K) and a pressure of about 1 atm may be used as the cold side thermal storage medium. Due to a possible explosion hazard associated with presence of steam at or near the boiling point of water, the operating temperature can be kept below about 100° C. or less while maintaining an operating pressure of 1 atm (i.e., no pressurization). In some cases, the temperature operating range of the cold side thermal storage medium may be extended (e.g., to −30° C. to 100° C. at 1 atm) by using a mixture of water and one or more antifreeze compounds (e.g., ethylene glycol, propylene glycol, or glycerol).

As described in greater detail elsewhere herein, improved storage efficiency may be achieved by increasing the temperature difference at which the system operates, for example, by using a cold side heat storage fluid capable of operating at lower temperatures. In some examples, the cold side thermal storage media may comprise hydrocarbons, such as, for example, alkanes (e.g., hexane or heptane), alkenes, alkynes, aldehydes, ketones, carboxylic acids (e.g., HCOOH), ethers, cycloalkanes, aromatic hydrocarbons, alcohols (e.g., butanol), other type(s) of hydrocarbon molecules, or any combinations thereof. In some cases, the cold side thermal storage medium can be hexane (e.g., n-hexane). Hexane has a wide liquid range and can remain fluid (i.e., runny) over its entire liquid range (−94° C. to 68° C. at 1 atm). Hexane's low temperature properties are aided by its immiscibility with water. Other liquids, such as, for example, ethanol or methanol can become viscous at the low temperature ends of their liquid ranges due to pre-crystallization of water absorbed from air. In some cases, the cold side thermal storage medium can be heptane (e.g., n-heptane). Heptane has a wide liquid range and can remain fluid (i.e., runny) over its entire liquid range (−91° C. to 98° C. at 1 atm). Heptane's low temperature properties are aided by its immiscibility with water. At even lower temperatures, other heat storage media can be used, such as, for example, isohexane (2-methylpentane). In some examples, cryogenic liquids having boiling points below about −150° C. (123 K) or about −180° C. (93.15 K) may be used as cold side thermal storage media (e.g., propane, butane, pentane, nitrogen, helium, neon, argon and krypton, air, hydrogen, methane, or liquefied natural gas). In some implementations, choice of cold side thermal storage medium may be limited by the choice of working fluid. For example, when a gaseous working fluid is used, a liquid cold side thermal storage medium having a liquid temperature range at least partially or substantially above the boiling point of the working fluid may be required.

In some cases, the operating temperature range of CTS and/or HTS media can be changed by pressurizing (i.e., raising the pressure) or evacuating (i.e., lowering the pressure) the tanks and thus changing the temperature at which the storage media undergo phase transitions (e.g., going from liquid to solid, or from liquid to gas).

In some cases, the hot side and the cold side heat storage fluids of the pumped thermal systems are in a liquid state over at least a portion of the operating temperature range of the energy storage device. The hot side heat storage fluid may be liquid within a given range of temperatures. Similarly, the cold side heat storage fluid may be liquid within a given range of temperatures. The heat storage fluids may be heated, cooled or maintained to achieve a suitable operating temperature prior to, during or after operation.

Pumped thermal systems of the disclosure may cycle between charged and discharged modes. In some examples, the pumped thermal systems can be fully charged, partially charged or partially discharged, or fully discharged. In some cases, cold side heat storage may be charged (also "recharged" herein) independently from hot side heat storage. Further, in some implementations, charging (or some portion thereof) and discharging (or some portion thereof) can occur simultaneously. For example, a first portion of a hot side heat storage may be recharged while a second portion of the hot side heat storage together with a cold side heat storage are being discharged.

The pumped thermal systems may be capable of storing energy for a given amount of time. In some cases, a given amount of energy may be stored for at least about 1 second, at least about 30 seconds, at least about 1 minute, at least about 5 minutes, at least about 30 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 12 hours, at least about 14 hours, at least about 16 hours, at least about 18 hours, at least about 20 hours, at least about 22 hours, at least about 24 hours (1 day), at least about 2 days, at least about 4 days, at least about 6 days, at least about 8 days, at least about 10 days, 20 days, 30 days, 60 days, 100 days, 1 year or more.

Pumped thermal systems of the disclosure may be capable of storing/receiving input of, and/or extracting/providing output of a substantially large amount of energy and/or power for use with power generation systems (e.g., intermittent power generation systems such as wind power or solar power), power distribution systems (e.g. electrical grid), and/or other loads or uses in grid-scale or stand-alone settings. During a charge mode of a pumped thermal system, electric power received from an external power source (e.g., a wind power system, a solar photovoltaic power system, an electrical grid etc.) can be used operate the pumped thermal system in a heat pump mode (i.e., transferring heat from a low temperature reservoir to a high temperature reservoir, thus storing energy). During a discharge mode of the pumped thermal system, the system can supply electric power to an external power system or load (e.g., one or more electrical grids connected to one or more loads, a load, such as a factory or a power-intensive process, etc.) by operating in a heat engine mode (i.e., transferring heat from a high temperature reservoir to a low temperature reservoir, thus extracting energy). As described elsewhere herein, during charge and/or discharge, the system may receive or reject thermal power, including, but not limited to electromagnetic power (e.g., solar radiation) and thermal power (e.g., sensible energy from a medium heated by solar radiation, heat of combustion etc.).

In some implementations, the pumped thermal systems are grid-synchronous. Synchronization can be achieved by matching speed and frequency of motors/generators and/or turbomachinery of a system with the frequency of one or more grid networks with which the system exchanges power. For example, a compressor and a turbine can rotate at a given, fixed speed (e.g., 3600 revolutions per minute (rpm)) that is a multiple of grid frequency (e.g., 60 hertz (Hz)). In some cases, such a configuration may eliminate the need for additional power electronics. In some implementations, the turbomachinery and/or the motors/generators are not grid synchronous. In such cases, frequency matching can be accomplished through the use of power electronics. In some implementations, the turbomachinery and/or the motors/generators are not directly grid synchronous but can be matched through the use of gears and/or a mechanical gearbox. As described in greater detail elsewhere herein, the pumped thermal systems may also be rampable. Such capabilities may enable these grid-scale energy storage systems to operate as peaking power plants and/or as a load following power plants. In some cases, the systems of the disclosure may be capable of operating as base load power plants.

Pumped thermal systems can have a given power capacity. In some cases, power capacity during charge may differ from power capacity during discharge. For example, each system can have a charge and/or discharge power capacity of less than about 1 megawatt (MW), at least about 1 megawatt, at least about 2 MW, at least about 3 MW, at least about 4 MW, at least about 5 MW, at least about 6 MW, at least about 7 MW, at least about 8 MW, at least about 9 MW, at least about 10 MW, at least about 20 MW, at least about 30 MW, at least about 40 MW, at least about 50 MW, at least about 75 MW, at least about 100 MW, at least about 200 MW, at least about 500 MW, at least about 1 gigawatt (GW), at least about 2 GW, at least about 5 GW, at least about 10 GW, at least about 20 GW, at least about 30 GW, at least about 40 GW, at least about 50 GW, at least about 75 GW, at least about 100 GW, or more.

Pumped thermal systems can have a given energy storage capacity. In one example, a pumped thermal system is configured as a 100 MW unit operating for 10 hours. In another example, a pumped thermal system is configured as a 1 GW plant operating for 12 hours. In some instances, the energy storage capacity can be less than about 1 megawatt hour (MWh), at least about 1 megawatt hour, at least about 10 MWh, at least about 100 MWh, at least about 1 gigawatt hour (GWh), at least about 5 GWh, at least about 10 GWh, at least about 20 GWh, at least 50 GWh, at least about 100 GWh, at least about 200 GWh, at least about 500 GWh, at least about 700 GWh, at least about 1000 GWh, or more.

In some cases, a given power capacity may be achieved with a given size, configuration and/or operating conditions of the heat engine/heat pump cycle. For example, size of turbomachinery, ducts, heat exchangers, or other system components may correspond to a given power capacity.

In some implementations, a given energy storage capacity may be achieved with a given size and/or number of hot side thermal storage tanks and/or cold side thermal storage tanks. For example, the heat engine/heat pump cycle can operate at a given power capacity for a given amount of time set by the heat storage capacity of the system or plant. The number and/or heat storage capacity of the hot side thermal storage tanks may be different from the number and/or heat storage capacity of the cold side thermal storage tanks. The number of tanks may depend on the size of individual tanks. The size of hot side storage tanks may differ from the size of cold side thermal storage tanks. In some cases, the hot side thermal storage tanks, the hot side heat exchanger and the hot side thermal storage medium may be referred to as a hot side heat (thermal) storage unit. In some cases, the cold side thermal storage tanks, the cold side heat exchanger and the cold side thermal storage medium may be referred to as a cold side heat (thermal) storage unit.

A pumped thermal storage facility can include any suitable number of hot side storage tanks, such as at least about 2, at least about 4, at least about 10, at least about 50, at least about 100, at least about 500, at least about 1,000, at least about 5,000, at least about 10,000, and the like. In some examples, a pumped thermal storage facility includes 2, 3, 4, 5, 6, 7, 8, 9, 10, 15, 20, 30, 40, 50, 60, 70, 80, 90, 100, 200, 300, 400, 500, 600, 700, 800, 900, 1,000 or more hot side tanks.

A pumped thermal storage facility can also include any suitable number of cold side storage tanks, such as at least about 2, at least about 4, at least about 10, at least about 50, at least about 100, at least about 500, at least about 1,000, at least about 5,000, at least about 10,000, and the like. In some examples, a pumped thermal storage facility includes 2, 3, 4, 5, 6, 7, 8, 9, 10, 15, 20, 30, 40, 50, 60, 70, 80, 90, 100, 200, 300, 400, 500, 600, 700, 800, 900, 1,000 or more cold side tanks.

Pumped Thermal Storage Cycles

An aspect of the disclosure relates to pumped thermal systems operating on pumped thermal storage cycles. In some examples, the cycles allow electricity to be stored as heat (e.g., in the form of a temperature differential) and then converted back to electricity through the use of at least two pieces of turbomachinery, a compressor and a turbine. The compressor consumes work and raises the temperature and pressure of a working fluid (WF). The turbine produces work and lowers the temperature and pressure of the working fluid. In some examples, more than one compressor and more than one turbine is used. In some cases, the system can include at least 1, at least 2, at least 3, at least 4, or at least 5 compressors. In some cases, the system can include at least 1, at least 2, at least 3, at least 4, or at least 5 turbines. The compressors may be arranged in series or in parallel. The turbines may be arranged in series or in parallel.

Figure 2A:
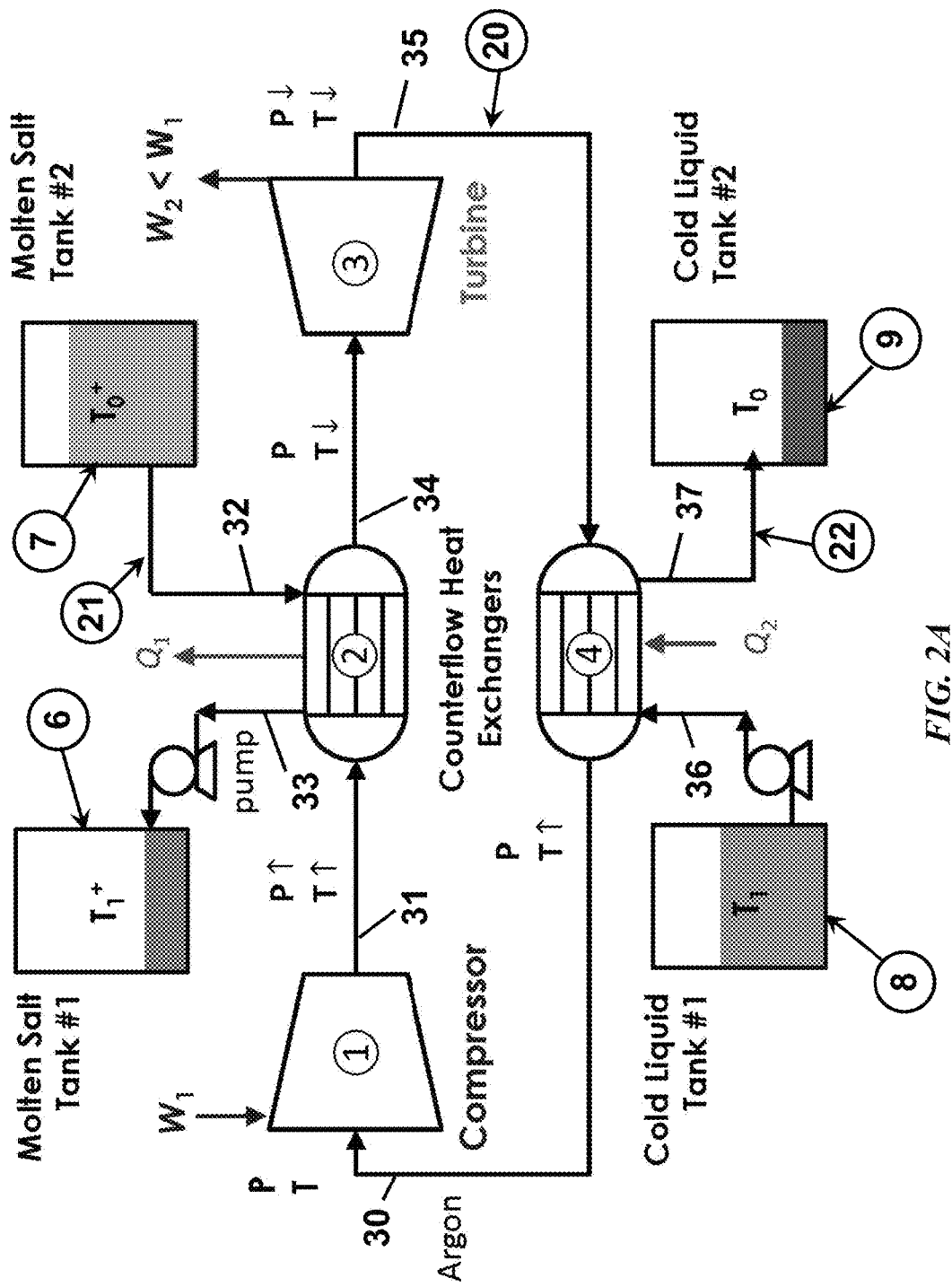
FIG. 2A is a schematic flow diagram of working fluid and heat storage media of a pumped thermal system in a charge/heat pump mode.
Figure 2B:
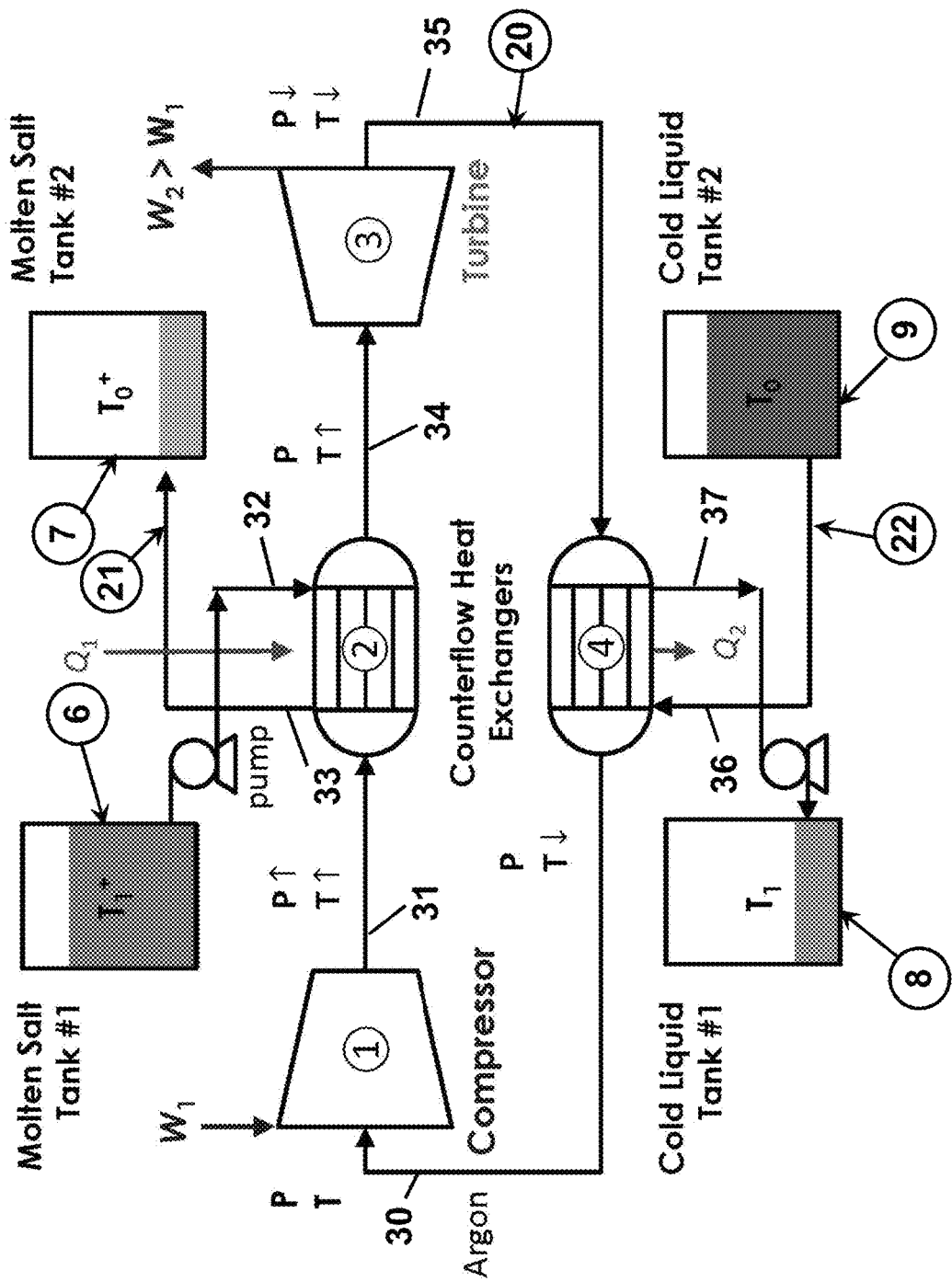
FIG. 2B is a schematic flow diagram of working fluid and heat storage media of a pumped thermal system in a discharge/heat engine mode.

FIGS. 2A and 2B are schematic flow diagrams of working fluid and heat storage media of an exemplary pumped thermal system in a charge/heat pump mode and in a discharge/heat engine mode, respectively. The system may be idealized for simplicity of explanation so that there are no losses (i.e., entropy generation) in either the turbomachinery or heat exchangers. The system can include a working fluid 20 (e.g., argon gas) flowing in a closed cycle between a compressor 1, a hot side heat exchanger 2, a turbine 3 and a cold side heat exchanger 4. Fluid flow paths/directions for the working fluid 20 (e.g., a gas), a hot side thermal storage (HTS) medium 21 (e.g., a low viscosity liquid) and a cold side thermal storage (CTS) medium 22 (e.g., a low viscosity liquid) are indicated by arrows.

FIGS. 3A and 3B are schematic pressure and temperature diagrams of the working fluid 20 as it undergoes the charge cycles in FIGS. 2A and 2B, respectively, once again simplified in the approximation of no entropy generation. Normalized pressure is shown on the y-axes and temperature is shown on the x-axes. The direction of processes taking place during the cycles is indicated with arrows, and the individual processes taking place in the compressor 1, the hot side CFX 2, the turbine 3 and the cold side CFX 4 are indicated on the diagram with their respective numerals.

The heat exchangers 2 and 4 can be configured as counter-flow heat exchangers (CFXs), where the working fluid flows in one direction and the substance it is exchanging heat with is flowing in the opposite direction. In an ideal counter-flow heat exchanger with correctly matched flows (i.e., balanced capacities or capacity flow rates), the temperatures of the working fluid and thermal storage medium flip (i.e., the counter-flow heat exchanger can have unity effectiveness).

The counter-flow heat exchangers 2 and 4 can be designed and/or operated to reduce entropy generation in the heat exchangers to negligible levels compared to entropy generation associated with other system components and/or processes (e.g., compressor and/or turbine entropy generation). In some cases, the system may be operated such that entropy generation in the system is minimized. For example, the system may be operated such that entropy generation associated with heat storage units is minimized. In some cases, a temperature difference between fluid elements exchanging heat can be controlled during operation such that entropy generation in hot side and cold side heat storage units is minimized. In some instances, the entropy generated in the hot side and cold side heat storage units is negligible when compared to the entropy generated by the compressor, the turbine, or both the compressor and the turbine. In some instances, entropy generation associated with heat transfer in the heat exchangers 2 and 4 and/or entropy generation associated with operation of the hot side storage unit, the cold side storage unit or both the hot side and cold side storage units can be less than about 50%, less than about 25%, less than about 20%, less than about 15%, less than about 10%, less than about 5%, less than about 4%, less than about 3%, less than about 2%, or less than about 1% of the total entropy generated within the system (e.g., entropy generated by the compressor 1, the hot side heat exchanger 2, the turbine 3, the cold side heat exchanger 4 and/or other components described herein, such as, for example, a recuperator). For example, entropy generation can be reduced or minimized if the two substances exchanging heat do so at a local temperature differential $\Delta T \to 0$ (i.e., when the temperature difference between any two fluid elements that are in close thermal contact in the heat exchanger is small). In some examples, the temperature differential ΔT between any two fluid elements that are in close thermal contact may be less than about 300 Kelvin (K), less than about 200 K, less than about 100 K, less than about 75 K, less than about 50 K, less than about 40 K, less than about 30 K, less than about 20 K, less than about 10 K, less than about 5 K, less than about 3 K, less than about 2 K, or less than about 1 K. In another example, entropy generation associated with pressure drop can be reduced or minimized by suitable design. In some examples, the heat exchange process can take place at a constant or near-constant pressure. Alternatively, a non-negligible pressure drop may be experienced by the working fluid and/or one or more thermal storage media during passage through a heat exchanger. Pressure drop in heat exchangers may be controlled (e.g., reduced or minimized) through suitable heat exchanger design. In some examples, the pressure drop across each heat exchanger may be less than about 20% of inlet pressure, less than about 10% of inlet pressure, less than about 5% of inlet pressure, less than about 3% of inlet pressure, less than about 2% of inlet pressure, less than about 1% of inlet pressure, less than about 0.5% of inlet pressure, less than about 0.25% of inlet pressure, or less than about 0.1% of inlet pressure.

Upon entering the heat exchanger 2, the temperature of the working fluid can either increase (taking heat from the HTS medium 21, corresponding to the discharge mode in FIGS. 2B and 3B) or decrease (giving heat to the HTS medium 21, corresponding to the charge mode in FIGS. 2A and 3A), depending on the temperature of the HTS medium in the heat exchanger relative the temperature of the working fluid. Similarly, upon entering the heat exchanger 4, the temperature of the working fluid can either increase (taking heat from the CTS medium 22, corresponding to the charge mode in FIGS. 2A and 3A) or decrease (giving heat to the CTS medium 22, corresponding to the discharge mode in FIGS. 2B and 3B), depending on the temperature of the CTS medium in the heat exchanger relative the temperature of the working fluid.

As described in more detail with reference to the charge mode in FIGS. 2A and 3A, the heat addition process in the cold side CFX 4 can take place over a different range of temperatures than the heat removal process in the hot side CFX 2. Similarly, in the discharge mode in FIGS. 2B and 3B, the heat rejection process in the cold side CFX 4 can take place over a different range of temperatures than the heat addition process in the hot side CFX 2. At least a portion of the temperature ranges of the hot side and cold side heat exchange processes may overlap during charge, during discharge, or during both charge and discharge.

As used herein, the temperatures $T_0$, $T_1$, $T_0^+$ and $T_1^+$ are so named because $T_0^+$, $T_1^+$ are the temperatures achieved at the exit of a compressor with a given compression ratio r, adiabatic efficiency $\eta_c$ and inlet temperatures of $T_0$, $T_1$ respectively. The examples in FIGS. 2A, 2B, 3A and 3B can be idealized examples where $\eta_c=1$ and where adiabatic efficiency of the turbine $\eta_t$ also has the value $\eta_t=1$.

With reference to the charge mode shown in FIGS. 2A and 3A, the working fluid 20 can enter the compressor 1 at position 30 at a pressure P and a temperature T (e.g., at $T_1$, $P_2$). As the working fluid passes through the compressor, work $W_1$ is consumed by the compressor to increase the pressure and temperature of the working fluid (e.g., to $T_1^+$, $P_1$), as indicated by P↑ and T↑ at position 31. In the charge mode, the temperature $T_1^+$ of the working fluid exiting the compressor and entering the hot side CFX 2 at position 31 is higher than the temperature of the HTS medium 21 entering the hot side CFX 2 at position 32 from a second hot side thermal storage tank 7 at a temperature $T_0^+$ (i.e., $T_0^+<T_1^+$). As these two fluids pass in thermal contact with each other in the heat exchanger, the working fluid's temperature decreases as it moves from position 31 position 34, giving off heat $Q_1$ to the HTS medium, while the temperature of the HTS medium in turn increases as it moves from position 32 to position 33, absorbing heat $Q_1$ from the working fluid. In an example, the working fluid exits the hot side CFX 2 at position 34 at the temperature $T_0^+$ and the HTS medium exits the hot side CFX 2 at position 33 into a first hot side thermal storage tank 6 at the temperature $T_1^+$. The heat exchange process can take place at a constant or near-constant pressure such that the working fluid exits the hot side CFX 2 at position 34 at a lower temperature but same pressure $P_1$, as indicated by P and T↓ at position 34. Similarly, the temperature of the HTS medium 21 increases in the hot side CFX 2, while its pressure can remain constant or near-constant.

Upon exiting the hot side CFX 2 at position 34 (e.g., at $T_0^+$, $P_1$), the working fluid 20 undergoes expansion in the turbine 3 before exiting the turbine at position 35. During the expansion, the pressure and temperature of the working fluid decrease (e.g., to $T_0$, $P_2$), as indicated by P↓ and T↓ at position 35. The magnitude of work $W_2$ generated by the turbine depends on the enthalpy of the working fluid entering the turbine and the degree of expansion. In the charge mode, heat is removed from the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being lower than the enthalpy of the gas exiting the compressor, the work $W_2$ generated by the turbine 3 is smaller than the work $W_1$ consumed by the compressor 1 (i.e., $W_2<W_1$).

Because heat was taken out of the working fluid in the hot side CFX 2, the temperature $T_0$ at which the working fluid exits the turbine at position 35 is lower than the temperature $T_1$ at which the working fluid initially entered the compressor at position 30. To close the cycle (i.e., to return the pressure and temperature of the working fluid to their initial values $T_1$, $P_2$ at position 30), heat $Q_2$ is added to the working fluid from the CTS medium 22 in the cold side CFX 4 between positions 35 and 30 (i.e., between the turbine 3 and the compressor 1). In an example, the CTS medium 22 enters the cold side CFX 4 at position 36 from a first cold side thermal storage tank 8 at the temperature $T_1$ and exits the cold side CFX 4 at position 37 into a second cold side thermal storage tank 9 at the temperature $T_0$, while the working fluid 20 enters the cold side CFX 4 at position 35 at the temperature $T_0$ and exits the cold side CFX 4 at position 30 at the temperature $T_1$. Again, the heat exchange process can take place at a constant or near-constant pressure such that the working fluid exits the cold side CFX 2 at position 30 at a higher temperature but same pressure $P_2$, as indicated by P and T↑ at position 30. Similarly, the temperature of the CTS medium 22 decreases in the cold side CFX 2, while its pressure can remain constant or near-constant.

During charge, the heat $Q_2$ is removed from the CTS medium and the heat $Q_1$ is added to the HTS medium, wherein $Q_1>Q_2$. A net amount of work $W_1-W_2$ is consumed, since the work $W_1$ used by the compressor is greater than the work $W_2$ generated by the turbine. A device that consumes work while moving heat from a cold body or thermal storage medium to a hot body or thermal storage medium is a heat pump; thus, the pumped thermal system in the charge mode operates as a heat pump.

In an example, the discharge mode shown in FIGS. 2B and 3B can differ from the charge mode shown in FIGS. 2A and 3A in the temperatures of the thermal storage media being introduced into the heat exchangers. The temperature at which the HTS medium enters the hot side CFX 2 at position 32 is $T_1^+$ instead of $T_0^+$, and the temperature of the CTS medium entering the cold side CFX 4 at position 36 is $T_0$ instead of $T_1$. During discharge, the working fluid enters the compressor at position 30 at $T_0$ and $P_2$, exits the compressor at position 31 at $T_0^+ < T_1^+$ and $P_1$, absorbs heat from the HTS medium in the hot side CFX 2, enters the turbine 3 at position 34 at $T_1^+$ and $P_1$, exits the turbine at position 35 at $T_1 > T_0$ and $P_2$, and finally rejects heat to the CTS medium in the cold side CFX 4, returning to its initial state at position 30 at $T_0$ and $P_2$.

The HTS medium at temperature $T_1^+$ can be stored in a first hot side thermal storage tank 6, the HTS medium at temperature $T_0^+$ can be stored in a second hot side thermal storage tank 7, the CTS medium at temperature $T_1$ can be stored in a first cold side thermal storage tank 8, and the CTS medium at temperature $T_0$ can be stored in a second cold side thermal storage tank 9 during both charge and discharge modes. In one implementation, the inlet temperature of the HTS medium at position 32 can be switched between $T_1^+$ and $T_0^+$ by switching between tanks 6 and 7, respectively. Similarly, the inlet temperature of the CTS medium at position 36 can be switched between $T_1$ and $T_0$ by switching between tanks 8 and 9, respectively. Switching between tanks can be achieved by including a valve or a system of valves (e.g., valve systems 12 and 13 in FIG. 4B) for switching connections between the hot side heat exchanger 2 and the hot side tanks 6 and 7, and/or between the cold side heat exchanger 4 and the cold side tanks 8 and 9 as needed for the charge and discharge modes. In some implementations, connections may be switched on the working fluid side instead, while the connections of storage tanks 6, 7, 8 and 9 to the heat exchangers 2 and 4 remain static. In some examples, flow paths and connections to the heat exchangers may depend on the design (e.g., shell-and-tube) of each heat exchanger. In some implementations, one or more valves can be used to switch the direction of both the working fluid and the heat storage medium through the counter-flow heat exchanger on charge and discharge. Such configurations may be used, for example, due to high thermal storage capacities of the heat exchanger component, to decrease or eliminate temperature transients, or a combination thereof. In some implementations, one or more valves can be used to switch the direction of only the working fluid, while the direction of the HTS or CTS can be changed by changing the direction of pumping, thereby maintaining the counter-flow configuration. In some implementations, different valve configurations may be used for the HTS and the CTS. Further, any combination of the valve configurations herein may be used. For example, the system may be configured to operate using different valve configurations in different situations (e.g., depending on system operating conditions).

In the discharge mode shown in FIGS. 2B and 3B, the working fluid 20 can enter the compressor 1 at position 30 at a pressure P and a temperature T (e.g., at $T_0$, $P_2$). As the working fluid passes through the compressor, work $W_1$ is consumed by the compressor to increase the pressure and temperature of the working fluid (e.g., to $T_0^+$, $P_1$), as indicated by P↑ and T↑ at position 31. In the discharge mode, the temperature $T_0^+$ of the working fluid exiting the compressor and entering the hot side CFX 2 at position 31 is lower than the temperature of the HTS medium 21 entering the hot side CFX 2 at position 32 from a first hot side thermal storage tank 6 at a temperature $T_1^+$ (i.e., $T_0^+ < T_1^+$). As these two fluids pass in thermal contact with each other in the heat exchanger, the working fluid's temperature increases as it moves from position 31 position 34, absorbing heat $Q_1$ from the HTS medium, while the temperature of the HTS medium in turn decreases as it moves from position 32 to position 33, giving off heat $Q_1$ to the working fluid. In an example, the working fluid exits the hot side CFX 2 at position 34 at the temperature $T_1^+$ and the HTS medium exits the hot side CFX 2 at position 33 into the second hot side thermal storage tank 7 at the temperature $T_0^+$. The heat exchange process can take place at a constant or near-constant pressure such that the working fluid exits the hot side CFX 2 at position 34 at a higher temperature but same pressure $P_1$, as indicated by P and T↑ at position 34. Similarly, the temperature of the HTS medium 21 decreases in the hot side CFX 2, while its pressure can remain constant or near-constant.

Upon exiting the hot side CFX 2 at position 34 (e.g., at $T_1^+$, $P_1$), the working fluid 20 undergoes expansion in the turbine 3 before exiting the turbine at position 35. During the expansion, the pressure and temperature of the working fluid decrease (e.g., to $T_1$, $P_2$), as indicated by P↓ and T↓ at position 35. The magnitude of work $W_2$ generated by the turbine depends on the enthalpy of the working fluid entering the turbine and the degree of expansion. In the discharge mode, heat is added to the working fluid between positions 31 and 34 (in the hot side CFX 2) and the working fluid is expanded back to the pressure at which it initially entered the compressor at position 30 (e.g., $P_2$). The compression ratio (e.g., $P_1/P_2$) in the compressor 1 being equal to the expansion ratio in the turbine 3, and the enthalpy of the gas entering the turbine being higher than the enthalpy of the gas exiting the compressor, the work $W_2$ generated by the turbine 3 is greater than the work $W_1$ consumed by the compressor 1 (i.e., $W_2 > W_1$).

Because heat was added to the working fluid in the hot side CFX 2, the temperature $T_1$ at which the working fluid exits the turbine at position 35 is higher than the temperature $T_0$ at which the working fluid initially entered the compressor at position 30. To close the cycle (i.e., to return the pressure and temperature of the working fluid to their initial values $T_0$, $P_2$ at position 30), heat $Q_2$ is rejected by the working fluid to the CTS medium 22 in the cold side CFX 4 between positions 35 and 30 (i.e., between the turbine 3 and the compressor 1). The CTS medium 22 enters the cold side CFX 4 at position 36 from a second cold side thermal storage tank 9 at the temperature $T_0$ and exits the cold side CFX 4 at position 37 into a first cold side thermal storage tank 8 at the temperature $T_1$, while the working fluid 20 enters the cold side CFX 4 at position 35 at the temperature $T_1$ and exits the cold side CFX 4 at position 30 at the temperature $T_0$. Again, the heat exchange process can take place at a constant or near-constant pressure such that the working fluid exits the cold side CFX 2 at position 30 at a higher temperature but same pressure $P_2$, as indicated by P and T↓ at position 30. Similarly, the temperature of the CTS medium 22 increases in the cold side CFX 2, while its pressure can remain constant or near-constant.

During discharge, the heat $Q_2$ is added to the CTS medium and the heat $Q_1$ is removed from the HTS medium, wherein $Q_1 > Q_2$. A net amount of work $W_2 - W_1$ is generated, since the work $W_1$ used by the compressor is smaller than the work $W_2$ generated by the turbine. A device that generates work while moving heat from a hot body or thermal storage medium to a cold body or thermal storage medium is a heat engine; thus, the pumped thermal system in the discharge mode operates as a heat engine.

Figure 4A:
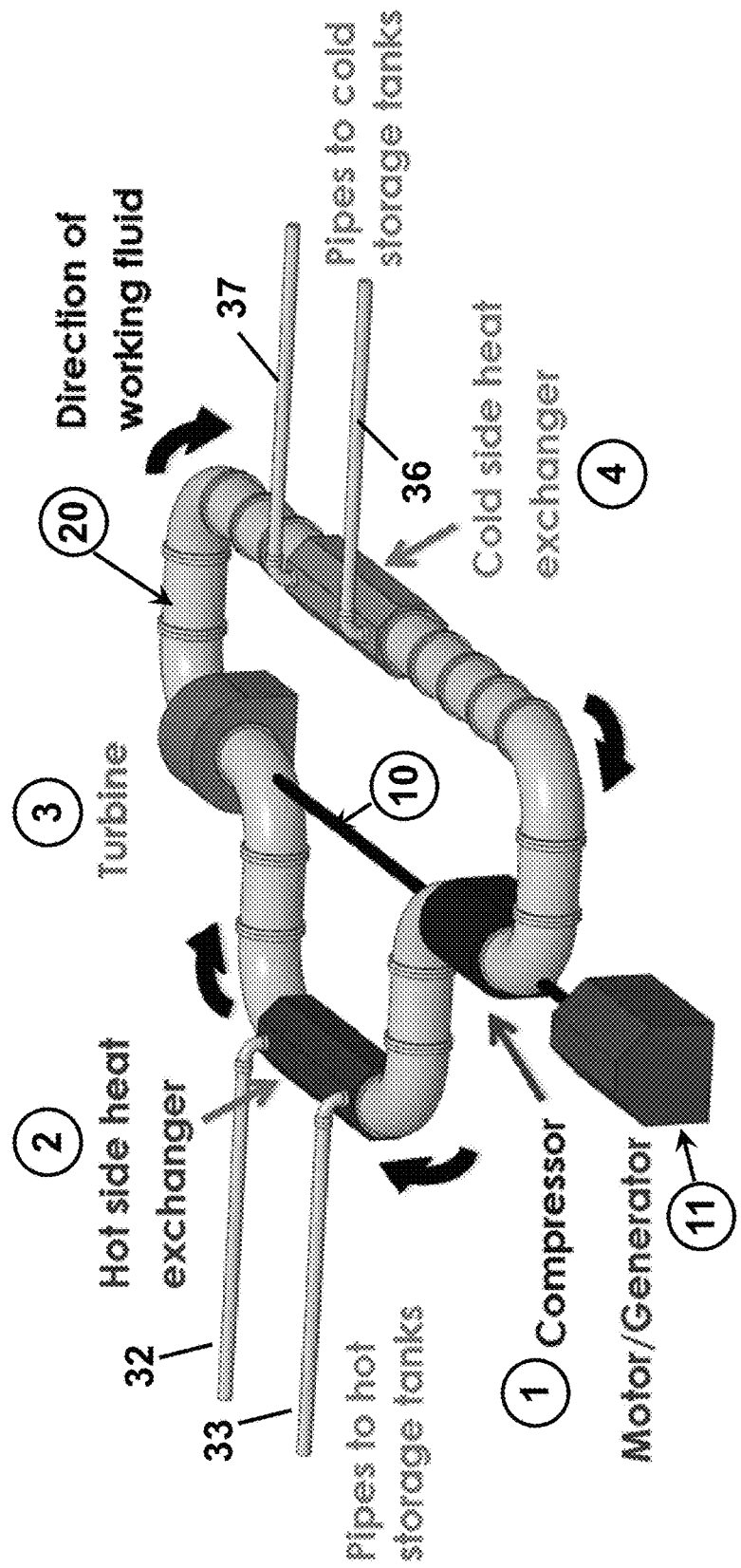
FIG. 4A is a schematic perspective view of a closed working fluid system in the pumped thermal system in FIGS. 2A-2B.

FIG. 4A is a simplified schematic perspective view of a closed working fluid system in the pumped thermal system in FIGS. 2A-2B. As indicated, the working fluid 20 (contained inside tubing) circulates clockwise between the compressor 1, the hot side heat exchanger 2, the turbine 3, and the cold side heat exchanger 4. The compressor 1 and the turbine 3 can be ganged on a common mechanical shaft 10 such that they rotate together. In some implementations, the compressor 1 and the turbine 3 can have separate mechanical shafts. A motor/generator 11 (e.g., including a synchronous motor—synchronous generator converter on a single common shaft) provides power to and from the turbomachinery. In this example, the compressor, the turbine and the motor/generator are all located on a common shaft. Pipes at positions 32 and 33 transfer hot side thermal storage fluid to and from the hot side heat exchanger 2, respectively. Pipes at positions 36 and 37 transfer cold side thermal storage fluid to and from the cold side heat exchanger 4, respectively.

Although the system of FIG. 4A is illustrated as comprising a compressor 1 and turbine 3, the system can include one or more compressors and one or more turbines, which may operate, for example, in a parallel configuration, or alternatively in a series configuration or in a combination of parallel and series configurations. In some examples, a system of compressors or turbines may be assembled such that a given compression ratio is achieved. In some cases, different compression ratios (e.g., on charge and discharge) can be used (e.g., by connecting or disconnecting, in a parallel and/or series configuration, one or more compressors or turbines from the system of compressors or turbines). In some examples, the working fluid is directed to a plurality of compressors and/or a plurality of turbines. In some examples, the compressor and/or turbine may have temperature dependent compression ratios. Arrangement and/or operation of the turbomachinery and/or other elements of the system may be adjusted in accordance with the temperature dependence (e.g., to optimize performance).

Figure 4B:
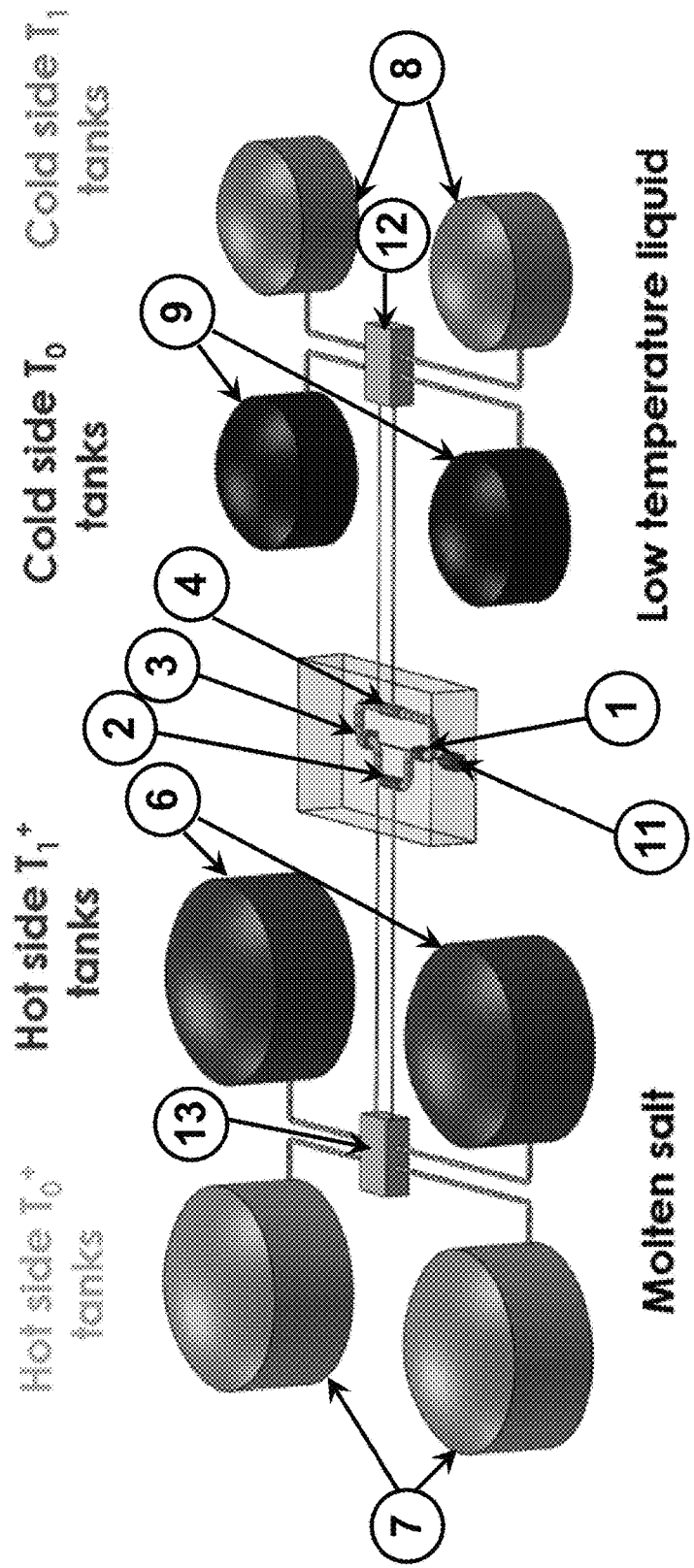
FIG. 4B is a schematic perspective view of the pumped thermal system in FIGS. 2A-2B with hot side and cold side storage tanks and a closed cycle working fluid system.

FIG. 4B is a simplified schematic perspective view of the pumped thermal system in FIGS. 2A-2B with hot side and cold side storage tanks and a closed cycle working fluid system. In this example, the HTS medium is a molten salt and the CTS medium is a low temperature liquid. One, two or more first hot side tanks 6 (at the temperature $T_1^+$) and one, two or more second hot side tanks 7 (at the temperature $T_0^+$), both for holding the HTS medium, are in fluid communication with a valve 13 configured to transfer the HTS medium to and from the hot side heat exchanger 2. One, two or more first cold side tanks 8 (at the temperature $T_1$) and one, two or more second cold side tanks 9 (at the temperature $T_0$), both for holding the CTS medium, are in fluid communication with a valve 12 configured to transfer the CTS medium to and from the cold side heat exchanger 4.

The thermal energy reservoirs or storage tanks may be thermally insulated tanks that can hold a suitable quantity of the relevant thermal storage medium (e.g., heat storage fluid). The storage tanks may allow for relatively compact storage of large amounts of thermal energy. In an example, the hot side tanks 6 and/or 7 can have a diameter of about 80 meters, while the cold side tanks 8 and/or 9 can have a diameter of about 60 meters. In another example, the size of each (i.e., hot side or cold side) thermal storage for a 1 GW plant operating for 12 hours can be about 20 medium-sized oil refinery tanks.

In some implementations, a third set of tanks containing storage media at intermediate temperatures between the other tanks may be included on the hot side and/or the cold side. In an example, a third storage or transfer tank (or set of tanks) at a temperature intermediate to the temperatures of a first tank (or set of tanks) and a second tank (or set of tanks) may be provided. A set of valves may be provided for switching the storage media between the different tanks and heat exchangers. For example, thermal media may be directed to different sets of tanks after exiting the heat exchangers depending on operating conditions and/or cycle being used. In some implementations, one or more additional sets of storage tanks at different temperatures may be added on the hot side and/or the cold side.

The storage tanks (e.g., hot side tanks comprising hot side thermal storage medium and/or cold side tanks comprising cold side thermal storage medium) may operate at ambient pressure. In some implementations, thermal energy storage at ambient pressure can provide safety benefits. Alternatively, the storage tanks may operate at elevated pressures, such as, for example, at a pressure of at least about 2 atm, at least about 5 atm, at least about 10 atm, at least about 20 atm, or more. Alternatively, the storage tanks may operate at reduced pressures, such as, for example, at a pressure of at most about 0.9 atm, at most about 0.7 atm, at most about 0.5 atm, at most about 0.3 atm, at most about 0.1 atm, at most about 0.01 atm, at most about 0.001 atm, or less. In some cases (e.g., when operating at higher/elevated or lower pressures or to avoid contamination of the thermal storage media), the storage tanks can be sealed from the surrounding atmosphere. Alternatively, in some cases, the storage tanks may not be sealed. In some implementations, the tanks may include one or more pressure regulation or relief systems (e.g., a valve for safety or system optimization).

As used herein, the first hot side tank(s) 6 (at the temperature $T_1^+$) can contain HTS medium at a higher temperature than the second hot side tank(s) 7 (at the temperature $T_0^+$), and the first cold side tank(s) 8 (at the temperature $T_1$) can contain CTS medium at a higher temperature than the second cold side tank(s) 9 (at the temperature $T_0$). During charge, HTS medium in the first (higher temperature) hot side tank(s) 6 and/or CTS medium in the second (lower temperature) cold side tank(s) 9 can be replenished. During discharge, HTS medium in the first (higher temperature) hot side tank(s) 6 and/or CTS medium in the second (lower temperature) cold side tank(s) 9 can be consumed.

In the foregoing examples, in either mode of operation, two of the four storage tanks 6, 7, 8 and 9 are feeding thermal storage medium to the heat exchangers 2 and 4 at the inlets 32 and 36, respectively, and the other two tanks are receiving thermal storage medium from the heat exchangers 2 and 4 from the exits 33 and 37, respectively. In this configuration, the feed tanks can contain a storage medium at a given temperature due to prior operating conditions, while the receiving tanks' temperatures can depend on current system operation (e.g., operating parameters, loads and/or power input). The receiving tank temperatures may be set by the Brayton cycle conditions. In some cases, the receiving tank temperatures may deviate from desired values due to deviations from predetermined cycle conditions (e.g., variation of absolute pressure in response to system demand) and/or due to entropy generation within the system. In some cases (e.g., due to entropy generation), at least one of the four tank temperatures can be higher than desired. In some implementations, a radiator can be used to reject or dissipate this waste heat to the environment. In some cases, heat rejection to the environment may be enhanced (e.g., using evaporative cooling etc.). The waste heat generated during operation of the pumped thermal systems herein can also be utilized for other purposes. For example, waste heat from one part of the system may be used elsewhere in the system. In another example, waste heat may be provided to an external process or system, such as, for example, a manufacturing process requiring low grade heat, commercial or residential heating, thermal desalination, commercial drying operations etc.

Components of pumped thermal systems of the disclosure may exhibit non-ideal performance, leading to losses and/or inefficiencies. The major losses in the system may occur due to inefficiencies of the turbomachinery (e.g., compressor and turbine) and the heat exchangers. The losses due to the heat exchangers may be small compared to the losses due to the turbomachinery. In some implementations, the losses due to the heat exchangers can be reduced to near zero with suitable design and expense. Therefore, in some analytical examples, losses due to the heat exchangers and other possible small losses due to pumps, the motor/generator and/or other factors may be neglected.

Losses due to turbomachinery can be quantified in terms of adiabatic efficiencies $\eta_c$ and $\eta_t$ (also known as isentropic efficiencies) for compressors and turbines, respectively. For large turbomachinery, typical values may range between $\eta_c$=0.85-0.9 for compressors and $\eta_t$=0.9-0.95 for turbines. The actual amount of work produced or consumed by a cycle can then be expressed as $$\Delta W = W_{actual}^{(out)} - W_{actual}^{(in)} = \eta_t W_{ideal}^{(out)} - \frac{1}{\eta_c} W_{ideal}^{(in)},$$

where, in an example assuming constant specific heats of the working fluid, $W_{ideal}^{(in)} = c_p T_{inlet}(\psi - 1)$, $W_{ideal}^{(out)} = c_p T_{inlet}(1 - \psi^{-1})$, where $$\psi = r^{\frac{\gamma-1}{\gamma}},$$

r is the compression ratio (i.e., ratio of the higher pressure to the lower pressure), and $\gamma = c_p/c_v$ is the ratio of specific heats of the working fluid. Due to compressor and turbine inefficiencies, more work is required to achieve a given compression ratio during compression, and less work is generated during expansion for a given compression ratio. Losses can also be quantified in terms of the polytropic, or single stage, efficiencies, $\eta_{cp}$ and $\eta_{tp}$, for compressors and turbines, respectively. The polytropic efficiencies are related to the adiabatic efficiencies $\eta_c$ and $\eta_t$ by the equations $$\eta_c = \frac{\psi - 1}{\psi^{1/\eta_{cp}} - 1}$$

and $$\eta_t = \frac{1 - \psi^{-\eta_{tp}}}{1 - \psi^{-1}}.$$

In examples where $\eta_c = \eta_t = 1$, pumped thermal cycles of the disclosure can follow identical paths in both charge and discharge cycles (e.g., as shown in FIGS. 3A and 3B). In examples where $\eta_c < 1$ and/or $\eta_t < 1$, compression in the compressor can lead to a greater temperature increase than in the ideal case for the same compression ratio, and expansion in the turbine can lead to a smaller temperature decrease than in the ideal case.

In some implementations, the polytropic efficiency of the compressor $\eta_{cp}$ may be at least about 0.3, at least about 0.5, at least about 0.6, at least about 0.7, at least about 0.75, at least about 0.8, at least about 0.85, at least about 0.9, at least about 0.91, at least about 0.92, at least about 0.93, at least about 0.96, or more. In some implementations, the polytropic efficiency of the compressor $\eta_{tp}$ may be at least about 0.3, at least about 0.5, at least about 0.6, at least about 0.7, at least about 0.75, at least about 0.8, at least about 0.85, at least about 0.9, at least about 0.91, at least about 0.92, at least about 0.93, at least about 0.96, at least about 0.97 or more.

$T_0^+$, $T_1^+$ were previously defined as the temperatures achieved at the exit of a compressor with a given compression ratio r, adiabatic efficiency $\eta_c$ and inlet temperatures of $T_0$, $T_1$ respectively. In some examples, these four temperatures are related by the equation $$\frac{T_0^+}{T_0} = \frac{T_1^+}{T_1} = \psi^{1/\eta_{cp}}.$$

Figure 5A:
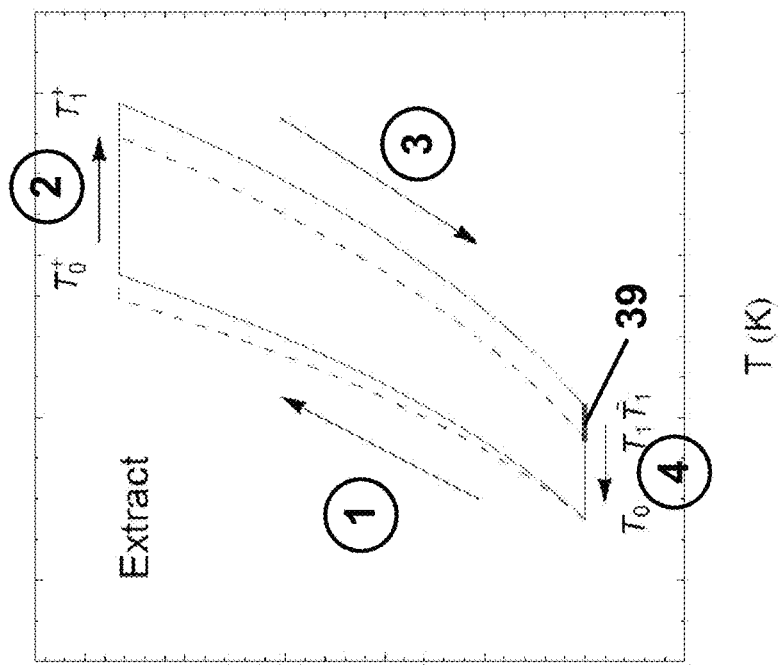
FIG. 5A shows a heat storage charge cycle for a water/molten salt system with $\eta_c=0.9$ and $\eta_t=0.95$. The dashed lines correspond to $\eta_c=\eta_t=1$.

FIG. 5A shows an exemplary heat storage charge cycle for a water (CTS)/molten salt (HTS) system with $\eta_c$=0.9 and $\eta_t$=0.95. The dashed lines correspond to $\eta_c = \eta_t = 1$ and the solid lines show the charge cycle with $\eta_t$=0.95 and $\eta_c$=0.9. In this example, the CTS medium on the cold side is water, and the HTS medium on the hot side is molten salt. In some cases, the system can include 4 heat storage tanks. In the charge cycle, the working fluid at $T_0$ and $P_2$ can exchange heat with a CTS medium in the cold side heat exchanger 4, whereby its temperature can increase to $T_1$ (assuming negligible pressure drop, its pressure can remain $P_2$). In the compressor 1 with $\eta_c$=0.9, the temperature and pressure of the working fluid can increase from $T_1$, $P_2$ to $T_1^+$, $P_1$. The working fluid can then exchange heat with an HTS medium in the hot side heat exchanger 2, such that its temperature can decrease (at constant pressure $P_1$, assuming negligible pressure drop). If the working fluid enters the turbine 3 with $\eta_t$=0.95 at the temperature $T_0^+$ and expands back to its original pressure $P_2$, its temperature when exiting the turbine may not be $T_0$. Instead, the working fluid may enter the turbine at a temperature $\tilde{T}_0^+$ and exit the turbine at the temperature $T_0$ and pressure $P_2$. In some examples, the temperatures are related by the relation $$\frac{\tilde{T}_0^+}{T_0} = \psi^{\eta_{tp}}.$$

In some examples, $\tilde{T}_0^+$ is the temperature at which the working fluid enters the inlet of a turbine with adiabatic efficiency $\eta_t$ and compression ratio r in order to exit at the temperature $T_0$.

In some implementations, the temperature $\tilde{T}_0^+$ may be incorporated into charge cycles of the disclosure by first heat exchanging the working fluid with the HTS medium from $T_1^+$ to $T_0^+$, followed by further cooling the working fluid from $T_0^+$ to $\tilde{T}_0^+$, as illustrated by section 38 of the cycle in FIG. 5A.

Figure 5B:
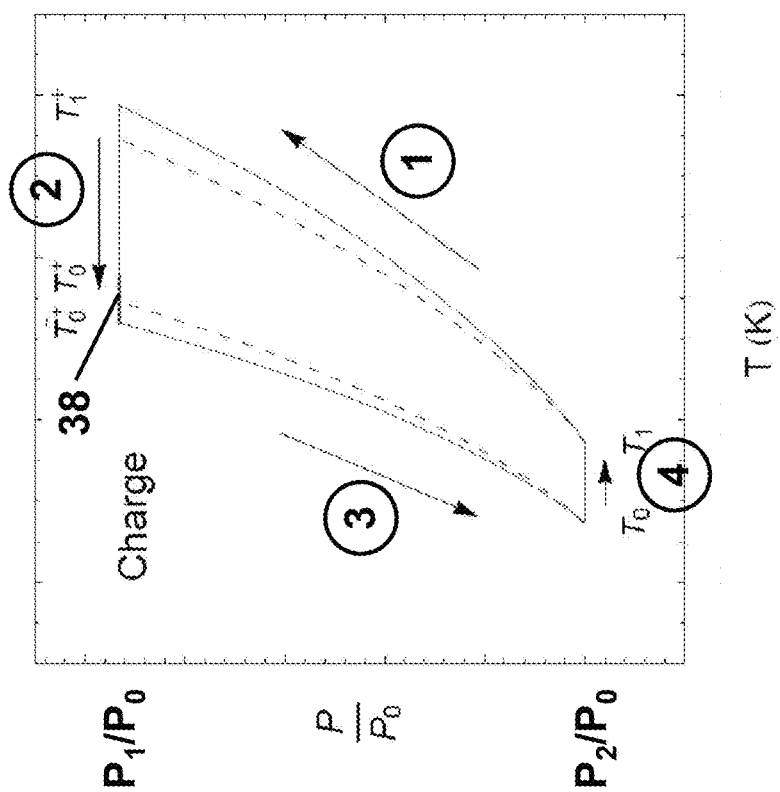
FIG. 5B shows a heat storage discharge (extraction) cycle for the water/molten salt system in FIG. 5A with $\eta_c=0.9$ and $\eta_t=0.95$. The dashed lines correspond to $\eta_c=\eta_t=1$.

FIG. 5B shows an exemplary heat storage discharge (extraction) cycle for the water/molten salt system in FIG. 5A with $\eta_c$=0.9 and $\eta_t$=0.95. The dashed lines correspond to $\eta_c=\eta_t=1$ and the solid lines show the charge cycle with $\eta_t=0.95$ and $\eta_c=0.9$. In the discharge cycle, the working fluid at $T_1$ and $P_2$ can exchange heat with a CTS medium in the cold side heat exchanger 4, whereby its temperature can decrease to $T_0$ (assuming negligible pressure drop, its pressure can remain $P_2$). In the compressor 1 with $\eta_c=0.9$, the temperature and pressure of the working fluid can increase from $T_0$, $P_2$ to $T_0^+$, $P_1$. The working fluid can then exchange heat with an HTS medium in the hot side heat exchanger 2, such that its temperature can increase (at constant pressure $P_1$, assuming negligible pressure drop). Working fluid entering the turbine 3 at $T_1^+$ may not exit the turbine at the temperature $T_1$ as in the charge cycle, but may instead exit at a temperature $\tilde{T}_1$, where, in some examples, $\tilde{T}_1 = T_1^+ \psi^{-\eta_{tp}}$. In some examples, $\tilde{T}_1$ is the temperature at which the working fluid exits the outlet of a turbine with adiabatic efficiency $\eta_t$ and compression ratio r after entering the inlet of the turbine at the temperature $T_1^+$.

In some implementations, the temperature $\tilde{T}_1$ may be incorporated into the discharge cycles of the disclosure by first cooling the working fluid exiting the turbine at $\tilde{T}_1$ to $T_1$, as illustrated by section 39 of the cycle in FIG. 5B, followed by heat exchanging the working fluid with the CTS medium form $T_1$ to $T_0$.

The charge and discharge cycles may be closed by additional heat rejection operations in sections 38 (between $T_0^+$ and $\tilde{T}_0^+$) and 39 (between $\tilde{T}_1$ and $T_1$), respectively. In some cases, closing the cycles through heat rejection in sections of the cycles where the working fluid can reject heat to ambient at low cost may eliminate the need for additional heat input into the system. The sections of the cycles where the working fluid can reject heat to ambient may be limited to sections where the temperature of the working fluid is high enough above ambient temperature for ambient cooling to be feasible. In some examples, heat may be rejected to the environment in sections 38 and/or 39. For example, heat may be rejected using one or more working fluid to air radiators, intermediate water cooling, or a number of other methods. In some cases, heat rejected in sections 38 and/or 39 may be used for another useful purpose, such as, for example, cogeneration, thermal desalination and/or other examples described herein.

Figure 5C:
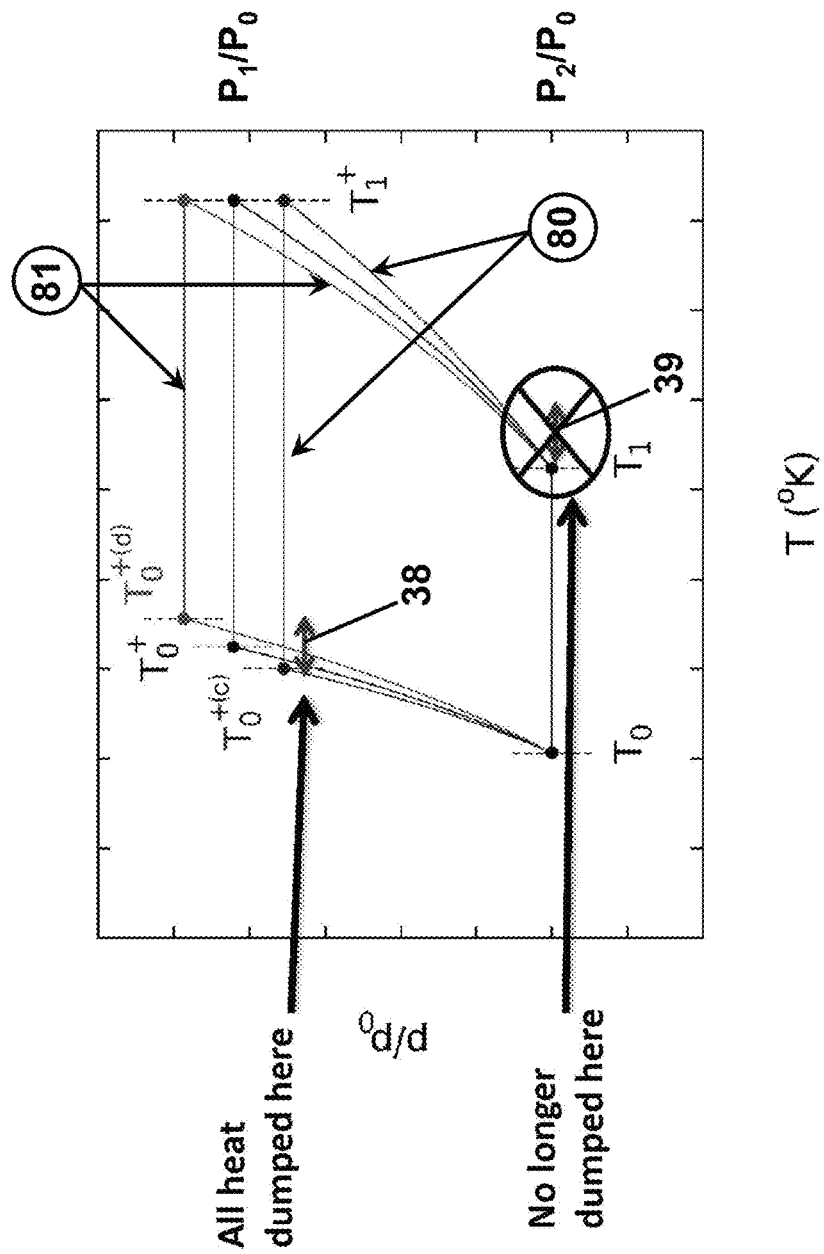
FIG. 5C shows a heat storage cycle in a pumped thermal system with variable compression ratios between the charge and discharge cycles.

In some implementations, the cycles may be closed by varying the compression ratios between the charge and discharge cycles, as shown, for example, in FIG. 5C. The ability to vary compression ratio on charge and discharge may be implemented, for example, by varying the rotation speed of the compressor and/or turbine, by variable stator pressure control, by bypassing a subset of the compression or expansion stages on charge or discharge by the use of valves, or by using dedicated compressor/turbine pairs for charge and discharge mode. In one example, the compression ratio in the discharge cycle in FIG. 5B can be changed such that heat rejection in section is 39 is not used, and only heat rejection in section 38 in the charge cycle is used. Varying the compression ratio may allow heat (i.e., entropy) to be rejected at a lower temperature, thereby increasing overall roundtrip efficiency. In some examples of this configuration, the compression ratio on charge, $r_C$, can be set such that $$\frac{T_1^+}{T_1} = \psi_C^{1/\eta_{cp}},$$

and on discharge, the compression ratio $r_D$ can be set such that $$\frac{T_1^+}{T_1} = \psi_D^{\eta_{tp}}.$$

In some cases, the upper temperatures $T_1^+$ and $T_1$ can be identical on charge and discharge and no heat removal may be needed in this portion (also "leg" herein) of the cycle. In such cases, the temperature $T_0^+$ on charge (e.g., $T_0^{+(c)} = T_0 \psi_C^{\eta_{cp}}$) and the temperature $T_0^+$ on discharge (e.g., $T_0^{+(d)} = T_0 \psi_D^{1/\eta_{cp}}$) can be dissimilar and heat may be rejected (also "dissipated" or "dumped" herein) to the environment between the temperatures $T_0^{+(c)}$ and $T_0^{+(d)}$. In an implementation where only the storage media exchange heat with the environment, a heat rejection device (e.g., devices 55 and 56 shown in FIG. 7D) can be used to lower the temperature of the CTS from $T_0^{+(d)}$ to $T_0^{+(c)}$ between discharge and charge.

FIG. 5C shows an example of a cycle with variable compression ratios. The compression ratio can be higher on discharge (when work is produced by the system) than on charge (when work is consumed by the system), which may increase an overall round trip efficiency of the system. For example, during a charge cycle 80 with $T_0^{+(c)}$, a lower compression ratio of <3 can be used; during a discharge cycle 81 with $T_0^{+(d)}$, a compression ratio of >3 can be used. The upper temperatures reached in both cycles 80 and 81 can be $T_1$ and $T_1^+$, and no excess heat may be rejected.

The compression ratio may be varied between charge and discharge such that the heat dissipation to the environment needed for closing the cycle on both charge and discharge occurs between the temperatures $T_0^{+(c)}$ (the temperature of the working fluid before it enters the turbine during the charge cycle) and $T_0^{+(D)}$ (the temperature of the working fluid as it exits the compressor on discharge) and not above the temperature $T_1$ (the temperature of the working fluid before it enters the compressor on charge and/or exits the turbine on discharge). In some examples, none of the heat is rejected at a temperature above the lowest temperature of the HTS medium.

In the absence of system losses and/or inefficiencies, such as, for example, in the case of pumped thermal systems comprising heat pump(s) and heat engine(s) operating at the Carnot limit, a given amount of heat $Q_H$ can be transferred using a given quantity of work W in heat pump (charge) mode, and the same $Q_H$ can be used in heat engine (discharge) mode to produce the same work W, leading to a unity (i.e., 100%) roundtrip efficiency. In the presence of system losses and/or inefficiencies, roundtrip efficiencies of pumped thermal systems may be limited by how much the components deviate from ideal performance.

The roundtrip efficiency of a pumped thermal system may be defined as $\eta_{store} = |W_{cv}^{extract}|/|W_{cv}^{charge}|$. In some examples, with an approximation of ideal heat exchange, the roundtrip efficiency can be derived by considering the net work output during the discharge cycle, $$|W_{cv}^{extract}| = \eta_t W_{ideal}^{out} - \frac{W_{ideal}^{in}}{\eta_c},$$

and the net work input during the charge cycle, $$|W_{cv}^{charge}| = \frac{W_{ideal}^{in}}{\eta_c} - \eta_t W_{ideal}^{out}$$

using the equations for work and temperature given above.

Roundtrip efficiencies may be calculated for different configurations of pumped thermal systems (e.g., for different classes of thermal storage media) based on turbomachinery component efficiencies, $\eta_c$ and $\eta_t$.

Figure 6A:
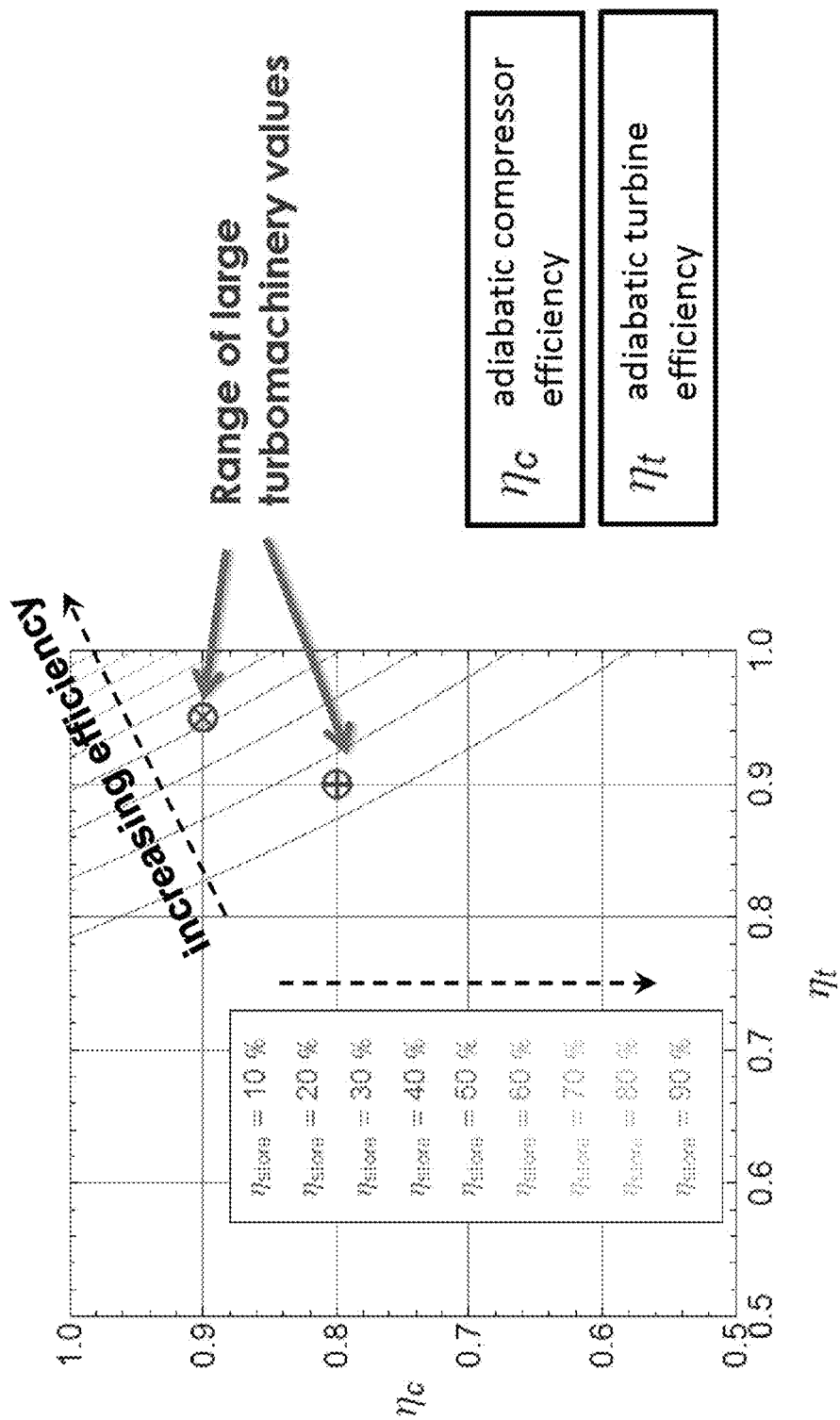
FIG. 6A shows roundtrip efficiency contours for a water/salt system. The symbols ⊕ and ⊗ represent an approximate range of present large turbomachinery adiabatic efficiency values. The dashed arrows represent the direction of increasing efficiency.

In one example, FIG. 6A shows roundtrip efficiency contours for a water/salt system, such as, for example, the water/salt system in FIGS. 5A and 5B with $T_0$=273 K (0° C.), $T_1$=373 K (100° C.) and a compression ratio of r=5.65 chosen to achieve compatibility with the salt(s) on the hot side. Exemplary roundtrip efficiency contours at values of $\eta_{store}$ of 10%, 20%, 30%, 40%, 50%, 60%, 70%, 80% and 90% are shown as a function of component efficiencies $\eta_c$ and $\eta_t$ on the x- and y-axes, respectively. The symbols ⊕ and ⊗ represent the approximate range of present large turbomachinery adiabatic efficiency values. The dashed arrows represent the direction of increasing efficiency.

Figure 6B:
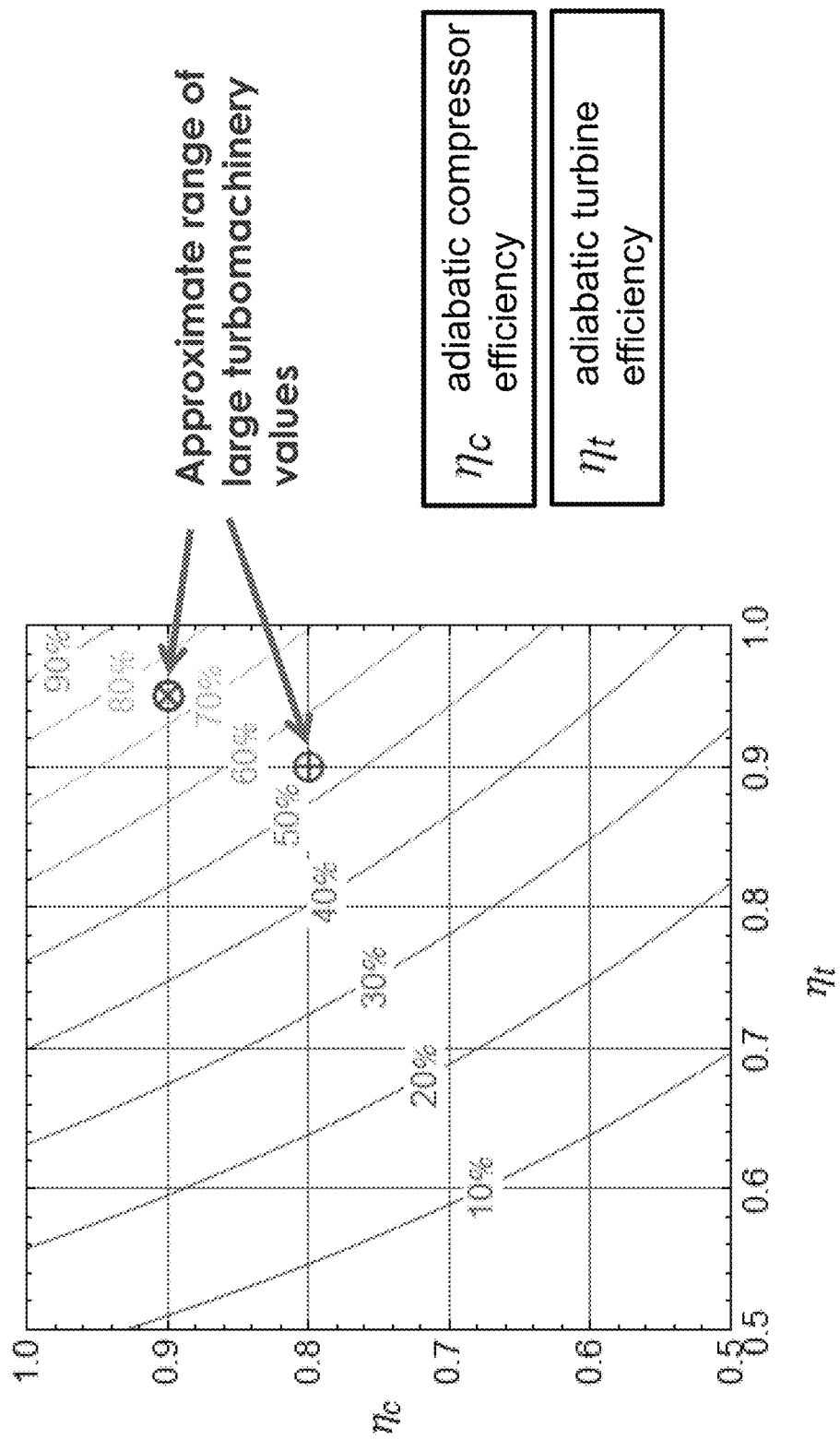
FIG. 6B shows roundtrip efficiency contours for a colder storage/salt system. The symbols ⊕ and ⊗ represent an approximate range of present large turbomachinery adiabatic efficiency values.

FIG. 6B shows roundtrip efficiency contours for a colder storage/salt system, such as, for example a hexane/salt system with a gas-gas heat exchanger in FIGS. 7A, 7B, 8A and 8B with $T_0$=194 K (−79° C.), $T_1$=494 K (221° C.) and a compression ratio of r=3.28. Exemplary roundtrip efficiency contours at values of $\eta_{store}$ of 10%, 20%, 30%, 40%, 50%, 60%, 70%, 80% and 90% are shown as a function of component efficiencies $\eta_c$ and $\eta_t$ on the x- and y-axes, respectively. The symbols ⊕ and ⊗ represent the approximate range of present large turbomachinery adiabatic efficiency values. As discussed in detail elsewhere herein, using hexane, heptane and/or another CTS medium capable of low temperature operation may result in significant improvements of system efficiency.

Pumped Thermal Storage Cycles with Recuperation

Another aspect of the disclosure is directed to pumped thermal systems with regeneration/recuperation. In some situations, the terms regeneration and recuperation can be used interchangeably, although they may have different meanings. As used herein, the terms "recuperation" and "recuperator" generally refer to the presence of one or more additional heat exchangers where the working fluid exchanges heat with itself during different segments of a thermodynamic cycle through continuous heat exchange without intermediate thermal storage. As used herein, the terms "regeneration" and "regenerator" may be used to describe the same configuration as the terms "recuperation" and "recuperator." The roundtrip efficiency of pumped thermal systems may be substantially improved if the allowable temperature ranges of the storage materials can be extended. In some implementations, this may be accomplished by choosing a material or medium on the cold side that can go to temperatures below 273 K (0° C.). For example, a CTS medium (e.g., hexane) with a low temperature limit of approximately $T_0$=179 K (−94° C.) may be used in a system with a molten salt HTS medium. However, $T_0^+$ (i.e., the lowest temperature of the working fluid in the hot side heat exchanger) at some (e.g., modest) compression ratios may be below the freezing point of the molten salt, making the molten salt unviable as the HTS medium. In some implementations, this can be resolved by including a working fluid to working fluid (e.g., gas-gas) heat exchanger (also "recuperator" or "regenerator" herein) in the cycle.

Figure 7A:
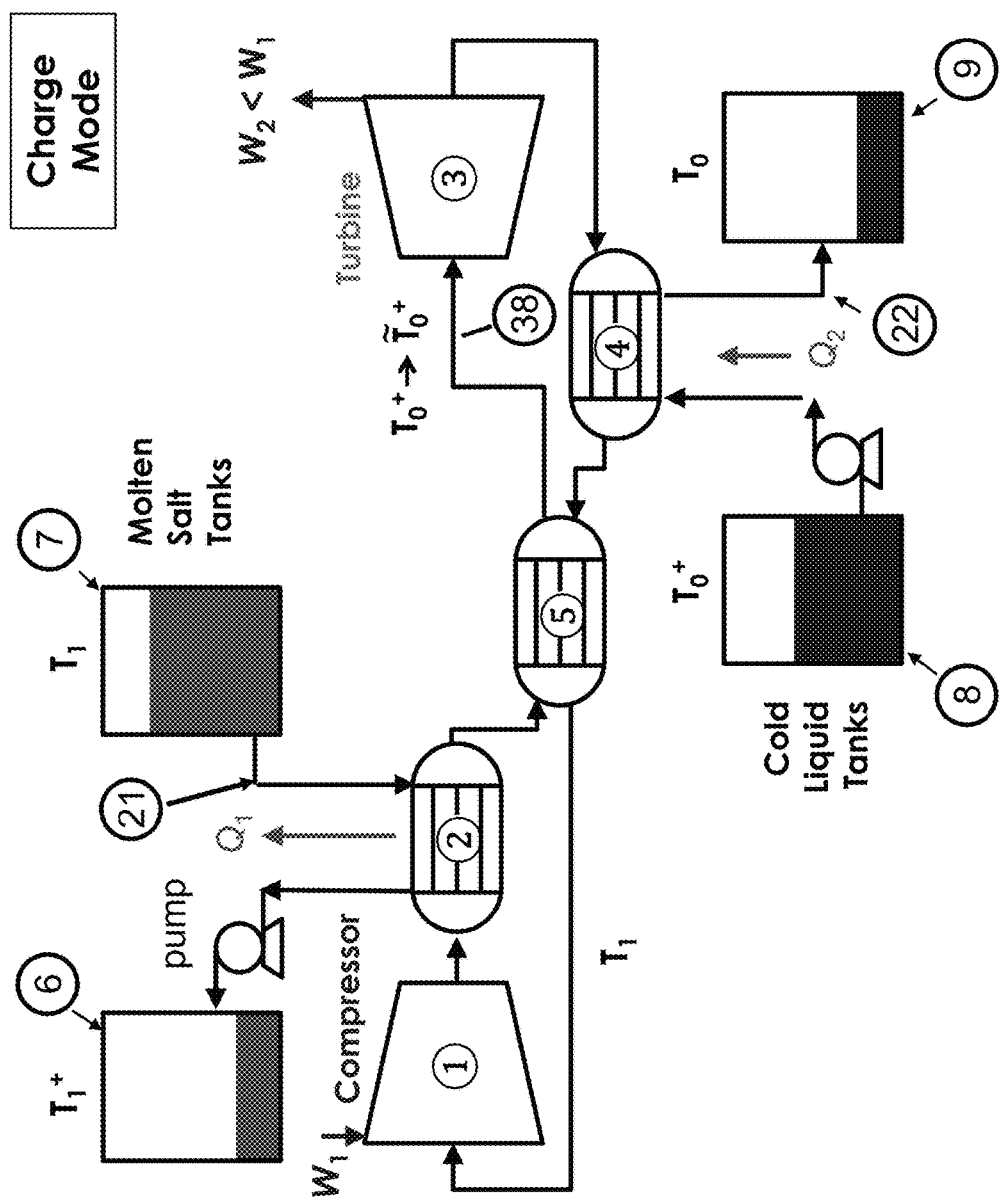
FIG. 7A is a schematic flow diagram of working fluid and heat storage media of a pumped thermal system with a gas-gas heat exchanger for the working fluid in a charge/heat pump mode.

FIG. 7A is a schematic flow diagram of working fluid and heat storage media of a pumped thermal system in a charge/heat pump mode with a gas-gas heat exchanger 5 for the working fluid. The use of the gas-gas heat exchanger can enable use of colder heat storage medium on the cold side of the system. The working fluid can be argon. The working fluid can be a mixture of primarily argon mixed with another gas such as helium. For example, the working fluid may comprise at least about 50% argon, at least about 60% argon, at least about 70% argon, at least about 80% argon, at least about 90% argon, or about 100% argon, with balance helium.

Figure 8B:
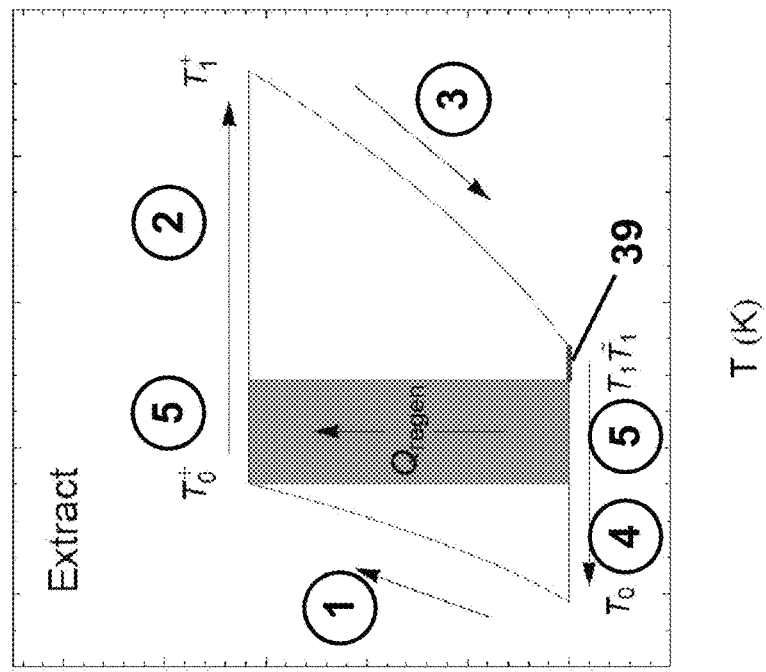
FIG. 8B shows a heat storage discharge cycle for a storage system with a gas-gas heat exchanger, a cold side storage medium capable of going down to temperatures significantly below ambient temperature and $\eta_c=0.9$ and $\eta_t=0.95$.
Figure 8A:
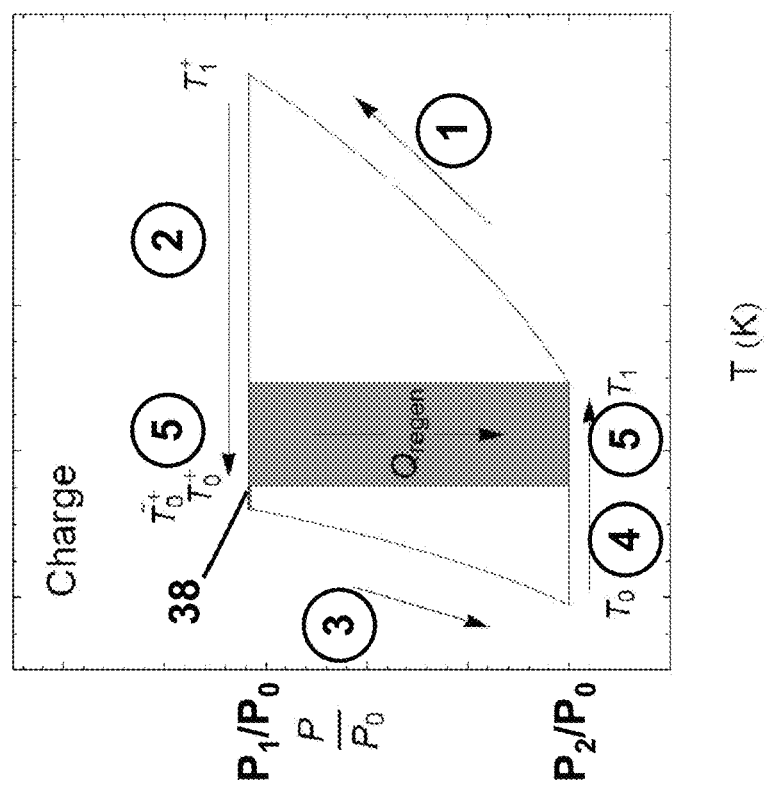
FIG. 8A shows a heat storage charge cycle for a storage system with a gas-gas heat exchanger, a cold side storage medium capable of going down to temperatures significantly below ambient temperature and $\eta_c=0.9$ and $\eta_t=0.95$.

FIG. 8A shows a heat storage charge cycle for the storage system in FIG. 7A with a cold side storage medium (e.g., liquid hexane) capable of going down to approximately to 179 K (−94° C.) and a molten salt as the hot side storage, and $\eta_c$=0.9 and $\eta_t$=0.95. The CTS medium can be hexane or heptane and the HTS medium can be molten salt. In some cases, the system can include four heat storage tanks.

In one implementation, during charge in FIGS. 7A and 8A, the working fluid enters the compressor at $T_1$ and $P_2$, exits the compressor at $T_1^+$ and $P_1$, rejects heat $Q_1$ to the HTS medium 21 in the hot side CFX 2, exiting the hot side CFX 2 at $T_1$ and $P_1$, rejects heat $Q_{recup}$ (also "$W_{regen}$" herein, as shown, for example, in the accompanying drawings) to the cold (low pressure) side working fluid in the heat exchanger or recuperator 5, exits the recuperator 5 at $T_0^+$ and $P_1$, rejects heat to the environment (or other heat sink) in section 38 (e.g., a radiator), enters the turbine 3 at $\tilde{T}_0^+$ and $P_1$, exits the turbine at $T_0$ and $P_2$, absorbs heat $Q_2$ from the CTS medium 22 in the cold side CFX 4, exiting the cold side CFX 4 at $T_0^+$ and $P_2$, absorbs heat $Q_{recup}$ from the hot (high pressure) side working fluid in the heat exchanger or recuperator 5, and finally exits the recuperator 5 at $T_1$ and $P_2$, returning to its initial state before entering the compressor.

Figure 7B:
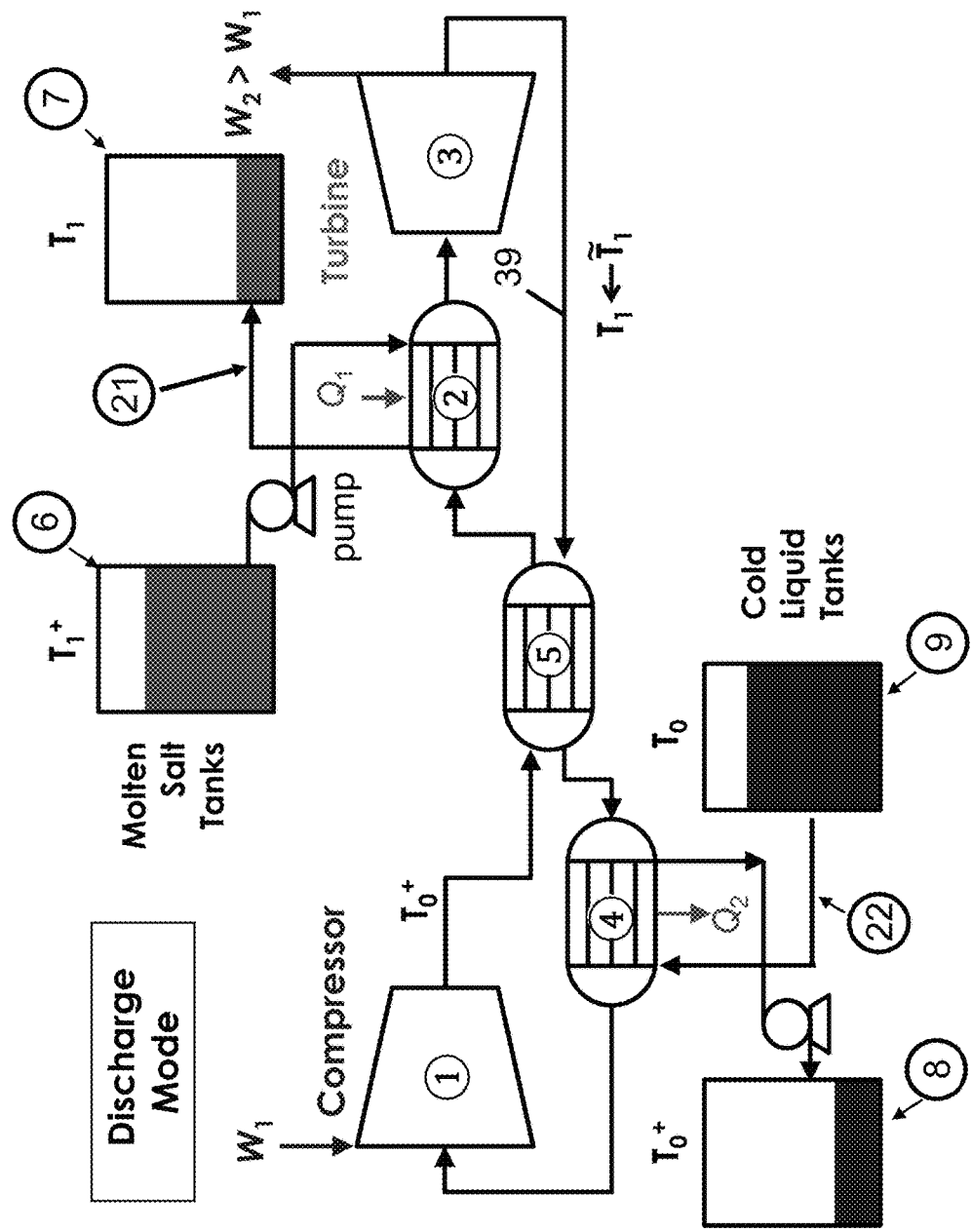
FIG. 7B is a schematic flow diagram of working fluid and heat storage media of a pumped thermal system with a gas-gas heat exchanger for the working fluid in a discharge/heat engine mode.

FIG. 7B is a schematic flow diagram of working fluid and heat storage media of the pumped thermal system in FIG. 7A in a discharge/heat engine mode. Again, the use of the gas-gas heat exchanger can enable use of colder heat storage fluid (CTS) and/or colder working fluid on the cold side of the system.

FIG. 8B shows a heat storage discharge cycle for the storage system for the storage system in FIG. 7B with a cold side storage medium (e.g., liquid hexane) capable of going down to 179 K (−94° C.) and a molten salt as the hot side storage, and $\eta_c$=0.9 and $\eta_t$=0.95. Again, the CTS medium can be hexane or heptane and the HTS medium can be molten salt, and the system may include 4 heat storage tanks.

During discharge in FIGS. 7B and 8B, the working fluid enters the compressor at $T_0$ and $P_2$, exits the compressor at $T_0^+$ and $P_1$, absorbs heat $Q_{recup}$ from the cold (low pressure) side working fluid in the heat exchanger or recuperator 5, exits the recuperator 5 at $T_1$ and $P_1$, absorbs heat $Q_1$ from the HTS medium 21 in the hot side CFX 2, exiting the hot side CFX 2 at $T_1^+$ and $P_1$, enters the turbine 3 at $T_1^+$ and $P_1$, exits the turbine at $\tilde{T}_1$ and $P_2$, rejects heat to the environment (or other heat sink) in section 39 (e.g., a radiator), rejects heat $Q_{recup}$ to the hot (high pressure) side working fluid in the heat exchanger or recuperator 5, enters the cold side CFX 4 at $T_0^+$ and $P_2$, rejects heat $Q_2$ to the CTS medium 22 in the cold side CFX 4, and finally exits the cold side CFX 4 at $T_0$ and $P_2$, returning to its initial state before entering the compressor.

Figure 7C:
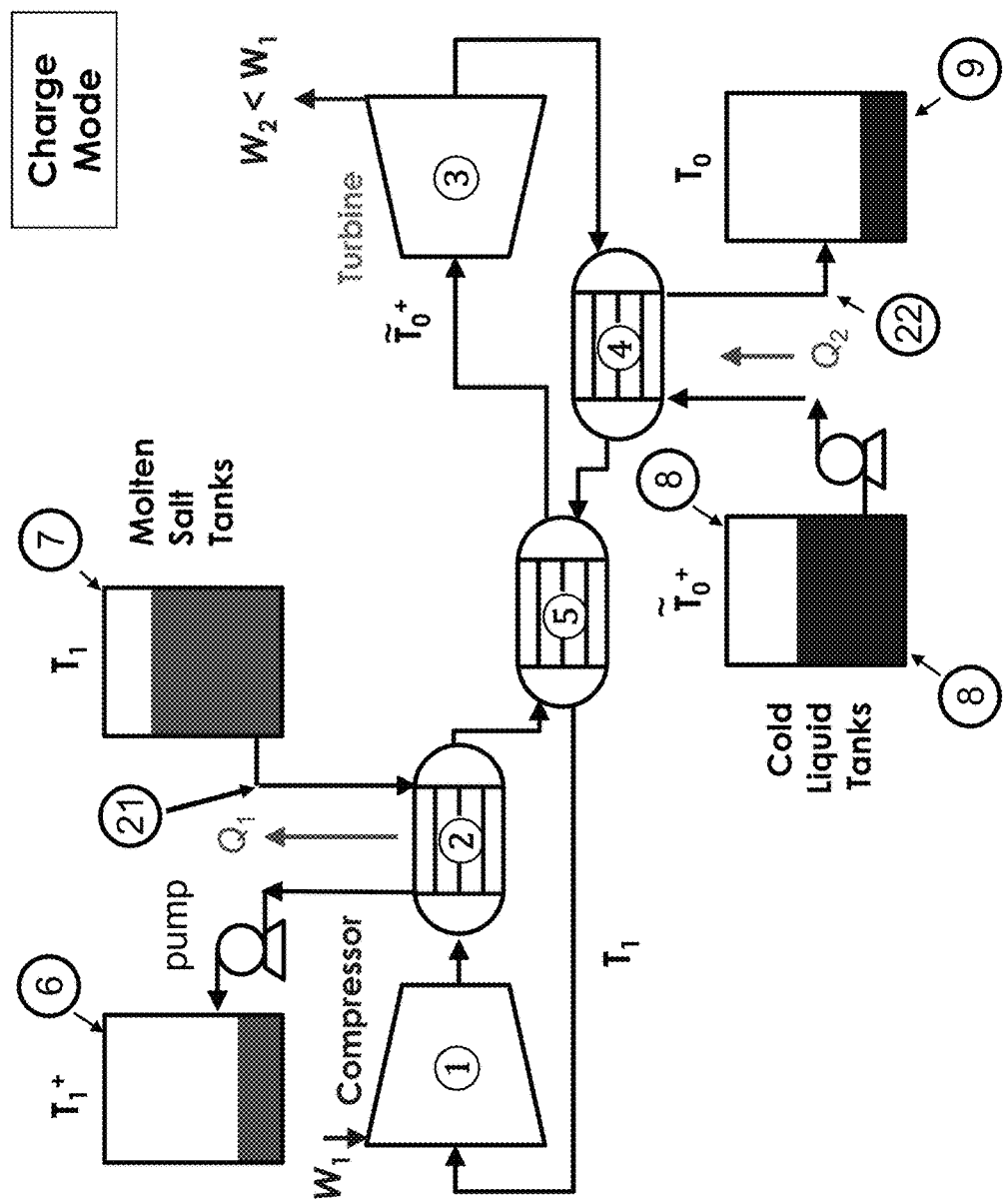
FIG. 7C is a schematic flow diagram of working fluid and heat storage media of a pumped thermal system with a gas-gas heat exchanger for the working fluid in a charge/heat pump mode with indirect heat rejection to the environment.

In another implementation, shown in FIG. 7C, the charge cycle remains the same as in FIGS. 7A and 8A, except that the working fluid exits the recuperator 5 at $\tilde{T}_0^+$ and $P_1$ (instead of at $T_0^+$ and $P_1$ as in FIGS. 7A and 8A), enters the turbine 3 at $\tilde{T}_0^+$ and $P_1$, exits the turbine at $T_0$ and $P_2$, absorbs heat $Q_2$ from the CTS medium 22 having a temperature $\tilde{T}_0^+$ (instead of at $T_0^+$ as in FIGS. 7A and 8A) in the cold side CFX 4, and exits the cold side CFX 4 at $\tilde{T}_0^+$ and $P_2$ (instead of at $T_0^+$ and $P_2$ as in FIG. 7A) before reentering the recuperator 5. The heat between temperatures $\tilde{T}_0^+$ and $\tilde{T}_0^+$ is no longer rejected from the working fluid to the environment directly (as in section 38 in FIGS. 7A and 8A).

Figure 7D:
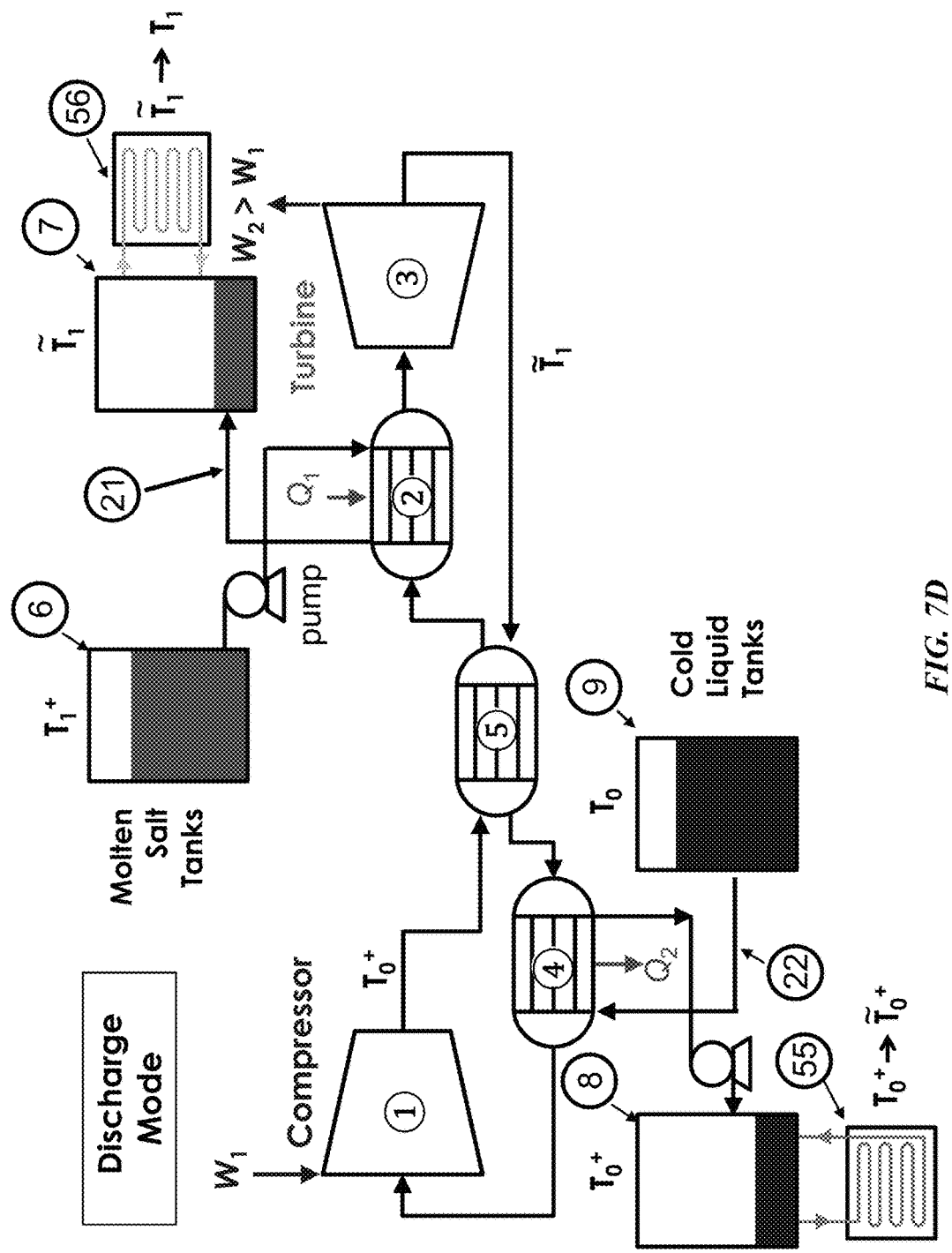
FIG. 7D is a schematic flow diagram of working fluid and heat storage media of a pumped thermal system with a gas-gas heat exchanger for the working fluid in a discharge/heat engine mode with indirect heat rejection to the environment.

During discharge in FIG. 7D, the discharge cycle remains the same as in FIGS. 7B and 8B, except that the temperature of the HTS medium being deposited in tank 7 is changed. The working fluid exits the recuperator 5 at $\tilde{T}_1$ and $P_1$ (instead of at $T_1$ and $P_1$ as in FIGS. 7B and 8B) and absorbs heat $Q_1$ from the HTS medium 21 in the hot side CFX 2. The HTS medium exits the hot side CFX 2 having a temperature $\tilde{T}_1$ (instead of at $T_1$ as in FIGS. 7B and 8B). The working fluid then exits the hot side CFX 2 at $T_1^+$ and $P_1$, enters the turbine 3 at $T_1^+$ and $P_1$, and exits the turbine at $\tilde{T}_1$ and $P_2$ before reentering the recuperator 5. The heat between temperatures $\tilde{T}_1$ and $T_1$ is no longer rejected from the working fluid to the environment directly (as in section 39 in FIGS. 7B and 8B). As in FIG. 7B, the CTS medium enters the tank 8 at temperature $T_0^+$.

After the discharge in FIG. 7D, in preparation for the charge in FIG. 7C, heat exchange with ambient may be used to cool the HTS medium 21 from the temperature $\tilde{T}_1$ used in the discharge cycle to the temperature $T_1$ used in the charge cycle. Similarly, heat exchange with ambient may be used to cool the CTS medium 22 from the temperature $T_0^+$ used in the discharge cycle to the temperature $\tilde{T}_0^+$ used in the charge cycle. Unlike in the configuration in FIGS. 7A and 7B, where the working fluid may need to reject a substantial amount of heat (in sections 38 and 39, respectively) at a fast rate, in this configuration, the hot side and cold side storage media may be cooled at an arbitrarily slow rate (e.g., by radiating away or by other means of giving off the heat to the environment).

As shown in FIG. 7D, in some implementations, heat can be rejected from the CTS medium to the environment by circulating the CTS medium in the tank 8 in a heat rejection device 55 that can absorb heat from the CTS medium and reject heat to the environment until the CTS medium cools from the temperature $T_0^+$ to the temperature $\tilde{T}_0^+$. In some examples, the heat rejection device 55 can be, for example, a radiator, a thermal bath containing a substance such as water or salt water, or a device immersed in a natural body of water such as a lake, river or ocean. In some examples, the heat rejection device 55 can also be an air cooling apparatus, or a series of pipes which are thermally connected to a solid reservoir (e.g., pipes embedded in the ground).

Similarly, in some implementations, heat can be rejected from the HTS medium to the environment by circulating the HTS in the tank 7 in a heat rejection device 56 that can absorb heat from the HTS medium and reject heat to the environment until the HTS medium cools from the temperature $\tilde{T}_1$ to the temperature $T_1$. In some examples, the heat rejection device 56 can be, for example, a radiator, a thermal bath containing a substance such as water or salt water, or a device immersed in a natural body of water such as a lake, river or ocean. In some examples, the heat rejection device 56 can also be an air cooling apparatus or a series of pipes which are thermally connected to a solid reservoir (e.g., pipes embedded in the ground).

In some implementations, rejecting heat to ambient through the use of the thermal storage media may be used in conjunction with the variable compression ratio charge and/or discharge cycles described, for example, in FIG. 5C. In this system, only the CTS medium may exchange heat with ambient. Such a system can also be implemented with a recuperator to extend the temperature ranges of the HTS and CTS media in the cycles.

In some implementations, three separate cold side storage tanks at respective temperatures $T_0$, $\tilde{T}_0^+$ and $T_0^+$ may be used (e.g., an extra tank may be used in addition to the tanks 8 and 9). During heat exchange in the cold side CFX 4 in the discharge cycle, heat from the working fluid exiting the recuperator 5 may be transferred to the CTS medium in the $T_0^+$-tank. The CTS medium may be cooled in/by, for example, the heat rejection device 55 prior to entering the $\tilde{T}_0^+$-tank. In some implementations, three separate hot side storage tanks at respective temperatures $T_1$, $\tilde{T}_1$ and $T_1^+$ may be used (e.g., an extra tank may be used in addition to the tanks 6 and 7). During heat exchange in the hot side CFX 2 in the discharge cycle, heat from the working fluid exiting the recuperator 5 may be transferred to the HTS medium in the $\tilde{T}_1$-tank. The HTS medium may be cooled in/by, for example, the heat rejection device 56 prior to entering the $T_1$-tank. Heat rejection to the environment in such a manner may present several advantages. In a first example, it may eliminate the need for a potentially expensive working fluid to ambient heat exchanger that is capable of absorbing heat from the working fluid at a rate proportional to the power input/output of the system. The HTS and CTS media may instead reject heat over extended time periods, thus reducing the cost of the cooling infrastructure. In a second example, it may allow the decision regarding when heat is rejected to the environment to be delayed such that heat exchange to ambient may be performed when temperature (e.g., the ambient temperature) is most favorable.

In the charge and discharge cycles of FIGS. 7A and 8A, and FIGS. 7B and 8B, respectively, the same compression ratios and temperature values are used for both charge and discharge. In this configuration, the roundtrip efficiency can be about $\eta_{store}$=74%, as given by $T_0$=194 K (−79° C.), $T_1$=494 K (221° C.). $\eta_t$=0.95, $\eta_c$=0.9 and r=3.3.

Thus, in some examples involving working fluid to working fluid recuperation, heat rejection on the hot side (high pressure) side of the closed charge cycle can take place in three operations (heat exchange with the HTS medium, followed by recuperation, followed by heat rejection to the environment), and heat rejection on the cold side (low pressure) side of the closed discharge cycle can take place in three operations (heat rejection to the environment, followed by recuperation, followed by heat exchange with the CTS medium). As a result of recuperation, the higher temperature HTS tank(s) 6 can remain at $T_1^+$ while the lower temperature HTS tank(s) 7 can now be at the temperature $T_1 > T_0^+$, and the lower temperature CTS tank(s) 9 can remain at $T_0$ while the higher temperature CTS tank(s) 8 can now be at the temperature $T_0^+ < T_1$.

In some cases, recuperation may be implemented using the heat exchanger 5 for direct transfer of heat between the working fluid on the high pressure side and the working fluid on the low pressure side. In an alternative configuration, an additional pair (or plurality) of heat exchangers together with an additional heat transfer medium or fluid (e.g., a dedicated thermal heat transfer fluid that is liquid in an appropriate temperature range, such as, for example, therminol) may be used to achieve recuperation. For example, an additional heat exchanger may be added in series with the cold side heat exchanger and an additional heat exchanger may be added in series with the hot side heat exchanger. The additional heat transfer medium may circulate between the two additional heat exchangers in a closed loop. In other examples, one or more additional heat exchangers may be placed elsewhere in the system to facilitate recuperation. Further, one or more additional heat transfer media or mixtures thereof may be used. The one or more additional heat transfer media fluids may be in fluid or thermal communication with one or more other components, such as, for example, a cooling tower or a radiator.

In one example, hexane or heptane can be used as a CTS medium, and nitrate salt can be used as an HTS medium. On the low pressure side of the cycle, the operating temperatures of the pumped thermal storage cycles may be limited by the melting point of hexane (178 K or −95° C.) at $T_0$ and by the melting point of the nitrate (494 K or 221° C.) at $T_1$. On the high pressure side of the cycle, the operating temperatures may be limited by the boiling point of hexane (341 K or 68° C.) at $T_0^+$ and by the decomposition of nitrate (873 K or 600° C.) at $T_1^+$. At these conditions, the high pressure and low pressure temperature ranges can overlap such that recuperation can be implemented. The actual temperatures $T_0$, $T_1$, $T_0^+$ and $T_1^+$ and pressure ratios implemented in hexane/nitrate systems may differ from the limits above.

In some examples, recuperation may enable the compression ratio to be reduced. In some cases, reducing the compression ratio may result in reduced compressor and turbine losses. In some cases, the compression ratio may be at least about 1.2, at least about 1.5, at least about 2, at least about 2.5, at least about 3, at least about 3.5, at least about 4, at least about 4.5, at least about 5, at least about 6, at least about 8, at least about 10, at least about 15, at least about 20, at least about 30, or more.

In some cases, $T_0$ may be at least about 30 K, at least about 50 K, at least about 80 K, at least about 100 K, at least about 120 K, at least about 140 K, at least about 160 K, at least about 180 K, at least about 200 K, at least about 220 K, at least about 240 K, at least about 260 K, or at least about 280 K. In some cases, $T_0^+$ may be at least about 220 K, at least about 240 K, at least about 260 K, at least about 280 K, at least about 300 K, at least about 320 K, at least about 340 K, at least about 360 K, at least about 380 K, at least about 400 K, or more. In some cases, the temperatures $T_0$ and $T_0^+$ can be constrained by the ability to reject excess heat to the environment at ambient temperature. In some cases. the temperatures $T_0$ and $T_0^+$ can be constrained by the operating temperatures of the CTS (e.g., a phase transition temperature). In some cases, the temperatures $T_0$ and $T_0^+$ can be constrained by the compression ratio being used. Any description of the temperatures $T_0$ and/or $T_0^+$ herein may apply to any system or method of the disclosure.

In some cases, $T_1$ may be at least about 350K, at least about 400 K, at least about 440 K, at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, or more. In some cases, $T_1^+$ may be at least about 480 K, at least about 520 K, at least about 560 K, at least about 600 K, at least about 640 K, at least about 680 K, at least about 720 K, at least about 760 K, at least about 800 K, at least about 840 K, at least about 880 K, at least about 920 K, at least about 960 K, at least about 1000 K, at least about 1100 K, at least about 1200 K, at least about 1300 K, at least about 1400 K, at least about 1500 K, at least about 1600 K, at least about 1700 K, or more. In some cases. the temperatures $T_1$ and $T_1^+$ can be constrained by the operating temperatures of the HTS. In some cases. the temperatures $T_1$ and $T_1^+$ can be constrained by the thermal limits of the metals and materials being used in the system. For example, a conventional solar salt can have a recommended temperature range of approximately 560-840 K. Various system improvements, such as, for example, increased roundtrip efficiency, increased power and increased storage capacity may be realized as available materials, metallurgy and storage materials improve over time and enable different temperature ranges to be achieved. Any description of the temperatures $T_1$ and/or $T_1^+$ herein may apply to any system or method of the disclosure.

In some cases, the roundtrip efficiency $\eta_{store}$ (e.g., electricity storage efficiency) with and/or without recuperation can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some implementations, at least a portion of heat transfer in the system (e.g., heat transfer to and from the working fluid) during a charge and/or discharge cycle includes heat transfer with the environment (e.g., heat transfer in sections 38 and 39). The remainder of the heat transfer in the system can occur through thermal communication with thermal storage media (e.g., thermal storage media 21 and 22), through heat transfer in the recuperator 5 and/or through various heat transfer processes within system boundaries (i.e., not with the surrounding environment). In some examples, the environment may refer to gaseous or liquid reservoirs surrounding the system (e.g., air, water), any system or medium capable of exchanging thermal energy with the system (e.g., another thermodynamic cycle or system, heating/cooling systems, etc.), or any combination thereof. In some examples, heat transferred through thermal communication with the heat storage media can be at least about 25%, at least about 50%, at least about 60%, at least about 70%, at least about 80%, or at least about 90% of all heat transferred in the system. In some examples, heat transferred through heat transfer in the recuperator can be at least about 5%, at least about 10%, at least about 15%, at least about 20%, at least about 25%, at least about 50%, or at least about 75% of all heat transferred in the system. In some examples, heat transferred through thermal communication with the heat storage media and through heat transfer in the recuperator can be at least about 25%, at least about 50%, at least about 60%, at least about 70%, at least about 80%, at least about 90%, or even about 100% of all heat transferred in the system. In some examples, heat transferred through heat transfer with the environment can be less than about 5%, less than about 10%, less than about 15%, less than about 20%, less than about 30%, less than about 40%, less than about 50%, less than about 60%, less than about 70%, less than about 80%, less than about 90%, less than about 100%, or even 100% of all heat transferred in the system. In some implementations, all heat transfer in the system may be with the thermal storage media (e.g., the CTS and HTS media), and only the thermal storage media may conduct heat transfer with the environment.

Pumped thermal cycles of the disclosure (e.g., the cycles in FIGS. 7A and 7B) may be implemented through various configurations of pipes and valves for transporting the working fluid between the turbomachinery and the heat exchangers. In some implementations, a valving system may be used such that the different cycles of the system can be interchanged while maintaining the same or nearly the same temperature profile across at least one, across a subset or across all of counter-flow heat exchangers in the system. For example, the valving may be configured such that the working fluid can pass through the heat exchangers in opposite flow directions on charge and discharge and flow directions of the HTS and CTS media are reversed by reversing the direction of the pumps.

Figure 7E:
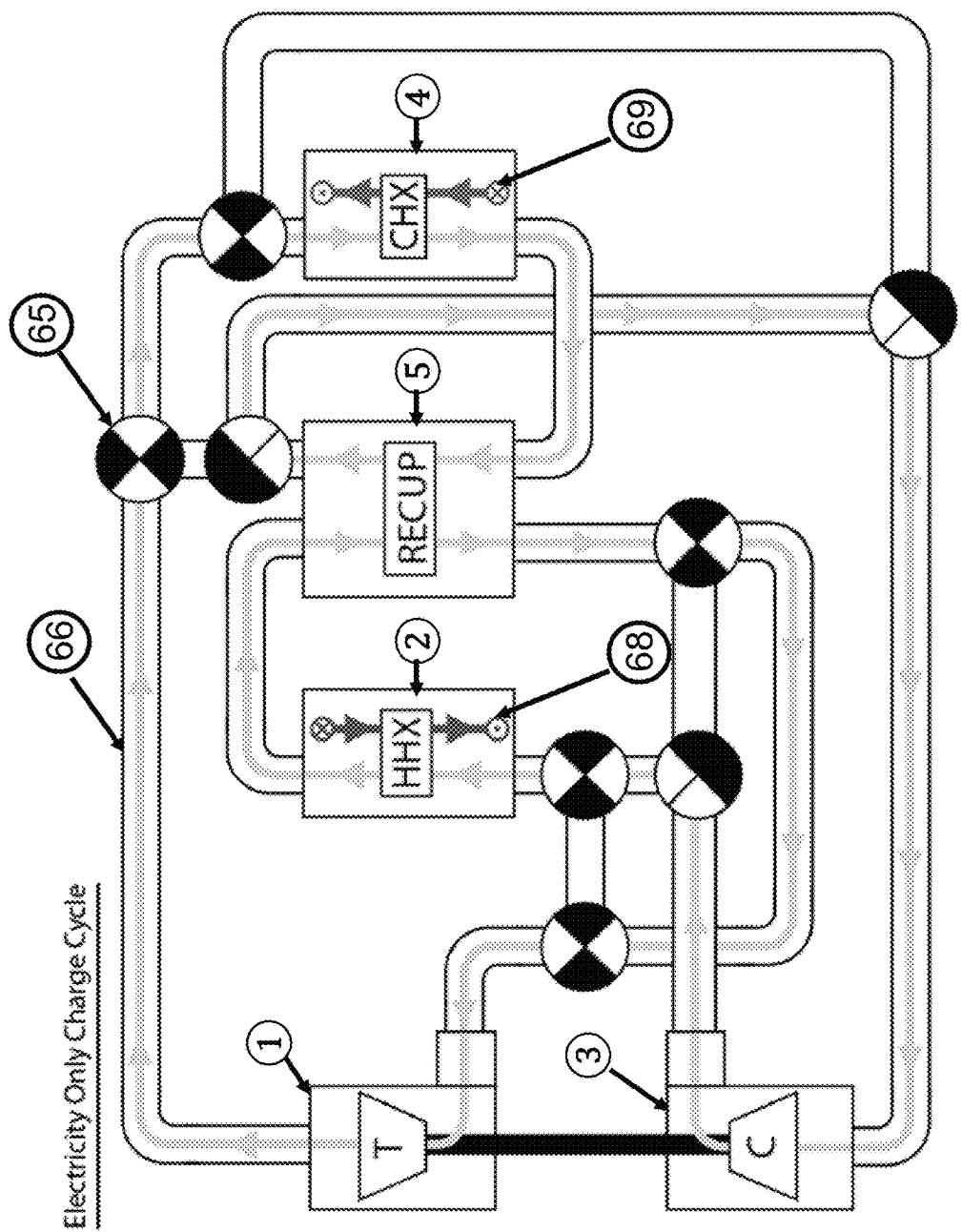
FIG. 7E is a schematic diagram of a piping and valve configuration for the working fluid in the counter-flow thermodynamic charge cycle of FIG. 7C. The circular black and white symbols represent three-way or four-way valves. Arrows in pipes represent working fluid flow.
Figure 7F:
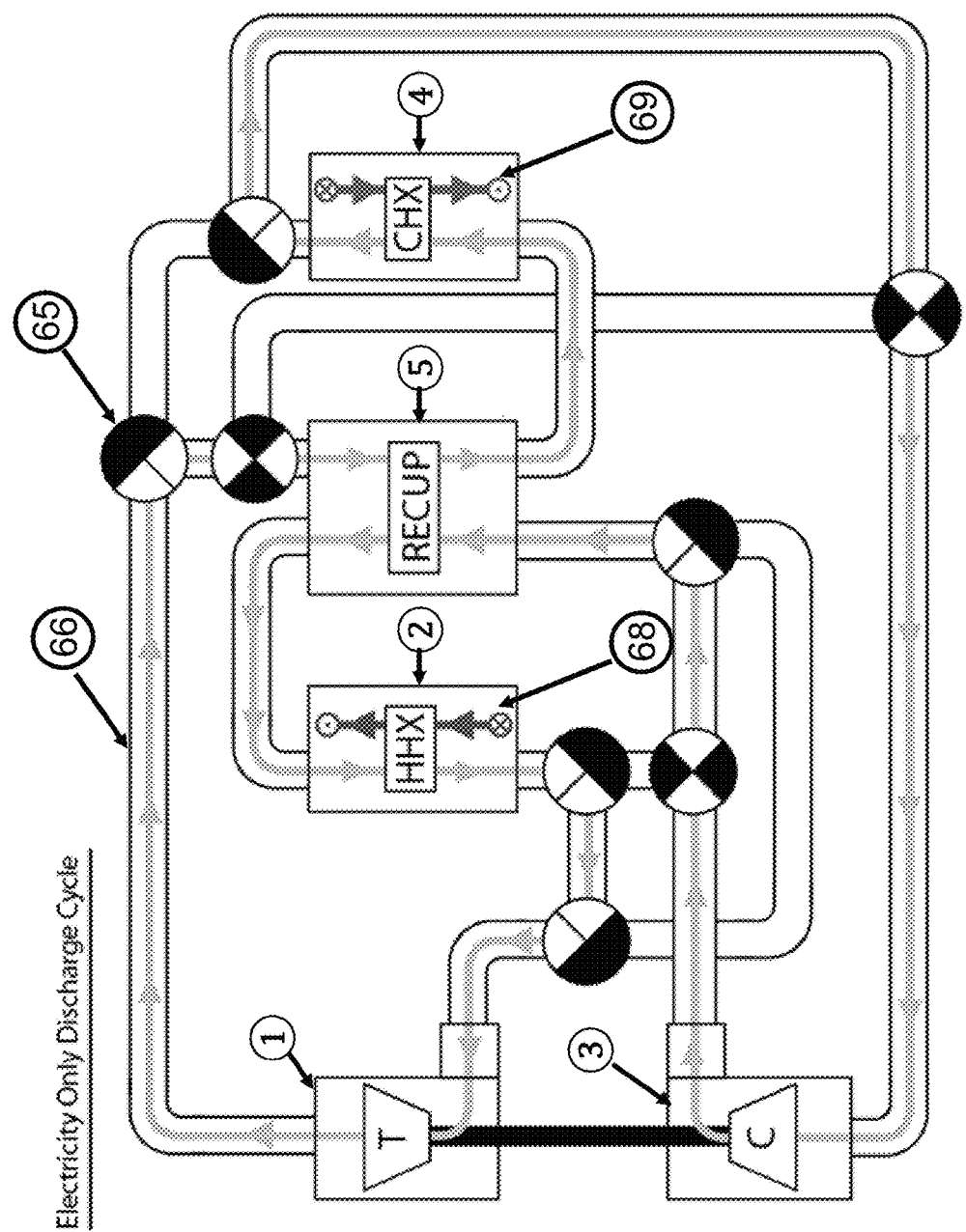
FIG. 7F is a schematic diagram of a piping and valve configuration for the working fluid in the counter-flow thermodynamic discharge cycle of FIG. 7D. The circular black and white symbols represent three-way or four-way valves. Arrows in pipes represent working fluid flow.

In some implementations, the system may be set up to enable switching between different cycles, such as, for example, the cycles in FIGS. 7C and 7D, using a shared set of valves and pipes. A schematic of how piping and valves may be arranged to achieve working fluid flow in a counter-flow thermodynamic cycle is shown in FIG. 7E for charge (such as the cycle shown, for example, in FIG. 7C) and in FIG. 7F for discharge (such as the cycle shown, for example, in FIG. 7D). The counter-flow heat exchangers can include the hot side CFX 2, the cold side CFX 4 and/or the recuperator 5. Such a configuration may be advantageous as it may reuse at least a portion, or a substantial portion or majority of the same piping for the working fluid in both the charging and discharging modes. While the working fluid changes may change direction between charge and discharge, the temperature profile of the heat exchangers can be kept constant, partially constant, or substantially or fully constant by changing the direction in which the HTS medium 68 and the CTS medium 69 are pumped when switching from charge to discharge and vice versa, and/or by matching the heat fluxes of the working fluid, the HTS medium 68 and the CTS medium 69 appropriately.

Symbols 65 represent either three-way or four-way valves. The white quadrants indicate the direction in which the working fluid is allowed to pass, black quadrants indicate where flow is blocked. For example, a valve symbol with white quadrants on left and right and black quadrants on top and bottom will allow the working fluid to pass from left to right and not in any other direction. The paths 66 represent a series of pipes in which the working fluid 20 flows. The pipes 66 may in some cases be thermally insulated and/or rated at a given pressure or range of pressures. The pipes 66 may be so designed as to minimize losses due to turbulence and or pressure drop. Working fluid flow is indicated by light arrows inside the pipes 66.

The examples in FIGS. 7C and 7D illustrate an operating principle of a valving and piping system configured such that the different cycles of the system can be interchanged while maintaining the same, partially the same, or substantially the same temperature profile across at least one of the counter-flow heat exchangers, across a subset of the counter-flow heat exchangers, or across all of the counter-flow heat exchangers in the system. This may be advantageous as the heat capacities of the heat exchangers themselves can mean that changing their temperature profile between cycles could result in additional system losses. The example schematics also demonstrate the design principle of striving to keep the total amount of piping and valving to a minimum by reusing them for different cycles where possible. In various examples, different configurations of piping and valves, and/or a different number of pipes or valves may be used.

Solar Assisted Pumped Thermal Storage Cycles

Another aspect of the disclosure relates to pumped thermal systems assisted by solar heating. Since the pumped thermal systems of the disclosure can be configured to store electricity using heat, the systems may be enhanced by utilizing other sources of heat (e.g., concentrating solar heat, waste heat, combustion, etc.). In some cases, the discharge cycle can be the same as for systems without solar heating. In some cases, the discharge cycle can be different than for systems without solar heating. In some cases, a separate charge cycle can be used on the hot side of the system for recharging the HTS medium and/or a separate charge cycle can be used on the cold side of the system for recharging the CTS medium. In some examples, a combined charge cycle for the hot and cold sides can be used.

In an example, in a discharge mode, a solar assisted pumped thermal storage system can operate on a discharge cycle such as, for example, the discharge cycle in FIG. 7B or FIG. 7D. In a charge mode, the heat for affecting a temperature increase of the HTS medium from $T_1$ to $T_1^+$ can be at least partially supplied by solar heating instead of by heat exchange with the working gas on the hot side of the system as in, for example, the charge cycle in FIG. 7A. This may recharge the HTS medium on the hot side, but not the CTS medium on the cold side. The CTS medium can be recharged separately by using a refrigerator cycle. In another example, the charge cycle in FIG. 7A can be used in concert with solar heating.

Figure 9A:
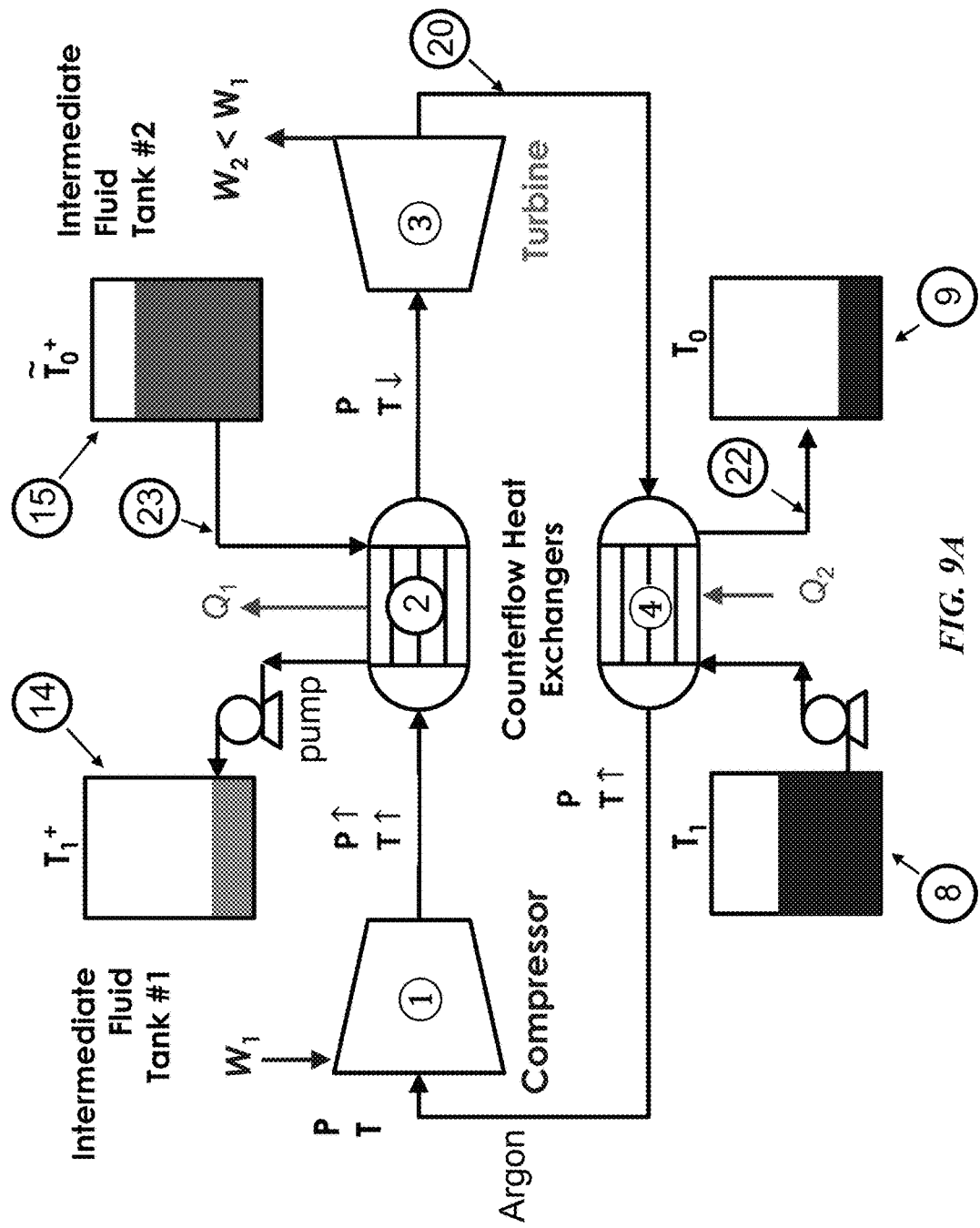
FIG. 9A is a schematic flow diagram of cold side recharging in a pumped heat cycle.

FIG. 9A is a schematic flow diagram of cold side recharging in a pumped heat cycle that can be coupled with external (e.g. solar) heat input. The working fluid 20 enters the compressor at $T_1$ and $P_2$, exits the compressor at $T_1^+$ and $P_1$, rejects heat $Q_1$ to an intermediate thermal storage (ITS) medium 23 in the hot side CFX 2, exiting the hot side CFX 2 at $\tilde{T}_0^+$ and $P_1$, enters the turbine 3 at $\tilde{T}_0^+$ and $P_1$, exits the turbine at $T_0$ and $P_2$, absorbs heat $Q_2$ from the CTS medium 22 in the cold side CFX 4, and exits the cold side CFX 4 at $T_1$ and $P_2$, returning to its initial state before entering the compressor. The temperature $T_1^+$ of the working fluid exiting the compressor and entering the hot side CFX 2 is higher than the temperature of the ITS medium 23 entering the hot side CFX 2 from a second intermediate thermal storage tank 15 at a temperature $\tilde{T}_0^+$. Thus, the working fluid exits the hot side CFX 2 at the temperature $\tilde{T}_0^+$ and the ITS medium exits the hot side CFX 2 into a first intermediate thermal storage tank 14 at the temperature $T_1^+$. The heat exchange process can take place at a constant or near-constant pressure such that the working fluid exits the hot side CFX 2 at a lower temperature but same pressure $P_1$. Similarly, the temperature of the ITS medium 23 increases in the hot side CFX 2, while its pressure can remain constant or near-constant. The two intermediate thermal storage tanks 14 and 15 on the hot side can have the same functionality as the hot side thermal storage tanks 6 and 7; however, their temperature is lower for reasons described next. The ITS medium (or media) in this configuration may be the same as one or more HTS media described herein. Alternatively, the ITS medium may partially or fully distinct from HTS media described herein. In one example, the ITS medium can include one or more additional heat storage media. In another example, the ITS medium can include the same components as an HTS medium, but in different proportions (e.g., different mixture). In some implementations, the ITS medium 23 may be a liquid over the entire range from $\tilde{T}_0^+$ to $T_1^+$. In other implementations, the ITS medium 23 may be not be a liquid over the entire range from $\tilde{T}_0^+$ to $T_1^+$, but may be provided to the counter-flow heat exchanger 2 at a higher flow rate in order to achieve a lower temperature rise across the counter-flow heat exchanger (e.g., such that the temperature of the ITS at the exit of the counter-flow heat exchanger 2 is lower than $T_1^+$) while still cooling the working fluid from $T_1^+$ to $\tilde{T}_0^+$. In this instance, the temperature of the ITS medium in the tank 14 can be lower than $T_1^+$. The ITS medium in the tank 14 can exchange heat with ambient (e.g., through a radiator or other implementations described herein) to be cooled down back to the temperature $\tilde{T}_0^+$. The ITS medium can then be returned back into the tank 15. The heat deposited in the ITS medium may be used for various useful purposes, such as, for example, residential or commercial heating, thermal desalination or the other uses mentioned elsewhere herein. In some implementations, the lower temperature $\tilde{T}_0^+$ of the ITS can be at about ambient temperature. Depending on the climate of the surrounding region, the ambient temperature can vary significantly, and system operation can be varied accordingly. In some implementations, the lower temperature $\tilde{T}_0^+$ of the ITS medium can be at a temperature higher than the ambient temperature.

In some implementations, the recharge cycle in FIG. 9A can be modified to include heat rejection to the environment (or other heat sink) equivalent to heat rejection in section 38 (e.g., a radiator) described elsewhere herein. In such a case, the temperature of the ITS medium in the tank 15 may be $T_0^+$ instead of $\tilde{T}_0^+$.

Figure 10:
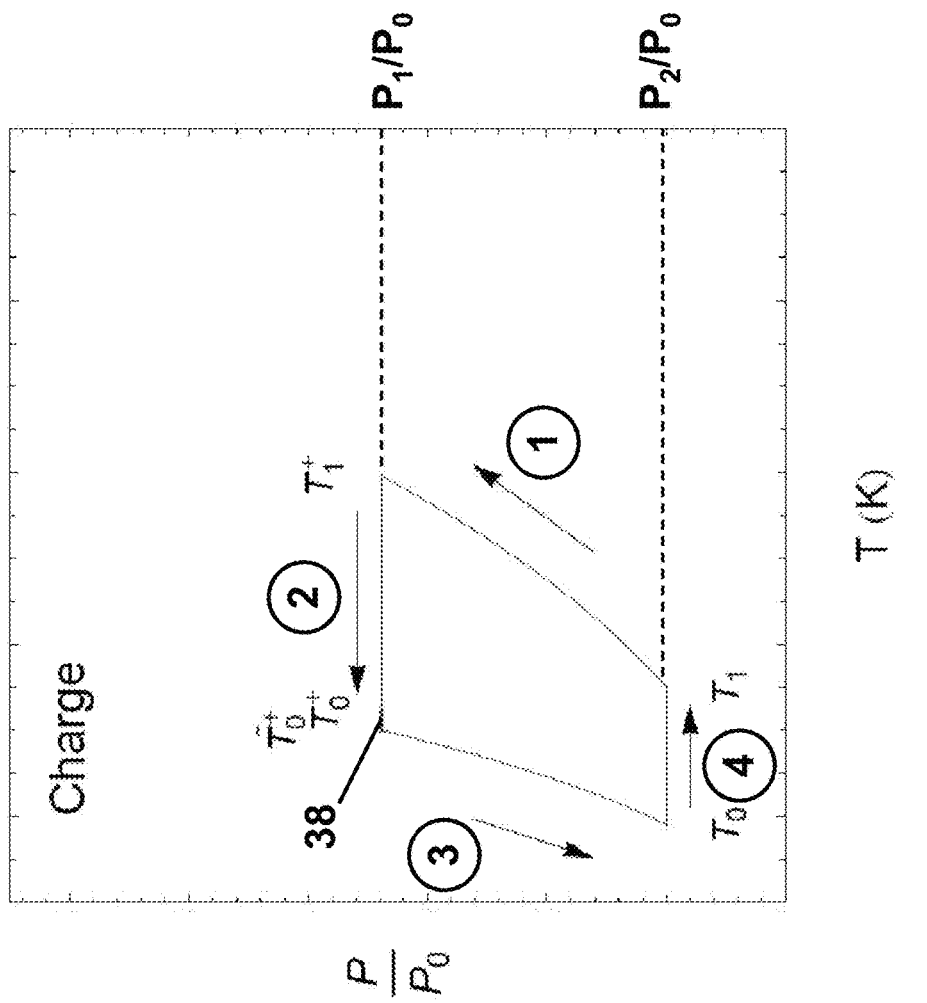
FIG. 10 shows a cold side recharge cycle for a hexane/salt system in solar mode in accordance with a modified system of FIG. 9A with $\eta_c=0.9$ and $\eta_t=0.95$.

FIG. 10 shows a cold side recharge cycle for a hexane/salt system in solar mode in accordance with the cold side recharge cycle in FIG. 9A with $\eta_c=0.9$ and $\eta_t=0.95$, modified to include heat rejection to the environment in section 38. An objective of the cold side recharge cycle may be to refrigerate the CTS medium while expending as little work as possible. In some examples, this can involve using the lowest possible compression ratio while maintaining a workable refrigerator cycle. In some cases, a lower limit of the compression ratio can be constrained to values for which the temperature $T_0^+$ remains sufficiently high with respect to ambient temperature to ensure that heat can be still be rejected to the environment between the temperatures $T_0^+$ and $\tilde{T}_0^+$, as indicated in FIG. 10. In one example, the compressor 3 of the cold side recharge cycle can operate between $\tilde{T}_0^+=300$ K (27° C.) and $T_0=189$ (−84° C.), corresponding to a compression ratio r=3.38. Thus, in examples where lower pressure ratios are used in the cold side recharge cycles, the temperatures of the thermal storage tanks 14 and 15 can be lower than the temperatures of thermal storage tanks with the same functionality operating in cycles with higher pressure ratios, such as, for example, in the charge cycles in FIGS. 7A and 8A.

Further, lower values of the temperature $T_1$ may be used in the cold side recharge cycles. In some examples using separate hot side recharging, the cold side recharge cycles can be configured for recharging of the cold side only. For example, the cold side recharge system and the modified cycle in FIGS. 9A and 10 can operate at $T_0=189$ K (−84° C.), $T_1=350.7$ K (78° C.) and r=3.38. Lower temperatures $T_1^+$ and $T_0^+$ may be used than if the system in FIG. 9A were also used for recharging the HTS medium 21. In some implementations, the recuperator 5 (e.g., as used in the corresponding discharge cycle in FIG. 7B) can be bypassed in part or completely during the recharging of the cold side, $T_1$ can be at or near ambient temperature, resulting in the compression of colder working fluid compared to the charge cycle shown, for example, in FIG. 7A, leading to less work $W_1$ consumed by the compressor 1 to increase the pressure and temperature of the working fluid to $T_1^+$, $P_1$. In other implementations, partially or completely separate systems for cold side recharging and hot side recharging may be used. For example, the hot side recharging system and cold side recharging systems can have 0, 1, 2, or more joint system components (e.g., turbomachinery).

Figure 9B:
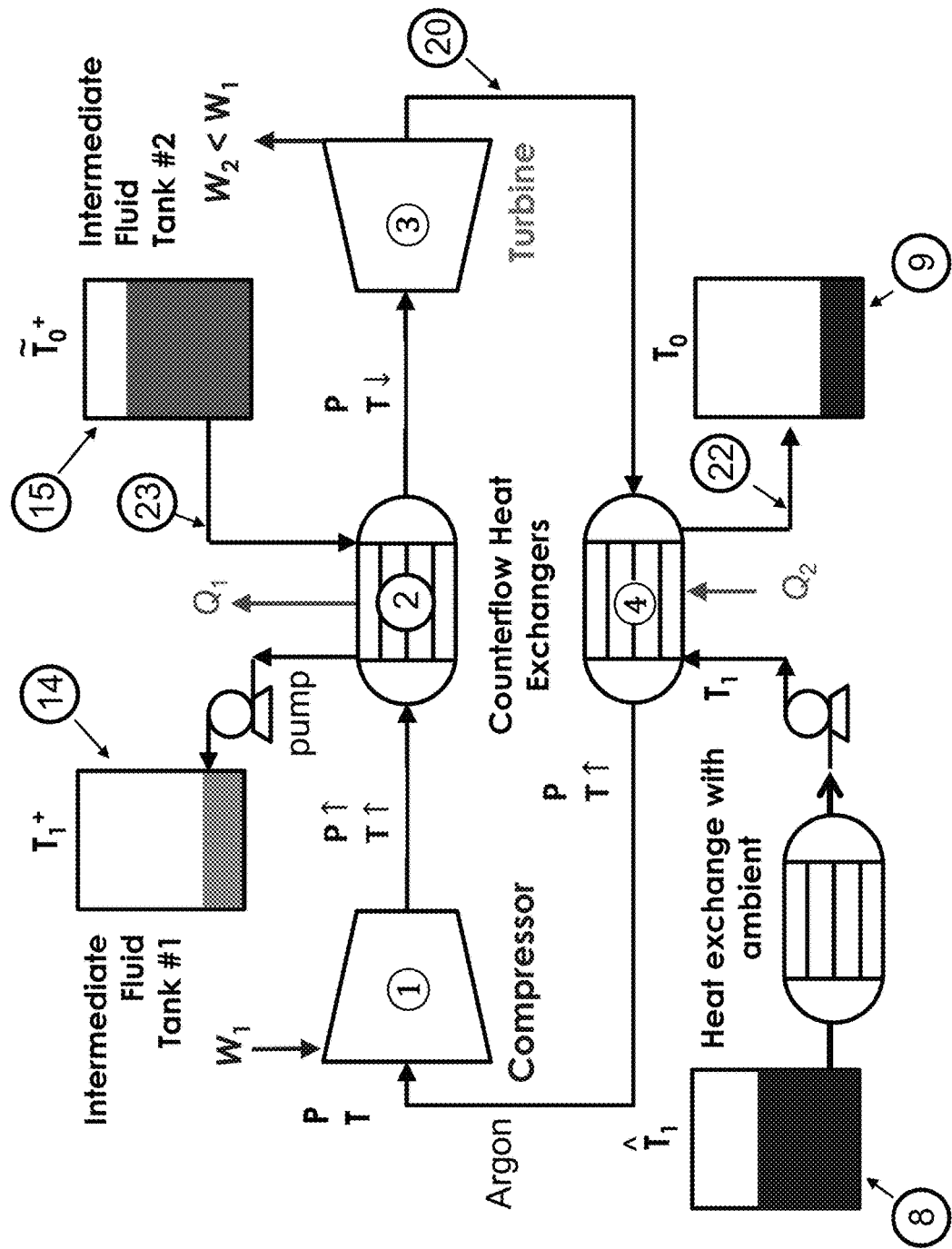
FIG. 9B is a schematic flow diagram of cold side recharging in a pumped heat cycle with a heat exchanger to ambient.

FIG. 9B is another example of cold side recharging in a pumped heat cycle that can be coupled with external (e.g. solar) heat input. In this example, the temperature of one of the two CTS tanks is higher than ambient temperature. In this configuration, improved efficiency may be achieved by allowing the CTS medium 22 in the thermal storage tank 8 having a temperature $\hat{T}_1$ to exchange heat with the surroundings, thus cooling the CTS medium to a temperature $T_1$, equal to about the ambient temperature, before using the refrigerator (cold side recharge cycle) to further cool the CTS medium from $T_1$ to $T_0$. In this configuration, the system can be operated at, for example, $T_0=189$ K (−84° C.), $T_1=300$ K (27° C.), and r=3.38. In some cases, the ambient cooling in FIG. 9B may be particularly suited for operation at night, when the ambient temperature can be lower.

Figure 9C:
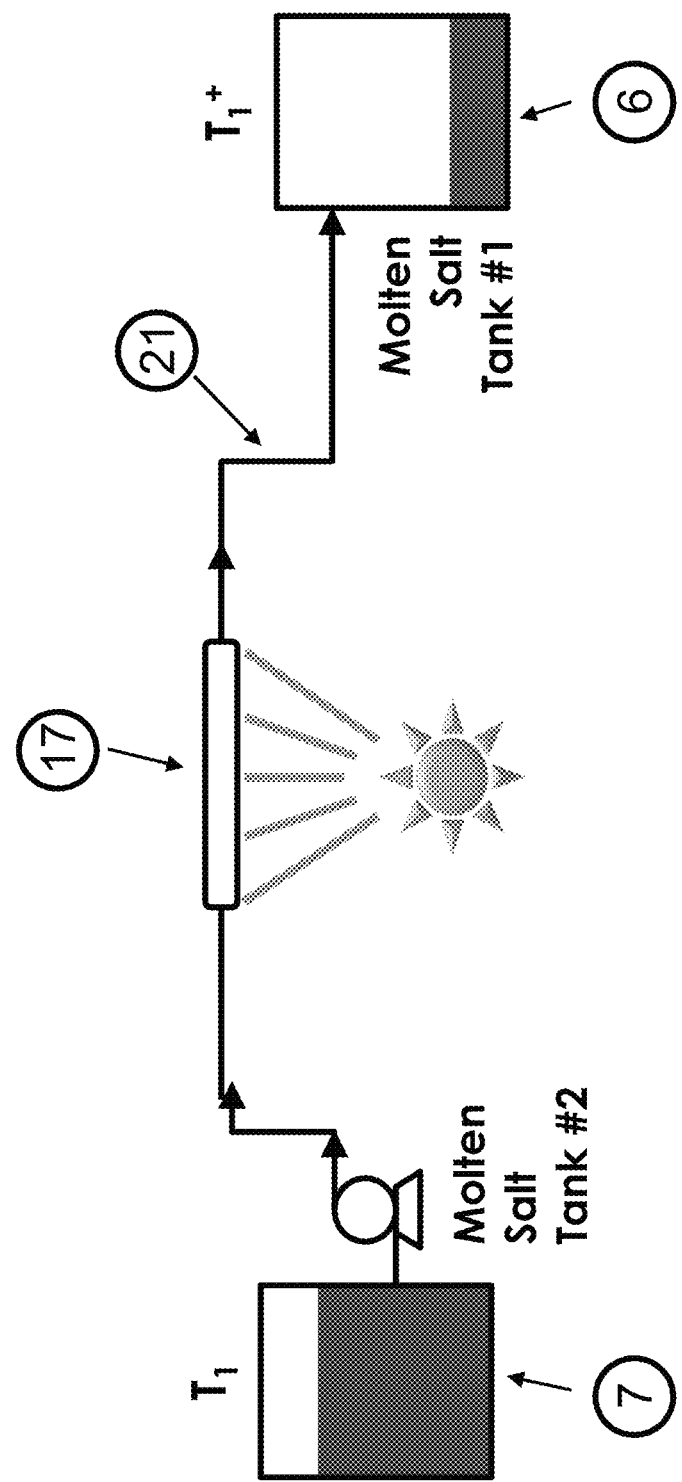
FIG. 9C is a schematic flow diagram of hot side recharging in a pumped heat cycle in solar mode with heating of a solar salt solely by solar power.
Figure 9D:
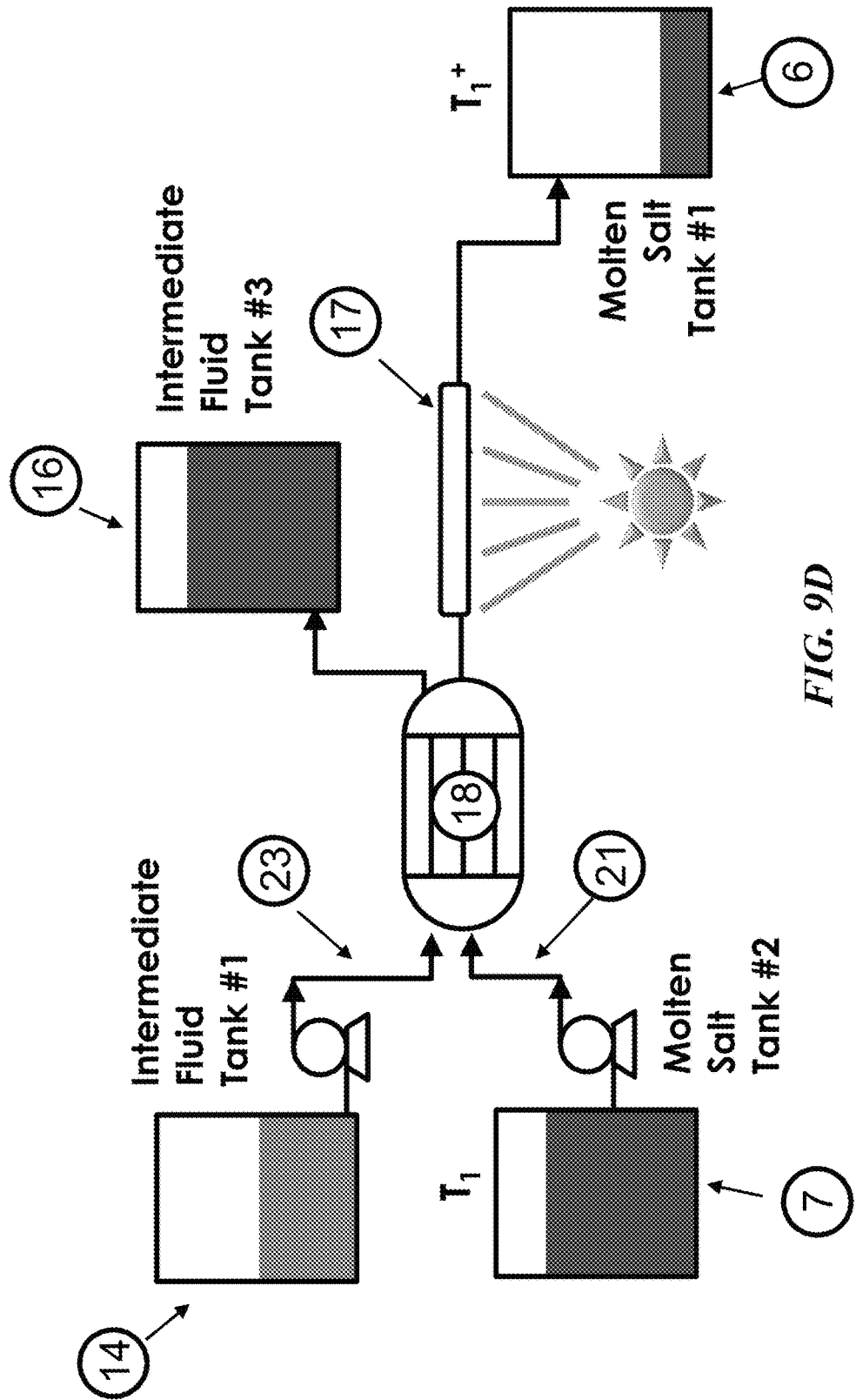
FIG. 9D is a schematic flow diagram of hot side recharging in a pumped heat cycle in solar mode using a heat exchanger between an intermediate fluid tank and a solar salt.
Figure 9E:
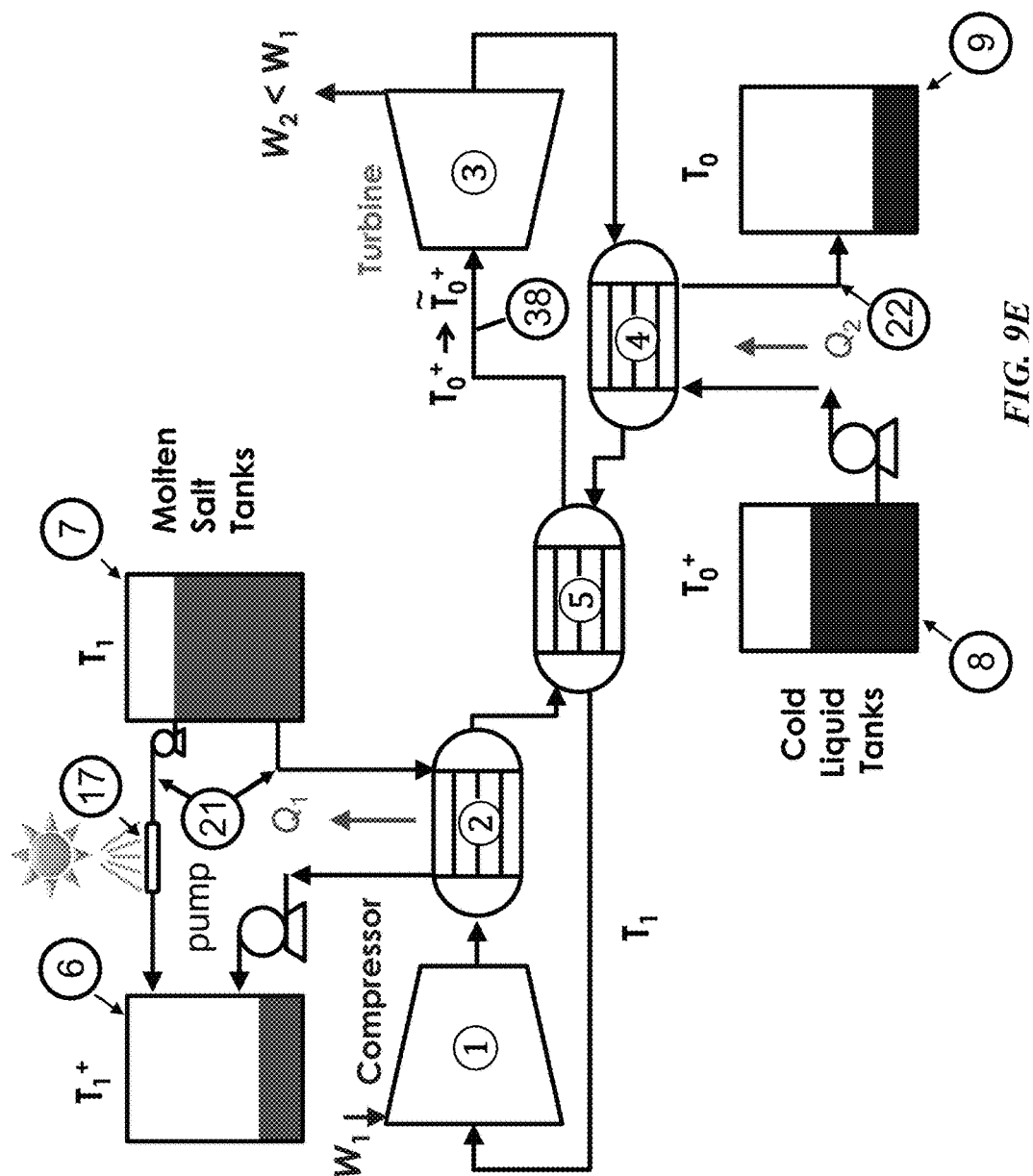
FIG. 9E is a schematic flow diagram of a pumped thermal system charge with a gas-gas heat exchanger in parallel with solar heat input.
Figure 9F:
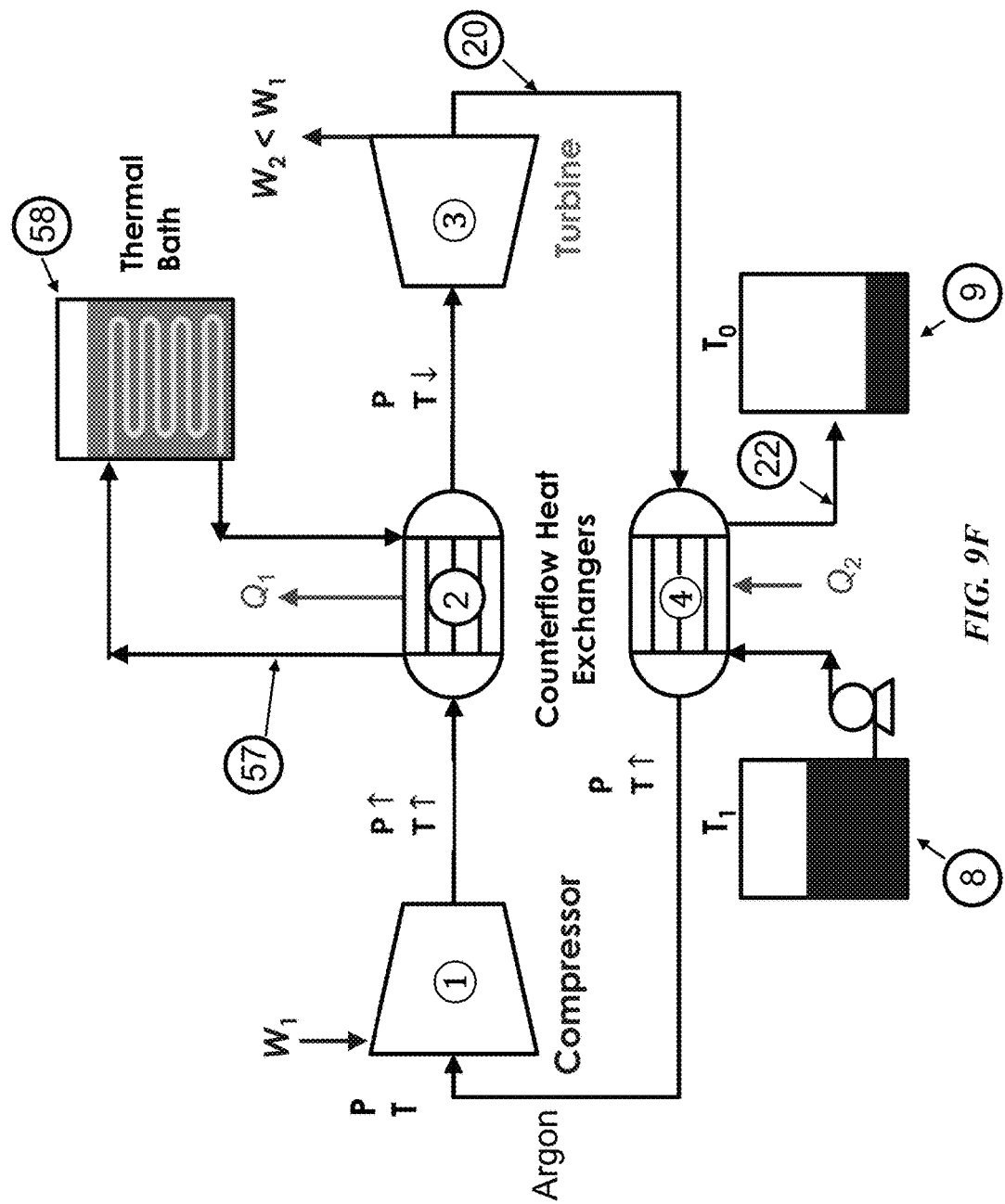
FIG. 9F is a schematic flow diagram of cold side recharging in a pumped heat cycle with hot side heat rejection to an intermediate fluid circulated in a thermal bath.

FIG. 9F shows another example of cold side recharging in which heat is rejected to the ambient environment. An intermediate medium or fluid 57 (e.g., therminol, or a heat transfer oil) that is liquid over a suitable range of operating temperatures may be used for exchanging heat between the working fluid 20 and a thermal bath 58 in the hot side CFX 2. The use of the intermediate fluid 57 may provide an advantage over contacting an inexpensive thermal sink or medium (e.g., water) directly with the working fluid. For example, directly contacting such a thermal medium with the working fluid in the hot side CFX 2 may cause problems, such as, for example, evaporation or over-pressurization (e.g., explosion) of the thermal medium. The intermediate fluid 57 can remain in liquid phase throughout all, a portion of, or a significant portion of the operation in the hot side CFX 2. As the intermediate fluid 57 passes through the thermal bath 58, it can be sufficiently cooled to circulate back into the hot side CFX 2 for cooling the working fluid (e.g., from $T_1^+$ to $\tilde{T}_0^+$). The thermal bath 58 may contain a large amount of inexpensive heat sink material or medium, such as, for example, water. In some cases, the heat deposited in this heat sink may be used for useful purposes such as, for example, residential or commercial heating, thermal desalination or the other uses described elsewhere herein. In some cases, the heat sink material may be re-equilibrated with ambient temperature (e.g., through a radiator or other implementations described herein).

In some implementations, the cold side recharge cycles in FIGS. 9A, 9B and/or 9F may include a recuperator, as described in greater detail in examples throughout the disclosure. Such systems may be implemented using the temperatures $T_1^+$, $T_1$, $T_0^+$ and $T_0$ described in greater detail elsewhere herein.

FIG. 9C is a schematic flow diagram of hot side recharging in a pumped heat cycle in solar mode with heating of a solar salt solely by solar power. The system can comprise a solar heater for heating the hot side heat storage. The HTS medium 21 in the second hot thermal storage tank 7 of a discharge cycle, such as, for example, the HTS medium of the discharge cycle in FIG. 7B, can be recharged within element 17 using heating provided by solar radiation. The HTS medium (e.g., molten salt) can be heated by solar heating from the temperature $T_1$ in the second hot thermal storage tank 7 to the temperature $T_1^+$ in the first hot thermal storage tank 6.

FIG. 9D is a schematic flow diagram of hot side recharging in a pumped heat cycle in solar mode using a heat exchanger between an intermediate fluid tank and a solar salt. The HTS medium 21 (e.g., a molten salt or solar salt) in the second hot thermal storage tank 7 of a discharge cycle, such as, for example, the HTS medium at about 493 K (220° C.) in the discharge cycle in FIG. 7B, can be recharged by first exchanging heat in a heat exchanger 18 with a hotter thermal storage medium, such as, for example, the ITS medium 23 at about 595 K (322° C.) in the first intermediate thermal storage tank 14 in FIG. 9A, followed by solar heating within element 17 to about 873 K (600° C.). The HTS medium (e.g., molten salt) can be heated from the temperature $T_1$ in the second hot thermal storage tank 7 to the temperature $T_1^+$ in the first hot thermal storage tank 6. The hotter thermal storage medium 23 may be the ITS medium in FIG. 9A, or any other thermal storage medium or waste heat stream at a suitable temperature. After exchanging heat with the HTS medium 21, the thermal storage medium can be stored in a third intermediate thermal storage tank 16 and/or can be used as a heat exchange fluid in the systems herein, for cogeneration etc.

In some implementations, such as, for example, for the systems in FIGS. 9C and/or 9D, solar heat for heating the HTS medium (e.g., from $T_1$=493 K (220° C.) to $T_1^+$=873 K (600° C.)) may be provided by a concentrating solar facility. In some examples, a small scale concentrating facility may be utilized for providing heat. In some cases, the concentrating solar facility may include one or more components for achieving high solar concentrating efficiency, including, for example, high-performance actuators (e.g., adaptive fluidic actuators manufactured from polymers), mutiplexing control system, dense heliostat layout etc. In some examples, the heat provided for heating the HTS medium (e.g., in the element 17) may be a waste heat stream from the concentrating solar facility.

FIG. 9E is a schematic flow diagram of a pumped thermal system charge cycle with a gas-gas heat exchanger in parallel with solar heat input. In this configuration, the pumped thermal charge mode in FIG. 7A (using the gas-gas heat exchanger 5 and a combined charge cycle for both hot and cold side recharging) is augmented by parallel solar heating in the element 17. The charge cycle can have two parallel means of recharging HTS (e.g., molten salt) tanks. In some implementations, electricity produced by one or more power sources (e.g., a photovoltaic power plant) during the day (e.g., when ambient temperatures are high) can be stored using the systems of FIG. 9E. Solar heating may be implemented simultaneously for charging the hot side storage tanks containing HTS medium (e.g., molten salt). In one example, separate molten salt pipes and pumps can be used for the electricity storage cycle and for the solar heating. In another example, one or more components can be shared, such as, for example, molten salt pipes, pumps, one or more hot side storage tanks etc. In some cases, the element 17 can be a solar concentrating heating element (e.g., a channel in which a molten salt is flowing and onto which solar radiation is concentrated). An excess of "charge" in the hot side tanks compared to the cold side tanks can be achieved (e.g., a high fill level of the HTS medium in the first hot thermal storage tank 6 relative to the CTS medium in the second cold thermal storage tank 9). The cold side tanks not recharged by the charge cycle in FIG. 9E may be recharged using the systems of FIGS. 9A and/or 9B. For example, the cold side tanks can be recharged at night when the ambient temperature is low and cooling (e.g., ambient cooling the heat exchanger 27 in FIG. 9B) is easier to accomplish. In another example, the cold side tanks can be recharged at any time using, for example, the system in FIG. 9A, operating independently of the charge cycle in FIG. 9E (or any other electricity storage charge cycle of the disclosure).

In some implementations, cold side, hot side and/or combined charge cycles herein can be used with the discharge cycle in FIGS. 7B and 8B to achieve various levels of roundtrip efficiencies. In some cases, addition of solar heat can result in significant electricity storage roundtrip efficiency improvements. In some cases, the roundtrip efficiency $\eta_{store}$ (e.g., electricity storage efficiency) without and/or with solar heat addition can be at least about 25%, at least about 50%, at least about 75%, at least about 100%, at least about 125%, at least about 150%, at least about 175%, at least about 200%, at least about 225%, at least about 250%, at least about 300%, at least about 350%, at least about 400%, at or more.

In one example, the cold side recharge cycle in FIGS. 9A and 10 can be used with the hot side recharge cycle in FIG. 9C and the discharge cycle in FIGS. 7B and 8B. In this configuration, the compression ratios in the charge and discharge cycles can be different (e.g., for the charge cycle in FIG. 9A, $T_0$=215 K (−57° C.), $T_1$=300 K (27° C.) and r=2.45, while for the discharge cycle in FIG. 7B, $T_0$=215 K (−57° C.), $T_1$=563 K (290° C.) and r=2.95), with a roundtrip storage efficiency (also "roundtrip efficiency" herein) of $\eta_{store}$=227% and a value of $T_1^+$ upon cold side recharge of 447 K (173° C.). In some cases, at least a portion of the heat stored in the ITS medium in the first intermediate thermal storage tank 14 in the cold side recharge cycle in FIGS. 9A and 10 can be used to charge the HTS medium (e.g., molten salt) used in the discharge cycle in FIGS. 7B and 8B using, for example, the system in FIG. 9D to reduce the amount of solar concentration needed compared to the system in FIG. 9C. For example, the HTS medium in the discharge cycle can have a low temperature of about 493 K (220° C.), while the ITS medium in the refrigerator cycle can have a temperature of up to about 593 K (320° C.). Instead of raising the temperature of the HTS medium (e.g., molten salt) using solar heat from 493 K (220° C.) to 593 K (320° C.), it may be raised by first exchanging heat with the ITS medium, and only then using solar heat to heat the HTS medium the rest of the way.

In another example, where the temperature of the CTS medium in the tank 8 is at a temperature $\hat{T}_1$ greater than ambient temperature, the cold side recharge cycle in FIG. 9B can be used with the hot side recharge cycle in FIG. 9C and the discharge cycle in FIGS. 7B and 8B. In this configuration, the compression ratios in the charge and discharge cycles can again be different.

In another example, in cases where it may be difficult to vary the compression ratio between charge (e.g., cold side recharge) and discharge, both the cold side recharge cycle compression ratio and the discharge cycle compression ratio can be set to r=2.45. In this example, for a system operating according to the charge cycle in FIG. 9A, $T_0$=215 K (−57° C.), $T_1$=300 K (27° C.) and r=2.45, while for the discharge cycle in FIG. 7B, $T_0$=215 K (−57° C.), $T_1$=563 K (290° C.) and r=2.45, a roundtrip storage efficiency (also "roundtrip efficiency" herein) of $\eta_{store}$=208% and a value of $T_1^+$ upon cold side recharge of 447 K (173° C.) may be achieved.

Figure 9G:
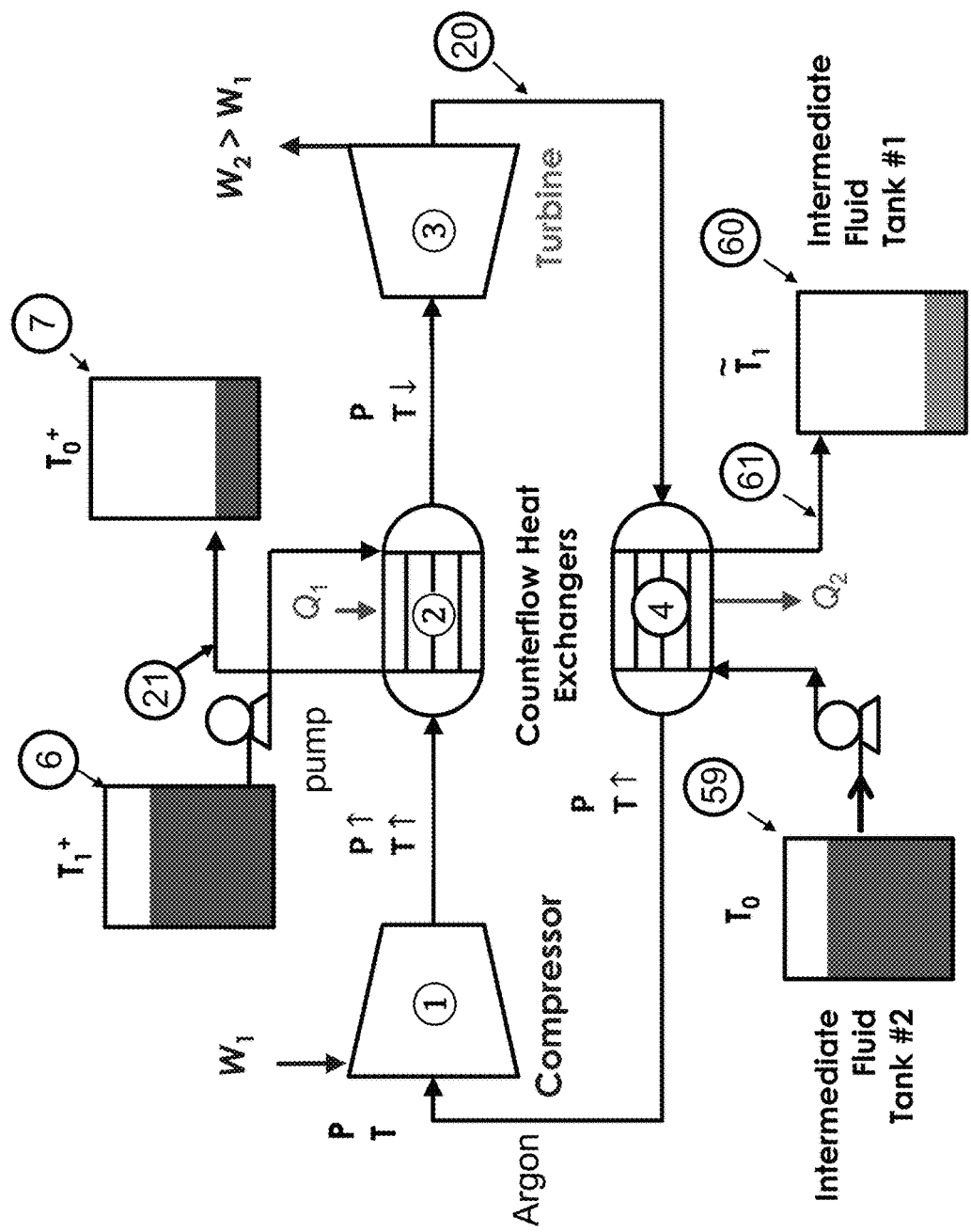
FIG. 9G is a schematic flow diagram of a pumped thermal system discharge cycle with heat rejection to ambient.

FIG. 9G is a schematic flow diagram of a pumped thermal system discharge cycle that can be coupled with external heat input (e.g., solar, combustion) with heat rejection to ambient. Such a discharge cycle may be used, for example, in situations where the capacity for hot side recharging (e.g., using solar heating, waste heat or combustion) is greater than the capacity for cold side recharging. Solar heat may be used to charge the HTS medium 21 in the hot side storage tanks from $T_1$ to $T_1^+$, as described elsewhere herein. The discharge cycle can operate similarly to the discharge cycle in FIG. 2B, but after exiting the turbine 3, the working fluid 20 can proceed to the cold side CFX 4 heat exchanger 4 where it exchanges heat with an intermediate thermal storage (ITS) medium 61 having a lower temperature $T_0$ at or near ambient temperature. The ITS medium 61 enters the cold side CFX 4 from a second intermediate thermal storage tank 59 at the temperature $T_0$ (e.g., ambient temperature) and exits the cold side CFX 4 into a first intermediate thermal storage tank 60 at the temperature $\tilde{T}_1$, while the working fluid 20 enters the cold side CFX 4 at the temperature $\tilde{T}_1$ and exits the cold side CFX 4 at the temperature $T_0$. The working fluid enters the compressor 1 at $T_0$ and $P_2$, exits the compressor at $T_0^+$ and $P_1$, absorbs heat $Q_1$ from the HTS medium 21 in the hot side CFX 2, exits the hot side CFX 2 at $T_1^+$ and $P_1$, enters the turbine 3 at $T_1^+$ and $P_1$, exits the turbine at $\tilde{T}_1$ and $P_2$, rejects heat $Q_2$ from the ITS medium 61 in the cold side CFX 4, and exits the cold side CFX 4 at $T_0$ and $P_2$, returning to its initial state before entering the compressor.

In some implementations, the ITS medium 61 may be a liquid over the entire range from $T_0$ to $\tilde{T}_1$. In other implementations, the ITS medium 61 may not be a liquid over the entire range from $T_0$ to $\tilde{T}_1$, but may be provided to the counter-flow heat exchanger 4 at a higher flow rate in order to achieve a lower temperature rise across the counter-flow heat exchanger (e.g., such that the temperature of the ITS medium at the exit of the counter-flow heat exchanger 4 is lower than $\tilde{T}_1$) while still cooling the working fluid from $\tilde{T}_1$ to $T_0$. In this instance, the temperature of the ITS medium in the tank 60 can be lower than $\tilde{T}_1$. The ITS medium in the tank 60 can exchange heat with ambient (e.g., through a radiator or other implementations described herein) in order to cool back to the temperature $T_0$. In some cases, the ITS medium can then be returned to the tank 59. In some cases, the heat deposited in the ITS medium may be used for various useful purposes such as, for example, residential or commercial heating, thermal desalination or other uses described elsewhere herein.

Figure 9H:
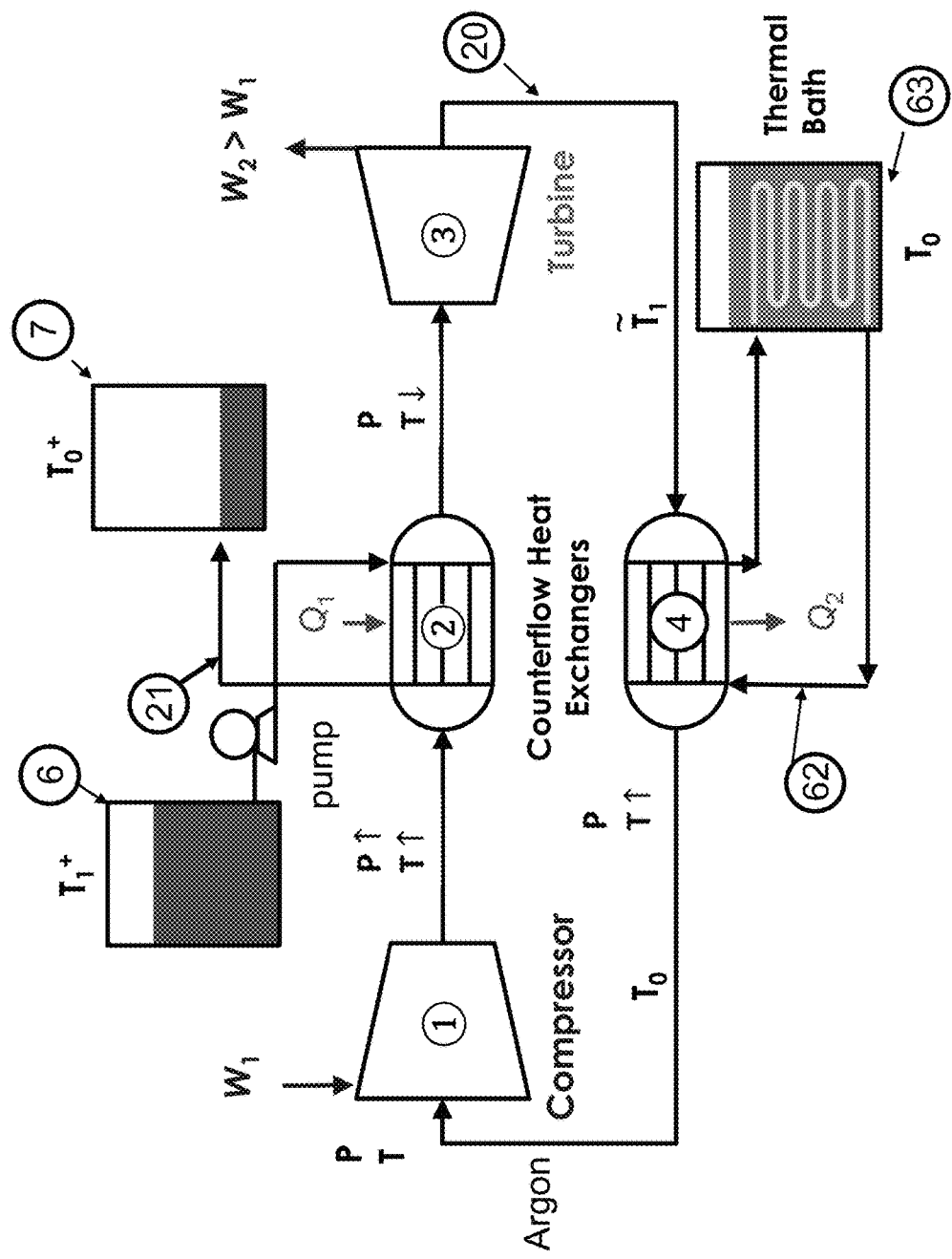
FIG. 9H is a schematic flow diagram of a pumped thermal system discharge cycle with heat rejection to an intermediate fluid circulated in a thermal bath at ambient temperature.

FIG. 9H is a schematic flow diagram of a pumped thermal system discharge cycle in solar mode with heat rejection to an intermediate fluid circulated in a thermal bath at ambient temperature. The discharge cycle can operate similarly to the discharge cycle in FIG. 9G, but after exiting the turbine 3, the working fluid 20 can proceed to the cold side CFX 4 where it exchanges heat with an intermediate medium or fluid 62 circulating through a thermal bath 63 at the temperature $T_0$ at or near ambient temperature. The intermediate medium or fluid 62 (e.g., therminol, or a heat transfer oil) may be used for exchanging heat between the working fluid 20 and a thermal bath 63 in the cold side CFX 4. The use of the intermediate fluid 62 may provide an advantage over contacting an inexpensive thermal sink or medium (e.g., water) directly with the working fluid. For example, directly contacting such a thermal medium with the working fluid in the cold side CFX 4 may cause problems, such as, for example, evaporation or over-pressurization (e.g., explosion) of the thermal medium. The intermediate fluid 62 can remain in liquid phase throughout all, at least a portion of, or a significant portion of the operation in the cold side CFX 4. As the intermediate fluid 62 passes through the thermal bath 58, it can be sufficiently cooled to circulate back into the cold side CFX 4 for cooling the working fluid from $\tilde{T}_1$ to $T_0$. The thermal bath 63 may contain a large amount of inexpensive heat sink material or medium, such as, for example, water. In some cases, the heat deposited in the heat sink material may be used for various useful purposes such as, for example, residential or commercial heating, thermal desalination or other uses described elsewhere herein. In some cases, the heat sink material may be re-equilibrated with ambient temperature (e.g., through a radiator or other implementations described herein).

In some implementations, the discharge cycles in FIGS. 9G and/or 9H may include a recuperator, as described in greater detail in examples throughout the disclosure. Such systems may be implemented using the temperatures $T_1^+$, $T_1$, $T_0^+$ and $T_0$ described in greater detail elsewhere herein.

Addition of solar heat may lead to more work being extracted than work originally supplied to the system via electrical energy. The roundtrip efficiency may thus be larger than 100%. In some examples, thermal efficiency for solar assisted systems can be expressed as $\eta_{thermal} = W_{extra}/Q_{solar}$, where $W_{extra}$ is the extra work output from a charge/discharge cycle with solar heat input $Q_{solar}$ as compared to the work output from a charge/discharge cycle without solar heat input. In some examples, heat from cold side charge cycles can be utilized, as shown, for example, in FIG. 9D, to lower the $Q_{solar}$ needed, thus raising the thermal efficiency (thermal of the solar assisted pumped thermal storage cycles herein.

In some examples, the thermal efficiency $\eta_{thermal}$ (e.g., heat to electricity conversion efficiency) of solar assisted pumped thermal storage cycles can be at least about 5%, at least about 10%, at least about 15%, at least about 20%, at least about 25%, at least about 30%, at least about 35%, at least about 40%, at least about 45%, at least about 50%, at least about 60%, at least about 70%, or more.

An additional way of characterizing the performance of storage systems that take both heat and electricity as inputs and provide electricity as an output can be referred to as an exergetic efficiency of the system. Exergy can be defined as the potential for a given amount of energy to be converted into useful work. Electrical energy may be approximated to be equal to exergy since it can be converted to work with minimal losses. Thermal energy, however, can be converted to work by bringing a higher temperature thermal bath into equilibrium with a lower temperature thermal bath. A limit of how much work can be converted from a given amount of heat or thermal energy Q at a temperature $T_H$ coming into equilibrium with a lower temperature bath $T_C$ can be given by Carnot efficiency, $$W_{carnot} \leq Q\left(1 - \frac{T_C}{T_H}\right).$$

The quantity $W_{carnot}$ can also be called a thermal exergy content $X_{Th}$ of the heat Q. For heat added over a range of temperatures, for example from $T_1$ to $T_1^+$, the thermal exergy content for constant specific heat $c_p$ can be $$X_{Th} = \int_{T_1}^{T_1^+} dQ = T_1^+ - T_1 - T_C \ln\left(\frac{T_1^+}{T_1}\right).$$

For a system that takes in electricity exergy $X_{elec}^{in}$ and thermal exergy $X_{Th}$, and outputs electricity exergy $X_{elec}^{out}$, the exergetic efficiency can be defined as $$\eta_x = \frac{X_{elec}^{out}}{X_{elec}^{in} + X_{Th}}.$$

In some examples, systems of the disclosure may have an exergetic efficiency $\eta_x$ of at least about 5%, at least about 10%, at least about 15%, at least about 20%, at least about 25%, at least about 30%, at least about 35%, at least about 40%, at least about 45%, at least about 50%, at least about 60%, at least about 70%, at least about 80%, or at least about 90%, or more.

Solar Assisted Pumped Thermal Storage Cycles with Intercooling

An aspect of the disclosure provides intercooling of pumped thermal storage systems. In some implementations, intercooling of solar assisted pumped thermal storage systems is provided. In an example, a cold side recharge (refrigerator) cycle in a solar assisted pumped thermal storage system can be aimed at cooling cold side thermal storage tanks, with limited utility of heating the working fluid in the refrigerator cycle. The hotter the working fluid, the more work may be required to compress it. In some cases, at least a portion of the sensible energy of the working fluid may be used for preheating an HTS medium (e.g., solar salt), for example, as shown in FIG. 9D, via direct heat exchange between the working fluid and the HTS medium, or any combination or variation thereof. Further, in some cases, at least a portion of the sensible energy of the working fluid and/or the ITS medium of the cold side recharge cycle may transferred to another medium, such as, for example, a process or residential heating stream. As an alternative, in cases where heat transfer is not employed, compression work (e.g., work input $W_1$ in FIGS. 9A and 9B) may be decreased or minimized by approaching isothermal operation of the compressor 1. Examples include achieving a temperature rise $(T_1^+ - T_1)$ in the compressor 1 of less than about 2% of the compressor inlet temperature $T_1$, less than about 5% of the compressor inlet temperature $T_1$, less than about 10% of the compressor inlet temperature $T_1$, less than about 15% of the compressor inlet temperature $T_1$, less than about 20% of the compressor inlet temperature $T_1$, less than about 25% of the compressor inlet temperature $T_1$, less than about 50% of the compressor inlet temperature $T_1$, less than about 75% of the compressor inlet temperature $T_1$ less than about 95% of the compressor inlet temperature $T_1$, less than about 120% of the compressor inlet temperature $T_1$, or less than about 150% of the compressor inlet temperature $T_1$, or more. In an example, substantially isothermal compression may be achieved.

In one example, work input for compressing one mole of an ideal gas in an ideal (e.g., reversible) compressor operating isothermally (also "isothermal limit" herein) can be expressed as $$|W_{isot\text{-}comp}^{ideal}| = \overline{R}T \int_{V_1}^{V_2} \frac{dV}{V} = \overline{R}\ln\frac{V_2}{V_1} = \overline{R}\ln\frac{p_1}{p_2}\left(\overline{c}_p \frac{\gamma-1}{\gamma}\right)T_{inlet}\ln(r).$$

In practical systems using turbomachinery, isothermal compression may be approximated, or in some cases, partially or substantially achieved, by utilizing intercooling to reduce the temperature of the working fluid between compression stages. In some cases, each compression stage may be modeled as an adiabatic compression stage having a given adiabatic (isentropic) efficiency.

Figure 11A:
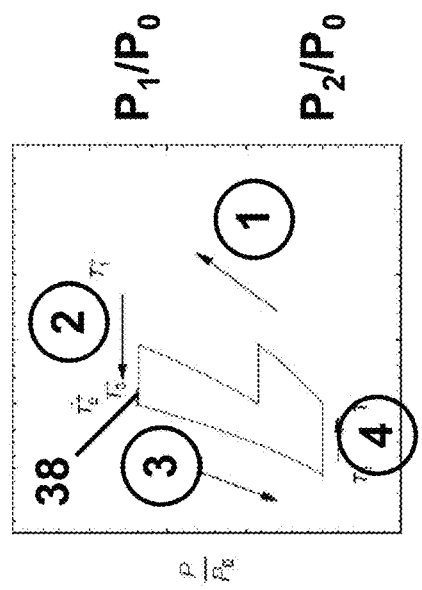
FIGS. 11A-D show (clockwise) cold side recharging in a pumped heat cycle using intercooling with 0, 1, 2 and 3 stages.
Figure 11B:
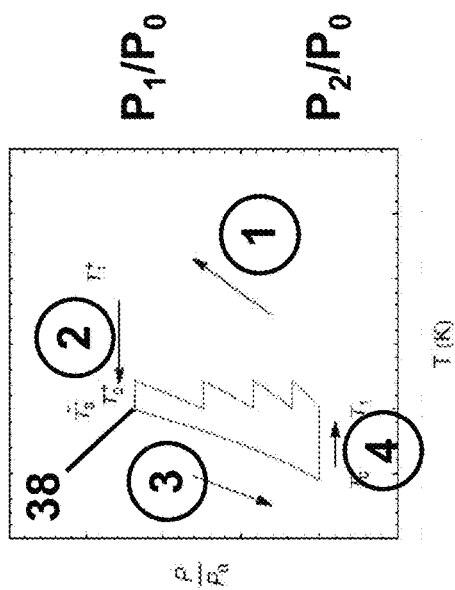
Figure 11C:
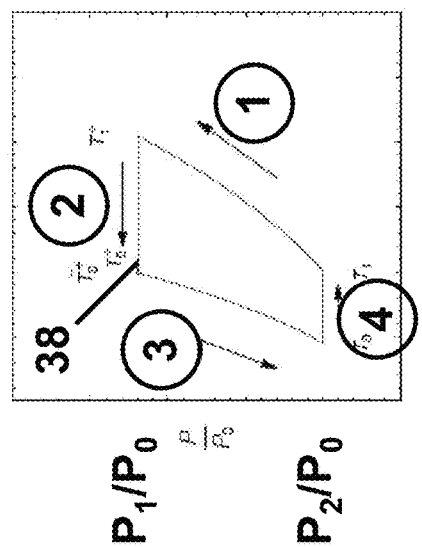
Figure 11D:
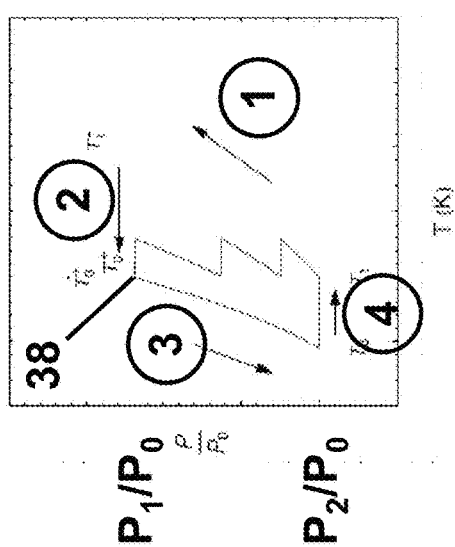

FIGS. 11A-D show (clockwise) a solar assisted cold side recharge cycle with intercooling with 0, 1, 2 and 3 stages, respectively. In FIG. 11A (no intercooling), the working fluid enters the compressor 1 at $T_1$ and $P_2$, exits the compressor at $T_1^+$ and $P_1$, rejects heat in the hot side CFX 2, exits the hot side CFX 2 at $T_0^+$ and $P_1$, rejects heat to the environment (or other heat sink) in section 38 (e.g., a radiator), enters the turbine 3 at $\tilde{T}_0^+$ and $P_1$, exits the turbine at $T_0$ and $P_2$, absorbs heat in the cold side CFX 4, and exits the cold side CFX 4 at $T_1$ and $P_2$, returning to its initial state before entering the compressor. In FIG. 11B (1 intercooling stage), the working fluid enters the compressor 1 at $T_1$ and $P_2$, but exits the compressor at a temperature $T_{1,int}^+$ and $P_1$, where $T_1 < T_{1,int}^+ < T_1^+$. In FIG. 11B (2 intercooling stages), the working fluid exits the compressor at a temperature $T_1 < T_{1,int}^+ < T_1^+$ and $P_1$, but with $T_{1,int}^+$ now being lower than in FIG. 11B. Similarly, an even lower temperature $T_{1,int}^+$ can be achieved with 3 intercooling stages FIG. 11C. With additional intercooling stages added, the temperature at the compressor exit may approach the compressor inlet temperature $T_1$ (i.e., approaches an isothermal process) and the required compression work may be decreased.

Figure 12:
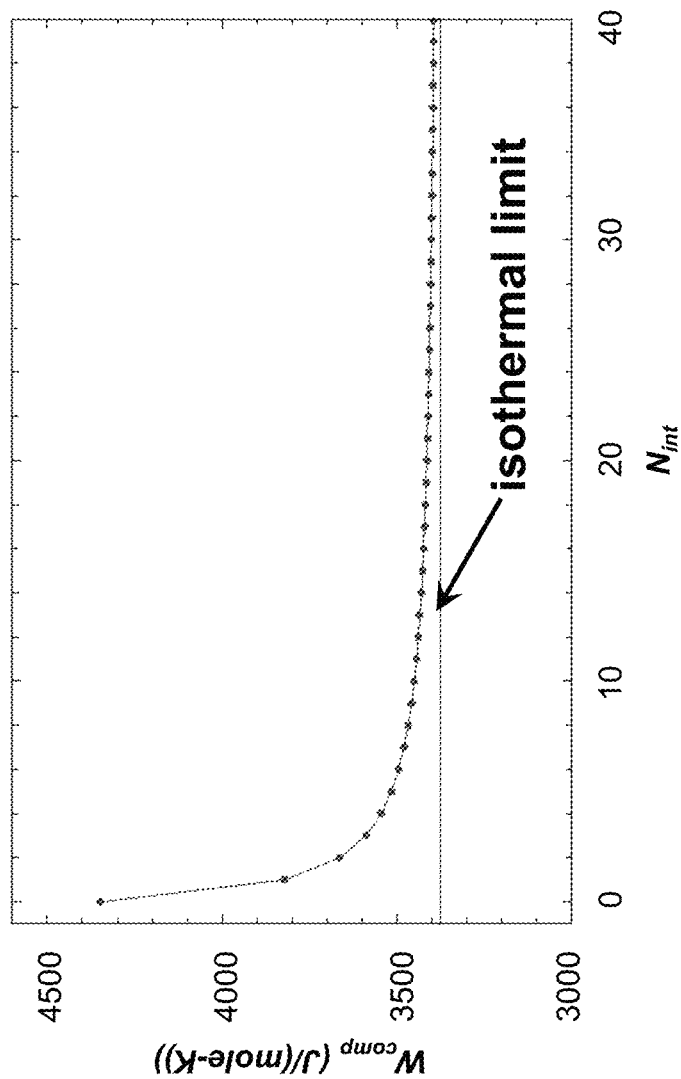
FIG. 12 illustrates the effect of additional stages of intercooling on solar charge cycle compression work for a system with r=3.38 and $T_1=300$ K (27° C.). The isothermal compression limit is represented by a horizontal line.

FIG. 12 illustrates the effect of additional stages of intercooling on compression work $W_{comp}$ for a cold side recharge cycle in a solar assisted pumped thermal storage system with r=3.38 and $T_1$=300 K (27° C.). In some examples, intercooling can be implemented with equal compression ratios (and, in some cases, equal temperature rises) at each stage. In this configuration, intercooling stages can occur at pressures $$p_2\left(\frac{p_1}{p_2}\right)^{\frac{1}{N}},\ p_2\left(\frac{p_1}{p_2}\right)^{\frac{2}{N}}\ \ldots\ p_2\left(\frac{p_1}{p_2}\right)^{\frac{N-1}{N}}$$

and work done for $N_{int}$ stages of intercooling can be given by, for example, $$W_{comp} = \overline{c}_p T_{inlet} N_{int}\left(\psi^{\frac{1}{N_{int}\eta_{cp}}} - 1\right),$$

where, as $N_{int} \to \infty$, $W_{comp}$ approaches the isothermal limit, as shown in FIG. 12, where the isothermal limit is represented by a horizontal line. In some examples, compressors with $N_{int}$ stages of intercooling can be utilized in solar assisted pumped thermal storage systems.

Intercooling of one or more compressors (e.g., during cold side recharge), reheating of one or more turbines (e.g., during discharge), recuperation, heat exchange between two or more cycles (e.g., as in, for example, FIG. 9D), utilization of external sources of heat (e.g., solar heat for recharging hot side thermal storage tanks), cold (e.g., cold environment or liquefaction/cryogenic reservoirs for recharging cold side thermal storage tanks) and/or waste heat/cold (e.g., industrial process heat or cold for preheating, precooling, reheating, intercooling etc.), and/or other strategies for improving efficiency may be employed in pumped thermal storage systems of the disclosure. In some implementations, flow rates of thermal storage media and/or the working fluid may be adjusted to accommodate the incorporation of additional heat sources and/or heat sinks.

In some instances, the pumped thermal system may provide heat sources and/or cold sources to other facilities or systems such as, for example, through co-location with a gas to liquids (GTL) facility or a desalination facility. In one example, the GTL facilities may make use of one or more of the cold reservoirs in the system (e.g., the CTS medium in the tank 9 for use in oxygen separation in the GTL facility) and/or one or more hot reservoirs in the system (e.g., the HTS medium in the tank 6 for use in a Fischer-Tropsch process in the GTL facility). In another example, one or more hot reservoirs or one or more cold reservoirs in the pumped thermal system may be used for the operation of thermal desalination methods. Further examples of possible heat and cold uses include co-location or heat exchange with building/area heating and cooling systems.

Conversely, in some cases, the pumped thermal system may make use of waste heat sources and/or waste cold sources from other facilities or systems such as, for example, through co-location with a liquefied natural gas import or export terminal. For example, a waste cold source may be used for cooling the cold side thermal storage media 22. In some implementations, recharging of the cold side using waste cold may be combined with recharging of the hot side thermal storage media 21 by external heat input (e.g., solar, combustion, waste heat, etc.). In some cases, the recharged storage media can then be used in a discharge cycle such as, for example, the discharge cycles in FIG. 7B or 7D. In some cases, the pumped thermal system may be used as a heat engine with a waste heat source serving as the hot side heat input and a waste cold source serving as the cold side heat sink. In another implementation, the hot side storage media may be recharged using a modified version of the cycle shown in FIG. 7C, where the temperature $T_0$ is about the ambient temperature and $\tilde{T}_0^+$ corresponds to a temperature above the ambient temperature. In some examples, a waste heat source can be used to provide the heat needed at a temperature of at least $\tilde{T}_0^+$ for heating the working fluid and/or the CTS medium to $\tilde{T}_0^+$. In another implementation, an intermediate fluid (e.g., therminol) which can remain liquid between the temperatures $\tilde{T}_0^+$ and $T_0$ may be used to transfer the heat from the waste heat source to the working fluid.

Pumped Thermal Systems with Dedicated Compressor/Turbine Pairs

In a further aspect of the disclosure, pumped thermal systems comprising multiple working fluid systems, or working fluid flow paths are provided. In some cases, pumped thermal system components in the charge and discharge modes may be the same. For example, the same compressor/turbine pair may be used in charge and discharge cycles. Alternatively, one or more system components may differ between charge and discharge modes. For example, separate compressor/turbine pairs may be used in charge and discharge cycles. In one implementation, the system has one set of heat exchangers, and a common set of HTS and CTS tanks which are charged or discharged by two pairs or sets of compressors and turbines. In another implementation, the system has a common set of HTS and CTS tanks, but separate sets of heat exchangers and separate sets of compressors and turbines.

Pumped thermal systems with recuperation, utilization of external sources of heat, cold and/or waste heat/cold may benefit from having separate compressor/turbine pairs as a result of operation of turbomachinery over large and/or different temperature ranges in charge and discharge modes. For example, temperature changes between charge and discharge cycles may lead to a thermal adjustment period or other difficulties during transition between the cycles (e.g., issues or factor related to metallurgy, thermal expansion, Reynolds number, temperature dependent compression ratios, tip clearance and/or bearing friction etc.). In another example, turbomachinery (e.g., turbomachinery used in systems with recuperation) may operate over a relatively low pressure ratio (e.g., with relatively few compression stages) but over relatively large temperature during both compression and expansion. The temperature ranges may change (e.g., switch as in FIGS. 8A and 8B) between charge and discharge modes. In some cases, the operation over large temperature ranges during compression and/or expansion may complicate design of a combined compressor/turbine for both charge and discharge. Furthermore, recuperation, waste heat/cold incorporation and/or other pumped thermal system features may reduce the compression ratio of the compressor/turbine in the charge cycle and/or the discharge cycle, thereby reducing the cost associated with duplicating compressor/turbine sets.

Figure 14A:
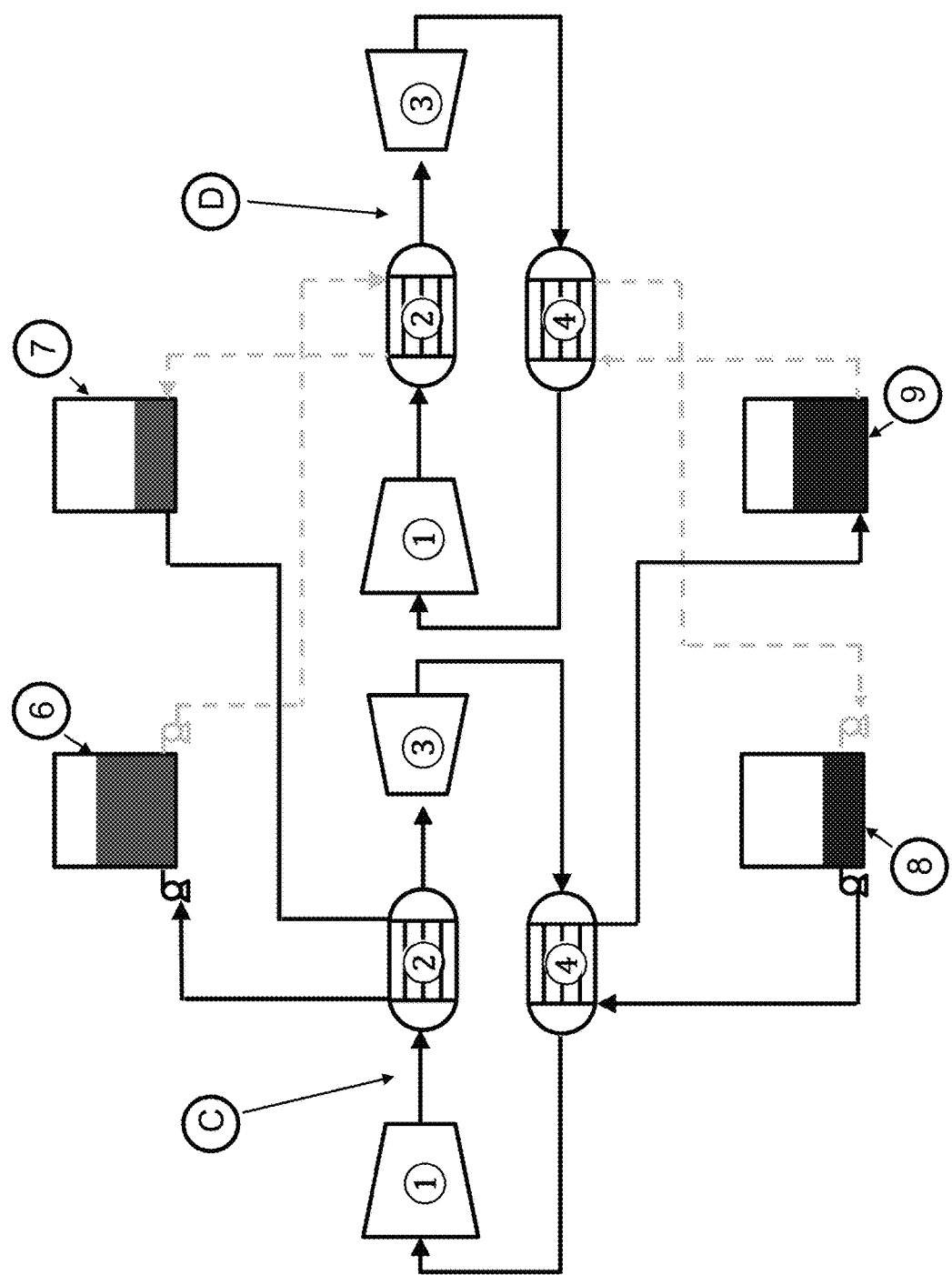
FIGS. 14A and 14B are pumped thermal systems with separate compressor/turbine pairs for charge and discharge modes.
Figure 14B:
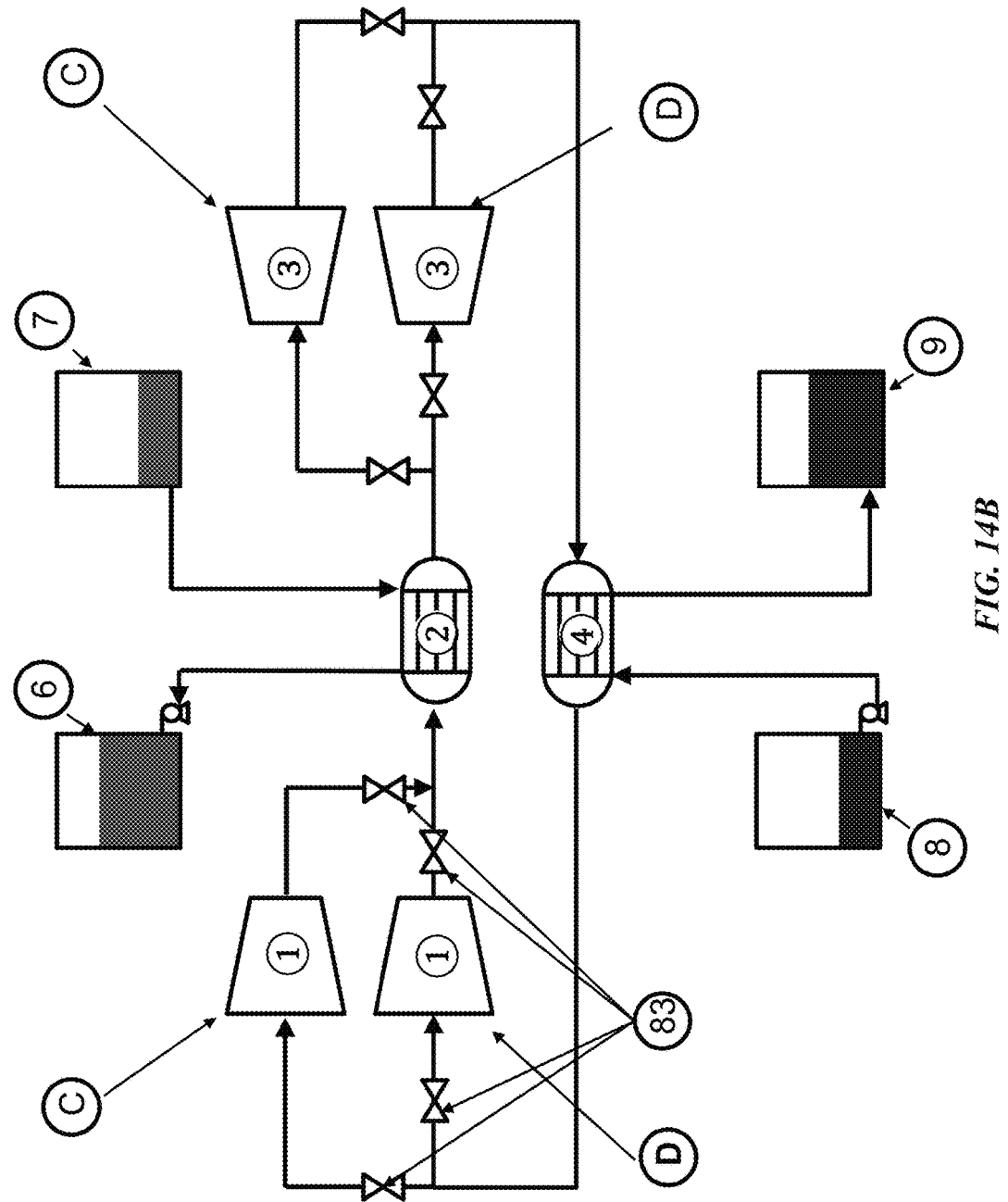

FIGS. 14A and 14B show pumped thermal systems with separate compressor 1/turbine 3 pairs for charge mode C and discharge mode D. The separate compressor/turbine pairs may or may not be ganged on a common mechanical shaft. In this example, the compressor/turbine pairs C and D can have separate shafts 10. The shafts 10 may rotate at the same speed or at different speeds. The separate compressor/turbine pairs or working fluid systems may or may not share heat exchangers (e.g., the heat exchangers 2 and 4).

In the example in FIG. 14A, the system has a common set of HTS tanks 6 and 7 and CTS tanks 8 and 9. The system has separate pairs of heat exchangers 2 and 4 and separate compressor 1/turbine 3 pairs for the charge mode C and the discharge mode D. The HTS and CTS storage media flow paths for the charging cycle are shown as solid black lines. The HTS and CTS storage media flow paths for the discharge cycle are shown as the dashed grey lines.

In the example in FIG. 14B, the system, shown in a charge configuration, has one set of heat exchangers 2 and 4, and a common set of HTS tanks 6 and 7 and CTS tanks 8 and 9. The HTS and CTS tanks can be charged by a compressor/turbine set C, or discharged by a compressor/turbine set D, each set comprising a compressor 1 and a turbine 3. The system may switch between the sets C and D using valves 83. In the example in FIG. 14A, the system, again shown in a charge configuration, has a common set of HTS tanks 6 and 7 and CTS tanks 8 and 9. The HTS and CTS tanks can be charged by the charge set C that includes a first set of the heat exchangers 2 and 4, the compressor 1 and the turbine 3. The HTS and CTS tanks can be discharged by switching to a separate discharge set C that includes a second set of the heat exchangers 2 and 4, the compressor 1 and the turbine 3.

In one example, if the charge and discharge sets of compressors and turbines in FIGS. 14A and 14B are not operated at the same time, the charge and discharge sets may share a common set of heat exchangers that are switched between the turbomachinery pairs using the valves 83. In another example, if the charge and discharge turbomachinery sets or pairs in FIGS. 14A and 14B are operated at the same time (e.g., in order for one set to charge, following intermittent generation, and the other set to discharge at the same time, following load), then each set of turbomachinery may have a dedicated set of heat exchangers. In this instance, the charge and discharge sets may or may not share a set of HTS and CTS tanks.

In some implementations, separate compressor/turbine sets or pairs may advantageously be used in pumped thermal systems used with intermittent and/or variable electric power inputs. For example, a first compressor/turbine set can be used in a charge cycle that follows wind and/or solar power (e.g., electric power input from wind and/or solar power systems) while a second compressor/turbine set can be used in a discharge cycle that follows load (e.g., electric power output to a power grid). In this configuration, pumped thermal systems placed between a power generation system and a load may aid in smoothing variations/fluctuations in input and/or output power requirements.

Hybrid Pumped Thermal Systems

In accordance with another aspect of the disclosure, pumped thermal systems can be augmented by additional energy conversion processes and/or be directly utilized as energy conversion systems without energy storage (i.e., as power generation systems). In some examples, pumped thermal systems herein can be modified to allow for direct power generation using natural gas, Diesel fuel, petroleum gas (e.g., propane/butane), dimethyl ether, fuel oil, wood chips, landfill gas or any other combustible substance (e.g., fossil fuel or biomass) for adding heat to the working fluid on a hot side of a working fluid cycle, and a cold side heat sink (e.g., water) for removing heat from the working fluid on a cold side of the working fluid cycle.

Figure 15A:
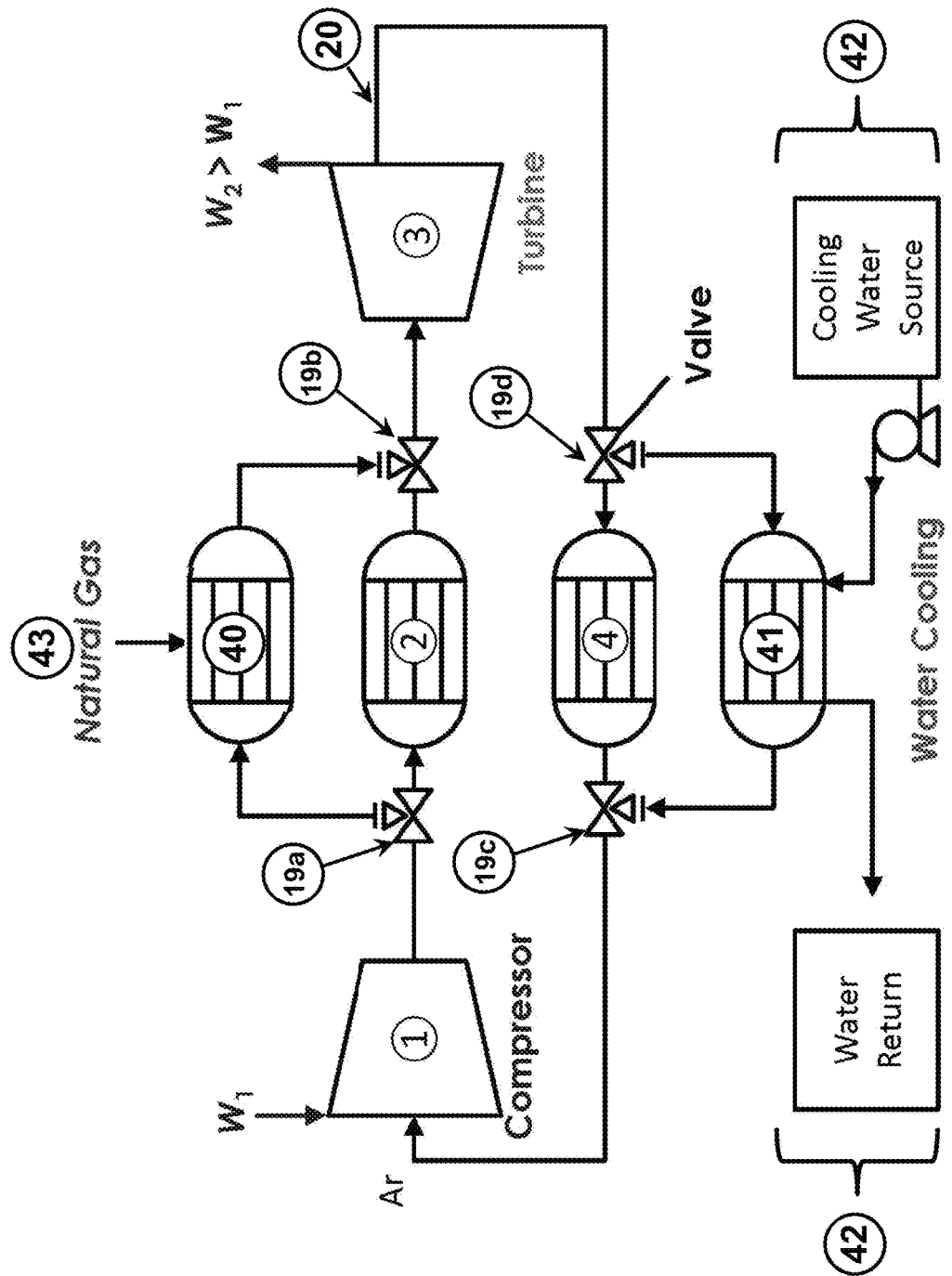
FIGS. 15A and 15B show pumped thermal systems configured in a combustion heat input generation mode.
Figure 15B:
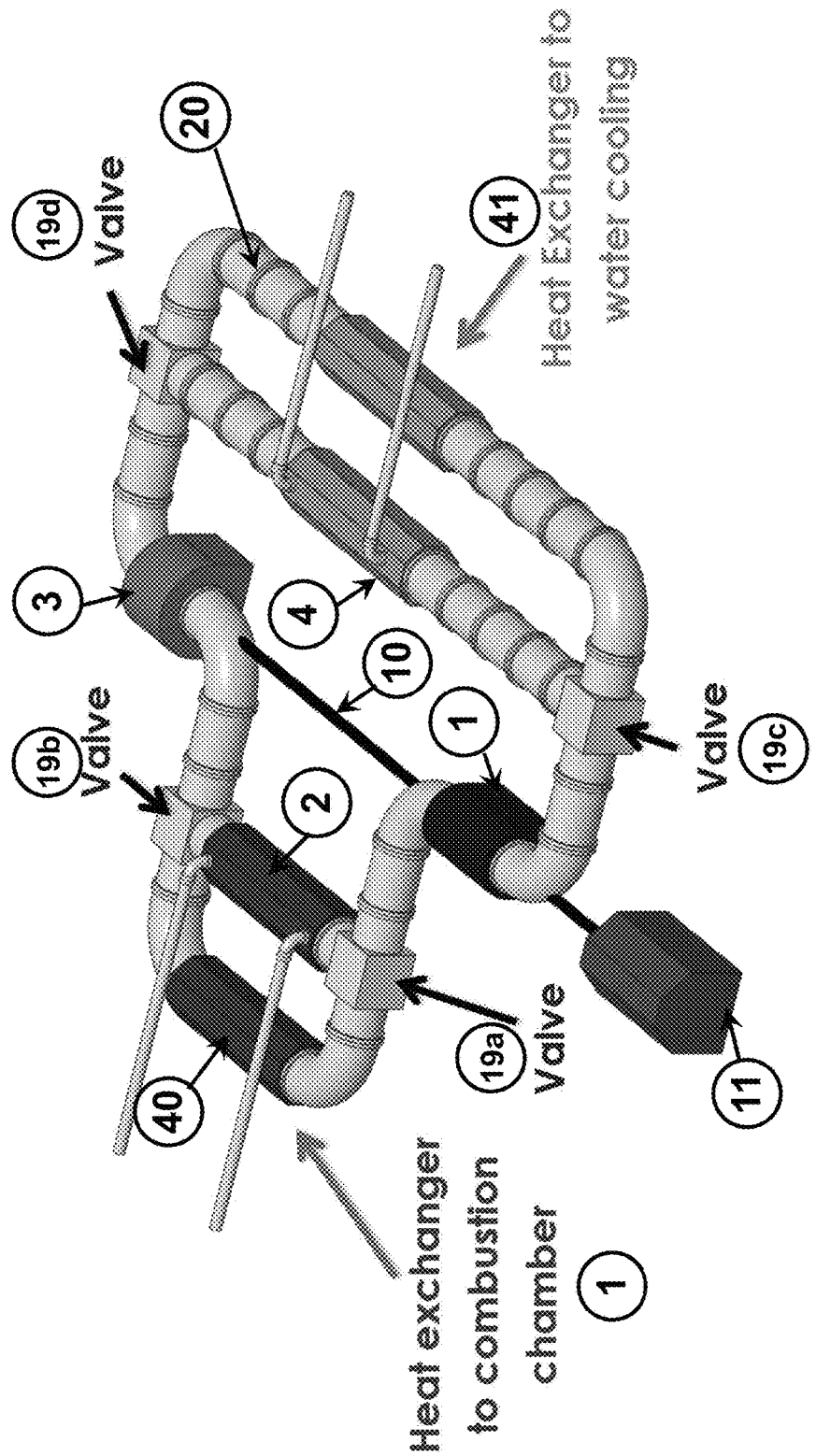

FIGS. 15A and 15B show pumped thermal systems configured in generation mode. In some examples, pumped thermal systems herein can be modified by adding two additional heat exchangers 40 and 41, four additional valves 19a, 19b, 19c and 19d, a heat sink (e.g., a water cooling system; water from a fresh water reservoir such as a river, a lake or a reservoir; salt water from a salt water reservoir such as a sea or an ocean; air cooling using radiators, fans/blowers, convection; or an environmental heat sink such as ground/soil, cold air etc.) 42, and a heat source (e.g., a combustion chamber with a fuel-oxidant mixture) 43. The heat source 43 can exchange heat with a first of the two additional heat exchangers 40, and the heat sink 42 can exchange heat with a second of the two additional heat exchangers 41. The heat source 43 may be used to for exchanging heat with the working fluid 20.

The heat source 43 may be a combustion heat source. In some examples, the combustion heat source can comprise a combustion chamber for combusting a combustible substance (e.g., a fossil fuel, a synthetic fuel, municipal solid waste (MSW) or biomass). In some cases, the combustion chamber may be separate from the heat exchanger 40. In some cases, the heat exchanger 40 may comprise the combustion chamber. The heat source 43 may be a waste heat source, such as, for example waste heat from a power plant, an industrial process (e.g., furnace exhaust).

In some examples, a solar heater, a combustion heat source, a waste heat source, or any combination thereof may be used for heating the hot side heat storage fluid and/or the working fluid. In an example, the working fluid can be heated directly using any of these heat sources. In another example, the hot side heat storage fluid (or HTS medium) can be heated using any of these heat sources. In another example, the hot side heat storage fluid (or HTS medium) can be heated in parallel with the working fluid using any of these heat sources.

The pumped thermal systems in FIGS. 15A and 15B may be operated as hybrid systems. For example, the valves 19a, 19b, 19c and 19d can be used to switch between two modes. When the valves are in a first position, the system can operate as a pumped thermal storage system (e.g., closed system in charge/discharge mode). In this configuration, the working fluid 20 (e.g., argon or air) can exchange heat with an HTS medium (e.g., molten salt) in the hot side heat exchanger 2 and with a CTS medium (e.g., hexane) in the cold side heat exchanger 4. When the valves are in a second position, the system can operate as a power generation system (e.g., open system in generation mode). In this configuration, the heat exchangers 2 and 4 may be bypassed, and the working fluid 20 can exchange heat with the combustion chamber 43 in the hot side heat exchanger 40 and with the heat sink 42 in the cold side heat exchanger 41. Any description of configuration and/or design of heat transfer processes (e.g., heat transfer in heat exchangers) described herein in relation to pumped thermal systems may also be applied to hybrid pumped thermal systems, and vice versa. For example, the heat sink 42, the heat source 43, the heat exchangers 40 and 41, and/or the quantity of heat transferred on the cold side and/or the hot side may be configured to decrease or minimize entropy generation associated with heat transfer processes and/or to maximize system efficiency.

In some implementations, the hybrid systems may operate in storage and generation modes simultaneously. For example, the valves 19a, 19b, 19c and 19d can be configured to allow a given split between a working fluid flow rate to the heat exchangers 40 and 41 and a working fluid flow rate to the heat exchangers 2 and 4. Alternatively, the hybrid systems may operate exclusively in storage mode, or exclusively in generation mode (e.g., as a natural gas peaking plant). In some cases, the split between modes may be selected based on system efficiency, available electric power input (e.g., based on availability), desired electric power output (e.g., based on load demand) etc. For example, thermal efficiency of an ideal system (i.e., assuming isentropic compression and expansion processes, ideal heat transfer processes) operating exclusively in generation mode can be the thermal efficiency of a working fluid undergoing an ideal Brayton cycle. In some examples, thermal efficiencies in hybrid systems of the disclosure (e.g., exclusive and/or split mode operation) can be at least about 10%, at least about 20%, at least about 30%, at least about 40%, at least about 50%, at least about 60%, or more.

The heat source 43 may be used for exchanging heat with an HTS medium (e.g., a molten salt). For example, the combustion heat source 43 may be used for heating the HTS medium 21. In some instances, rather than using the combustion heat source 43 for exchanging heat in the heat exchanger 40 or for directly exchanging heat between flue gases from the combustion heat source and the working fluid, the combustion heat source 43 may be used to heat up the HTS medium 21 between the two HTS tanks 7 and 6.

Figure 15C:
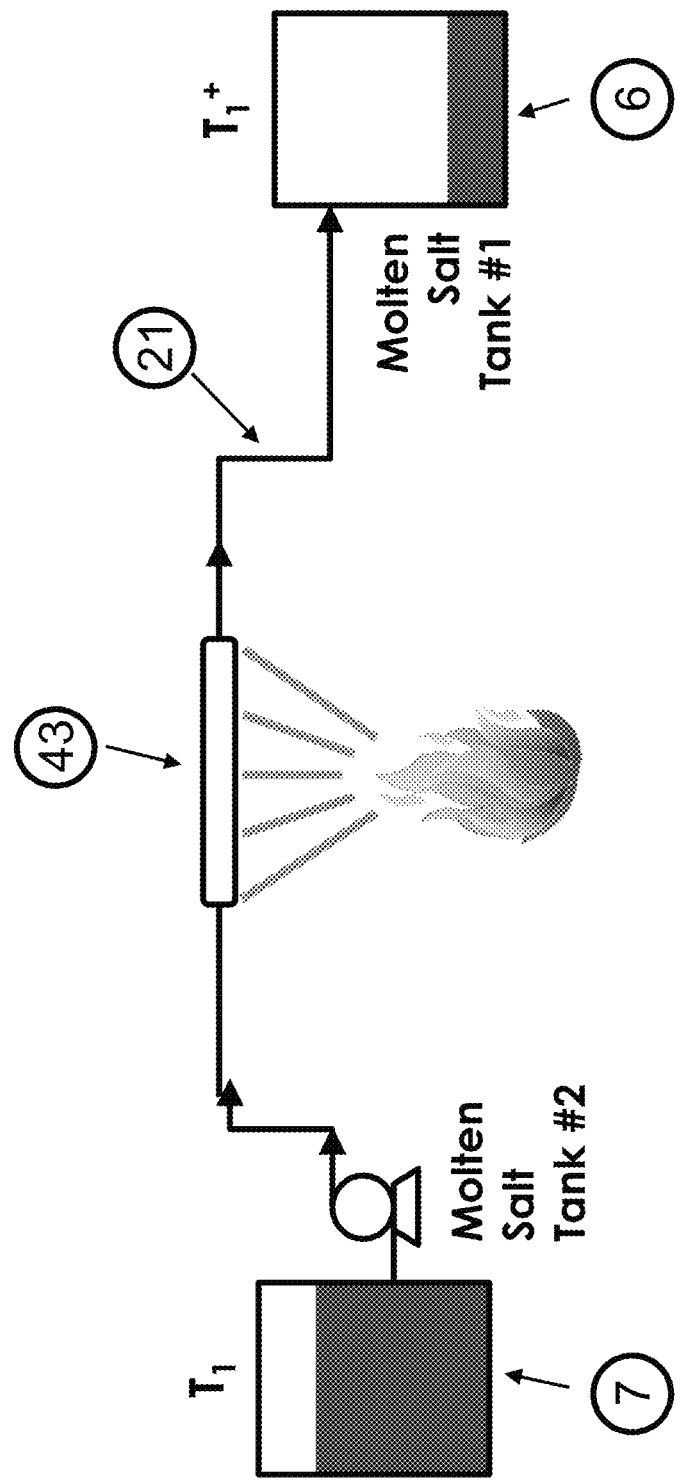
FIG. 15C is a schematic flow diagram of hot side recharging in a pumped heat cycle through heating by a combustion heat source or a waste heat source.

FIG. 15C is a schematic flow diagram of hot side recharging in a pumped heat cycle through heating by the heat source 43 (e.g., combustion heat source, waste heat source). In an example, the heat source 43 is a waste heat source, such as a waste heat source from a refinery or other processing plant. In an example, the heat source 43 is obtained from combusting natural gas in order to ensure the delivery of electricity even if the pumped thermal system runs out of charged storage media. For example, recharging of the hot side storage media using the heat source 43 may provide an advantage over recharging using electricity or other means (e.g., the price of electricity at the time may be too high). The heat source 43 can be used to heat up the HTS medium 21 from the temperature $T_1$ in the tank 7 to the temperature $T_1^+$ in the tank 6. The HTS medium can then be used in the CFX 2 for exchanging heat with the working fluid to in a discharge cycle, such as, for example, the discharge cycles in FIGS. 9G and 9H.

In some examples, such as, for example, when the CTS medium is a combustible substance such as a fossil fuel (e.g., hexane or heptanes), burning of the CTS medium stored in the CTS tanks (e.g., the tanks 8 and 9) may be used for providing thermal energy for heating the HTS medium as shown, for example, in FIG. 15C or for operation of the cycles in the configurations shown, for example, in FIGS. 15A and 15B.

The systems of the disclosure may be capable of operating both in an electricity only storage cycle (comprising heat transfer with an HTS medium and a CTS medium below ambient temperature) and in a heat engine to ambient cycle, where, in a discharge mode, heat is input from the HTS medium to the working fluid and rejected to the ambient environment rather than to the CTS medium. This capability may enable the use of heating of the HTS with combustible substances (e.g., as shown in FIG. 15C) or the use of solar heating of the HTS (e.g., as shown in FIG. 9C). Heat rejection to ambient may be implemented using, for example, the discharge cycles in FIGS. 9G and 9H. In some cases, heat may be rejected to the environment with the aid of the ITS medium 61 or the intermediate medium 62.

The systems of the disclosure may be capable of operating both in an electricity only storage cycle (comprising heat transfer with an HTS medium and a CTS medium below ambient temperature) and in a refrigerator to ambient cycle, where, in a cold side recharge mode, heat is taken from the CTS medium and rejected to the ambient environment in order to lower the temperature of the CTS. This capability may be paired with the use of solar heating of the HTS (e.g., as shown in FIG. 9C). Heat rejection to ambient may be implemented using, for example, the cold side recharge cycle in FIG. 9F.

Aspects of the disclosure may be synergistically combined. For example, the systems capable of operating both in an electricity only storage cycle and in a heat engine to ambient cycle and/or the systems capable of operating both in an electricity only storage cycle and in a refrigerator to ambient cycle may comprise a recuperator. Any description in relation to such hybrid systems without a recuperator may readily be applied to hybrid systems with a recuperator at least in some configurations. In some instances, the hybrid systems may be implemented using, for example, the parallel, valved configuration in FIG. 15A. For example, in such configurations, the counter-flow heat exchangers 2 in FIGS. 9A, 9B and 9F may be implemented as separate counter-flow heat exchangers 67 for exchanging heat with the ambient environment, and may be used in combination with hot side counter-flow heat exchangers 2 of the disclosure. Similarly, the counter-flow heat exchangers 4 in FIGS. 9G and 9H may be implemented as separate counter-flow heat exchangers 67 for exchanging heat with the ambient environment, and may be used in combination with cold side counter-flow heat exchangers 4 of the disclosure.

In some implementations, the systems herein may be configured to enable switching between different cycles of the disclosure using a shared set of valves and pipes. For example, the system may be configured to switch between the electricity only charge cycle (such as shown in, for example, FIG. 7C), the electricity only discharge cycle (such as shown in, for example, FIG. 7D), the cold side recharging refrigeration cycle (such as shown in, for example, FIG. 9F), and the heat engine to ambient cycle (such as shown in FIG. 9H).

Schematic diagrams of exemplary piping and valve configurations for achieving working fluid flow in various counter-flow thermodynamic cycles are shown in FIGS. 13A, 13B, 13C and 13D. Such configurations may be advantageous as they may reuse at least a portion, or a substantial portion or majority of the same piping for the working fluid between a subset of modes or between all modes implemented in a given system. While the working fluid changes may change direction between cycles, the temperature profile of the heat exchangers 2 (e.g., hot side CFX), 5 (e.g., recuperator) and 4 (e.g., cold side CFX) can be kept constant, partially constant, or substantially or fully constant by changing the direction in which the HTS medium 68 and the CTS medium 69 are pumped as needed, and by matching the heat fluxes of the working fluid, the HTS medium 68 and the CTS medium 69 appropriately. For example, the cycles in FIGS. 13A, 13B, 13C and 13D can share a common set of pipes 66 and valves 65 that the working fluid can flow through in all four cycles. In some cases, implementation of a given cycle (e.g., which of the cycles is run) may depend on what position the valves 65 are in and/or the direction and flow rate of the HTS medium 68, the CTS medium 69 and an ambient temperature cooling fluid 70 (e.g., the intermediate fluid 57, the ITS medium 61 or the intermediate fluid 62) through the heat exchangers.

The symbols 65 in FIGS. 13A-13D represent either three-way or four-way valves. The white quadrants indicate the direction in which the working fluid is allowed to pass, black quadrants indicate where flow is blocked. For example, a valve symbol with white quadrants on left and right and black quadrants on top and bottom will allow the working fluid to pass from left to right and not in any other direction. The paths 66 represent a series of pipes in which the working fluid 20 flows. The pipes 66 may in some cases be thermally insulated and/or rated at a given pressure or range of pressures. The pipes 66 may be so designed as to minimize losses due to turbulence and or pressure drop. Working fluid flow is indicated by light arrows inside the pipes 66.

Figure 13A:
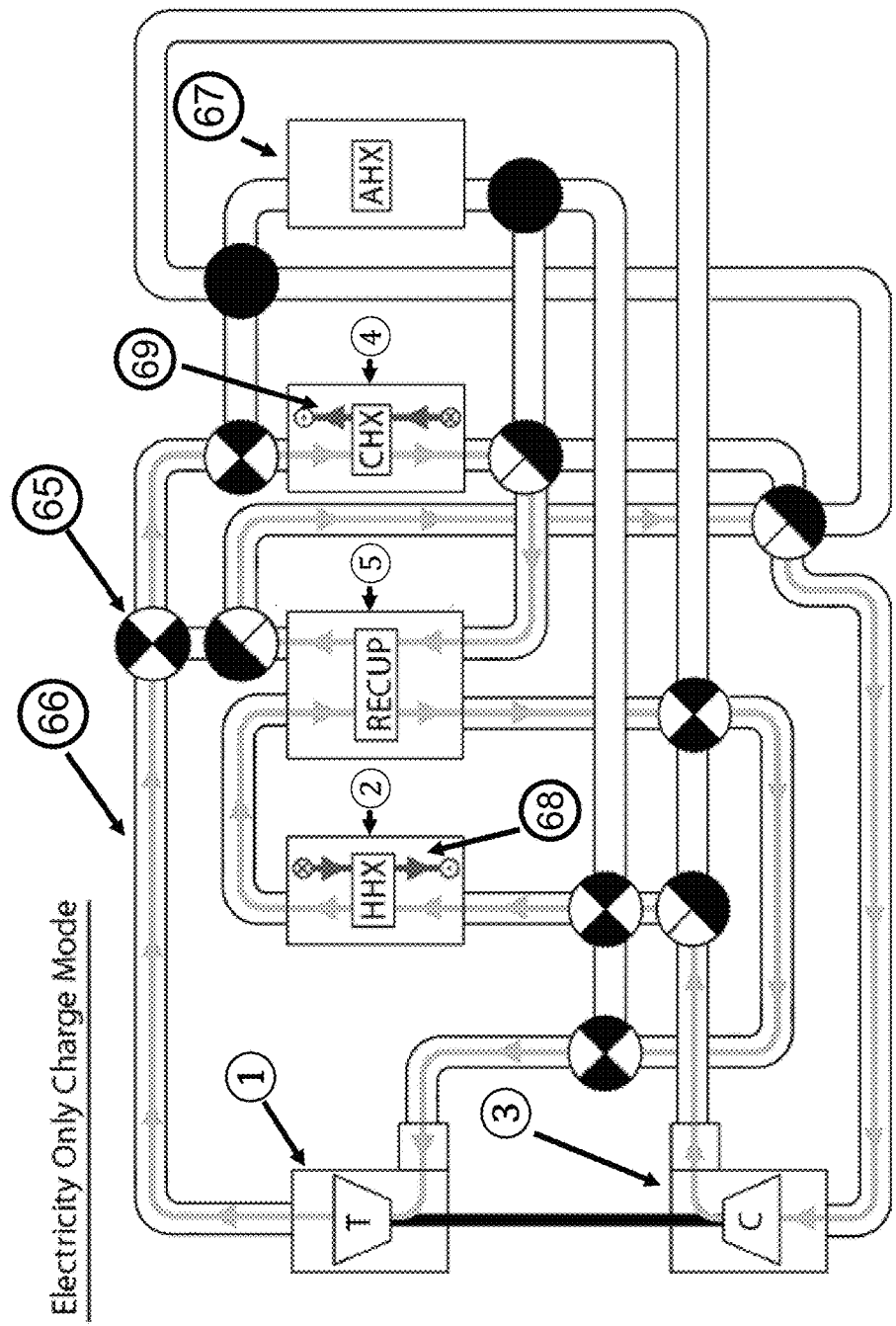
FIG. 13A is a schematic diagram of an exemplary piping and valve configuration for achieving the electricity only charge cycle in FIG. 7C. The circular black and white symbols represent three-way or four-way valves. Arrows in pipes represent working fluid flow.
Figure 13B:
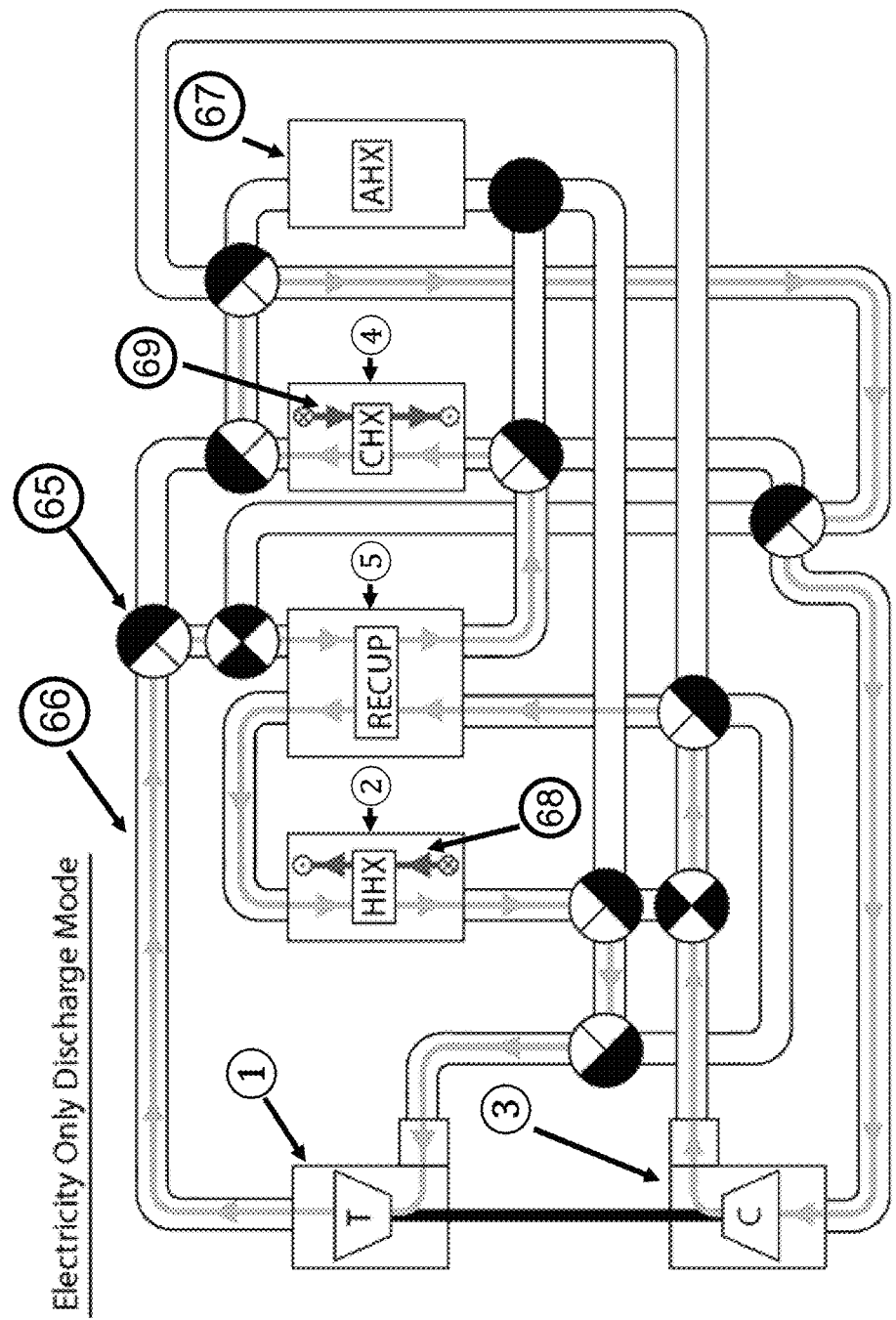
FIG. 13B is a schematic diagram of an exemplary piping and valve configuration for achieving the electricity only discharge cycle in FIG. 7D. The circular black and white symbols represent three-way or four-way valves. Arrows in pipes represent working fluid flow.
Figure 13C:
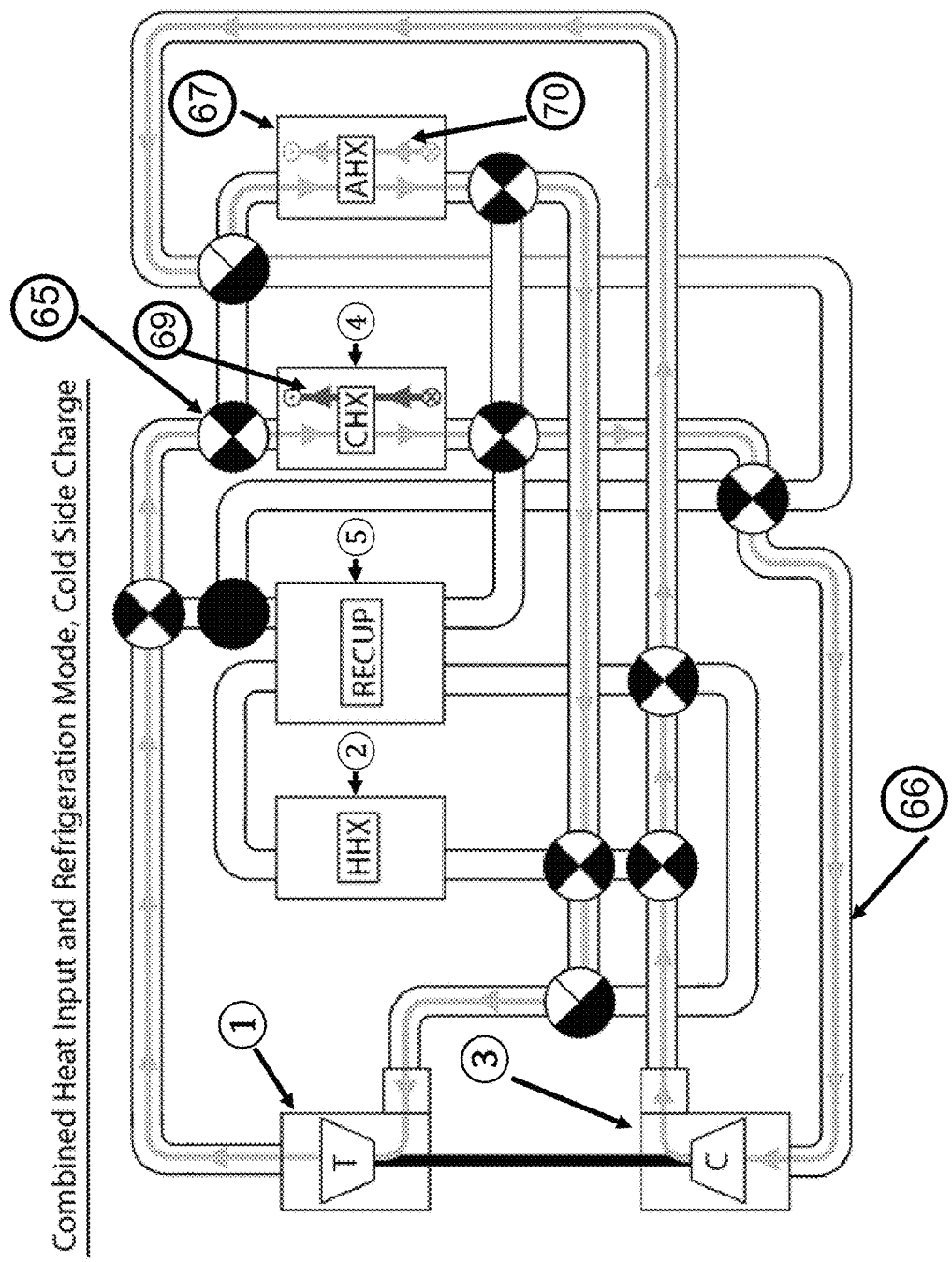
FIG. 13C is a schematic diagram of an exemplary piping and valve configuration for achieving the cold side recharging refrigeration cycle in FIG. 9F or 9A. The circular black and white symbols represent three-way or four-way valves. Arrows in pipes represent working fluid flow.
Figure 13D:
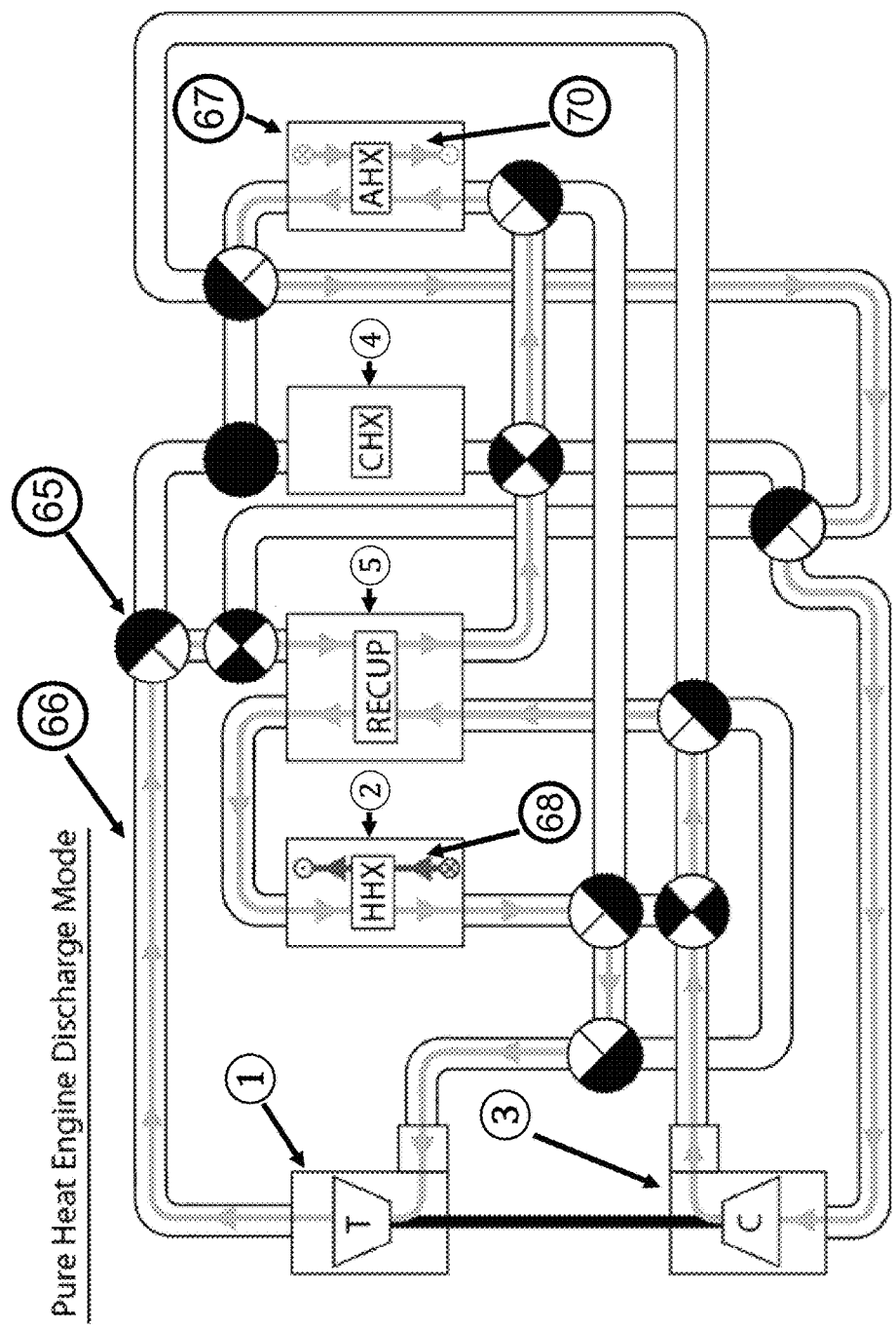
FIG. 13D is a schematic diagram of an exemplary piping and valve configuration for achieving heat engine to ambient cycle in FIG. 9H or 9G with addition of a gas-gas heat exchanger. The circular black and white symbols represent three-way or four-way valves. Arrows in pipes represent working fluid flow.

FIG. 13A is a schematic diagram of an exemplary piping and valve configuration for achieving the electricity only charge cycle such as shown in, for example, FIG. 7C. FIG. 13B is a schematic diagram of an exemplary piping and valve configuration for achieving the electricity only discharge cycle such as shown in, for example, FIG. 7D. FIG. 13C is a schematic diagram of an exemplary piping and valve configuration for achieving the cold side recharging refrigeration cycle such as shown in, for example, FIG. 9F. This configuration may also apply to the cold side recharging refrigeration cycle in FIG. 9A (e.g., a refrigeration to ambient cycle). In an example, the working fluid in FIG. 13C does not flow or pass through the recuperator 5. In some examples, an additional set of valves and pipes may be used to implement a cold side recharging refrigeration cycle where the working fluid passes through the recuperator 5. FIG. 13D is a schematic diagram of an exemplary piping and valve configuration for achieving heat engine to ambient cycle such as shown in, for example, FIG. 9H. This configuration may also apply to the heat engine to ambient cycle in FIG. 9G. In an example, the working fluid in FIG. 13D flows or passes through the recuperator 5. In some examples, an additional set of valves and pipes may be used to implement a heat engine to ambient cycle where the working fluid does not pass through the recuperator 5.

The examples in FIGS. 13A, 13B, 13C and 13D illustrate an operating principle of a valving and piping system configured such that the different cycles of the system can be interchanged while maintaining the same, partially the same, or substantially the same temperature profile across at least one of the counter-flow heat exchangers, across a subset of the counter-flow heat exchangers, or across all of the counter-flow heat exchangers in the system. This may be advantageous as the heat capacities of the heat exchangers themselves can mean that changing their temperature profiles between cycles may result in additional system losses. The example schematics also demonstrate the design principle of striving to keep the total amount of piping and valving to a minimum by reusing them for different cycles where possible. In various examples, different configurations of piping and valves, and/or a different number of pipes or valves may be used.

Pumped Thermal Systems with Pressure Regulation Power Control

In an aspect of the disclosure, the pressure of working fluids in pumped thermal systems can be controlled to achieve power control. In an example, the power provided to a closed system in charge mode and/or the power extracted from the closed system in discharge and/or generation mode (e.g., work input/output using the shaft 10) is proportional to the molar or mass flow rate of the circulating working fluid. The mass flow rate is proportional to density, area, and flow velocity. The flow velocity can be kept fixed in order to achieve a fixed shaft speed (e.g., 3600 rpm in accordance with power grid requirements). Thus, as the pressure of the working fluid changes, the mass flow rate and the power can change. In an example, as the mass flow rate increases in a discharge and/or generation mode, more load should be added to the system to maintain a constant speed of the rotating shaft, and vice versa. In another example, if load is reduced during operation in a discharge and/or generation mode, the reduced load can cause the shaft speed to increase, thus increasing the mass flow rate. For some period of time, before the heat stored in the thermal capacity of the heat exchangers themselves is dissipated, this increased mass flow rate can lead to an increase in the power delivered, in turn increasing the shaft speed. The shaft speed and the power can continue to increase uncontrollably, resulting in a runaway of the rotating shaft. In some examples, pressure regulation may enable control, and thus stabilization of runaway, through adjustment of the amount (e.g., density) of circulating working fluid in accordance with system requirements. In an example where shaft speed (and turbomachinery, such as a turbine, attached to the shaft) begins to run away, a controller can reduce the mass of circulating working fluid (e.g., mass flow rate) in order to decrease the power delivered, in turn decreasing the shaft speed. Pressure regulation may also allow for an increase in mass flow rate in response to an increase in load. In each of these instances, the flow rates of the HTS and CTS media through the heat exchangers can be matched to the heat capacity of the working fluid passing through the heat exchangers.

In some examples, the working fluid pressure in the closed system can be varied by using an auxiliary working fluid tank in fluid communication with the closed system. In this configuration, power input/output can be decreased by transferring the working fluid from the closed cycle loop to the tank, and power input/output can be increased by transferring the working fluid from the tank to the closed cycle loop. In an example, when the pressure of the working fluid is decreased, less heat can be transferred between the thermal storage tanks on the hot and cold sides of the system as a result of the decreased mass flow rate and less power can be input to/output by the system.

As the pressure of the working fluid is varied, the compression ratios of turbomachinery components may remain substantially unchanged. In some cases, one or more operating parameters and/or configuration (e.g., variable stators, shaft speed) of turbomachinery components can be adjusted in response to a change in working fluid pressure (e.g., to achieve a desired performance of the system). Alternatively, one or more pressure ratios may change in response to a change in working fluid pressure.

In some cases, reduced cost and/or reduced parasitic energy consumption may be achieved using the power control configuration relative to other configurations (e.g., using a choke valve for controlling the flow of the working fluid). In some examples, variation of working fluid pressure while keeping the temperature and flow velocity constant (or near-constant) may lead to negligible entropy generation. In some examples, an increase or decrease in system pressure may lead to changes in, for example, turbomachinery efficiencies.

Figure 16:
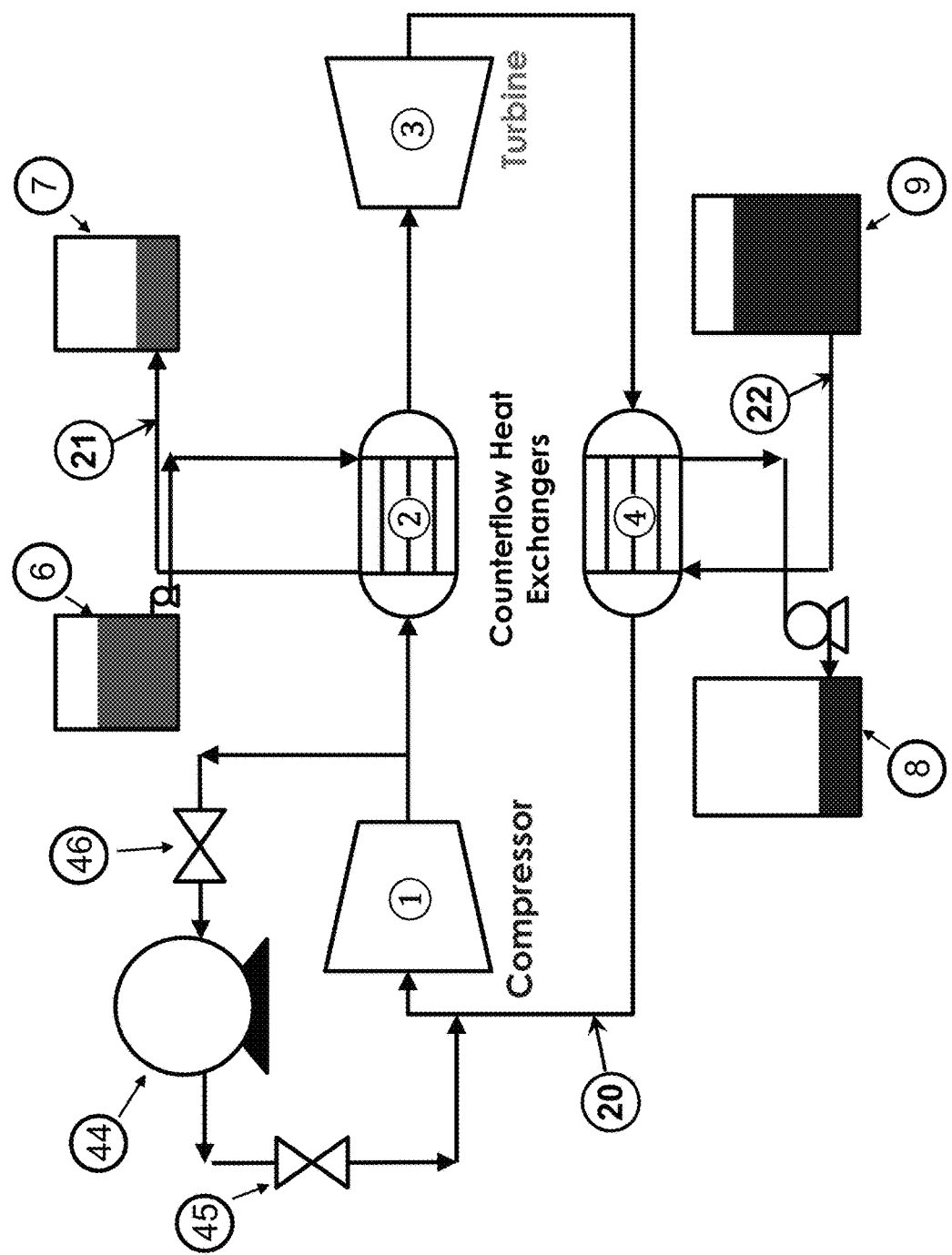
FIG. 16 shows an example of a pumped thermal system with pressure regulated power control.

FIG. 16 shows an example of a pumped thermal system with power control. The temperature of the working fluid on the hot and cold sides of the system may remain constant or near-constant for a given period of time regardless of working fluid mass flow rate due to large heat capacities of the heat exchangers 2 and 4 and/or the hot and cold side thermal storage media in the tanks 6, 7, 8 and 9. In some examples, the flow rates of the HTS and CTS media through the heat exchangers 2 and 4 are varied in concert with a change in the pressure of the working fluid in order to keep the temperatures in the heat exchangers and working fluid optimized over longer time periods. Thus, pressure can be used to vary the mass flow rate in the system. One or more auxiliary tanks 44 filled with the working fluid 20 (e.g., argon or argon-helium mix) can be in fluid communication with a hot (e.g., high pressure) side of the pumped thermal system and/or a cold (e.g., low pressure) side of the pumped thermal system. In some examples, the auxiliary tank can be in fluid communication with the working fluid adjacent to an inlet of the compressor 1 and/or adjacent to an outlet of the compressor 1. In some examples, the auxiliary tank can be in fluid communication with the working fluid adjacent to an inlet of the turbine 3 and/or adjacent to an outlet of the turbine 3. In further examples, the auxiliary tank can be in fluid communication with the working fluid in one or more locations system (e.g., one or more locations on the high pressure side of the system, on the low pressure side of the system, or any combination thereof). For example, the auxiliary tank can be in fluid communication with the working fluid on a high pressure side and a low pressure side of the closed cycle. In some cases, the fluid communication on the high pressure side can be provided after the compressor and before the turbine. In some cases, the fluid communication on the low pressure side can be provided after the turbine and before the compressor. In some instances, the auxiliary tank can contain working fluid at a pressure intermediate to the high and low pressures of the system. The working fluid in the auxiliary tank can be used to increase or decrease the amount of working fluid 20 circulating in the closed cycle of the pumped thermal system. The amount of working fluid circulating in the closed cycle loop can be decreased by bleeding the working fluid from the high pressure side of the closed cycle loop into the tank through a fluid path containing a valve or mass flow controller 46, thereby charging the tank 44. The amount of working fluid circulating in the closed cycle loop can be increased by bleeding the working fluid from the tank into the low pressure side of the closed cycle loop through a fluid path containing a valve or mass flow controller 45, thereby discharging the tank 44.

Power control over longer timescales may be implemented by changing the pressure of the working fluid and by adjusting the flow rates of the hot side 21 and cold side 22 thermal storage fluids through the heat exchangers 2 and 4, respectively.

In some examples, flow rates of the thermal storage media 21 and/or 22 may be controlled (e.g., by a controller) to maintain given heat exchanger inlet and outlet temperatures. In some examples, a first controller(s) may be provided for controlling the flow rates (e.g., mass flow rates) of thermal storage media, and a second controller may be provided for controlling the mass flow rate (e.g., by controlling mass, mass flow rate, pressure etc.) of the working fluid.

Pumped Thermal Systems with Pressure-Encased Motor/Generator

In another aspect of the disclosure, pumped thermal systems with a pressure-encased motor/generator are provided. The pressure-encased motor/generator may be provided as an alternative to configurations where a shaft (also "crankshaft" herein) penetrates through a working fluid containment wall (where it can be exposed to one or more relatively high pressure differentials) in order to connect to a motor/generator outside the working fluid containment wall. In some cases, the shaft may be exposed to pressures and temperatures of the working fluid in the low pressure portion of the working fluid cycle, in the high pressure portion of the working fluid cycle, or both. In some cases, crankshaft seal(s) capable of holding back the pressures which the crankshaft is exposed to inside the working fluid containment wall can be difficult to manufacture and/or difficult to maintain. In some cases, a rotating seal between high and low pressure environments may be difficult to achieve. Thus, coupling of the compressor and turbine to the motor/generator can be challenging. In some implementations, the motor/generator can therefore be placed entirely within the low pressure portion of the working fluid cycle, such that the exterior pressure vessel or working fluid containment wall may not need to be penetrated.

Figure 17:
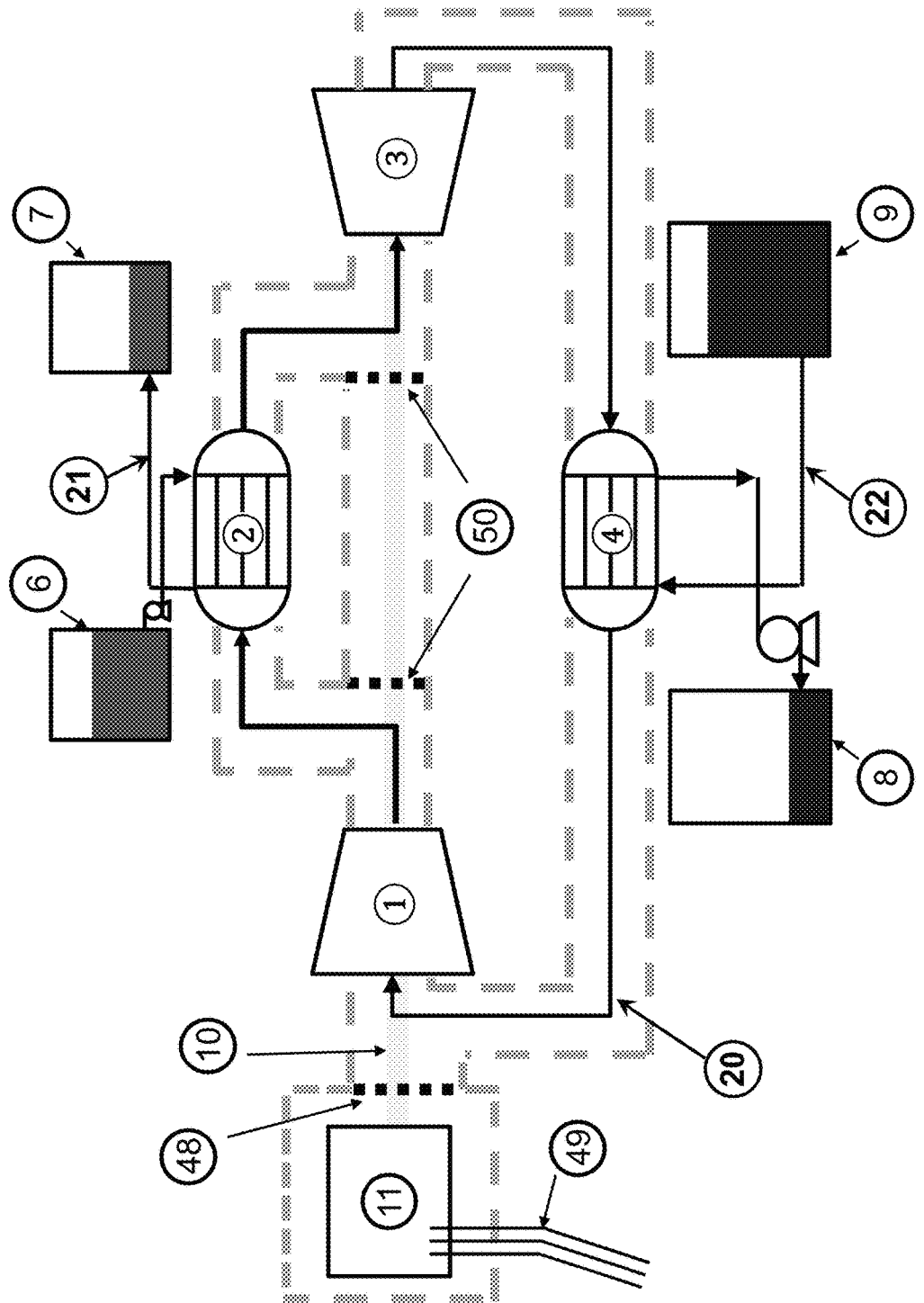
FIG. 17 shows an example of a pumped thermal system with a pressure encased generator.

FIG. 17 shows an example of a pumped thermal system with a pressure encased generator 11. The motor/generator is encased within the pressure vessel or working fluid containment wall (shown as dashed lines) and only feed-through electric leads 49 penetrate through the pressure vessel. A thermal insulation wall 48 is added between the motor/generator 11 and the working fluid in the low pressure portion of the cycle. The technical requirements for achieving an adequate seal through the thermal insulation wall can be less stringent due to the pressure being the same on both sides of the thermal insulation wall (e.g., both sides of the thermal insulation wall can be located in the low pressure portion of the cycle). In an example, the low pressure value can be about 10 atm. In some cases, the motor/generator may be adapted for operation at elevated surrounding pressures. An additional thermal insulation wall 50 can be used to create a seal between the outlet of the compressor 1 and the inlet of the turbine 3 in the high pressure portion of the cycle. In some examples, placing the motor/generator on the cold side of the pumped thermal systems may be beneficial to the operation of the motor/generator (e.g., cooling of a superconducting generator).

Pumped Thermal Systems with Variable Stator Pressure Ratio Control

A further aspect of the disclosure relates to control of pressure in working fluid cycles of pumped thermal systems by using variable stators. In some examples, use of variable stators in turbomachinery components can allow pressure ratios in working fluid cycles to be varied. The variable compression ratio can be accomplished by having movable stators in the turbomachinery.

In some cases, pumped thermal systems (e.g., the systems in FIGS. 8A and 8B) can operate at the same compression ratio in both the charge and the discharge cycles. In this configuration, heat can be rejected (e.g., to the environment) in section 38 in the charge cycle and in section 39 in the discharge cycle, wherein the heat in section 38 can be transferred at a lower temperature than the heat in section 39. In alternative configurations, the compression ratio can be varied when switching between the charge cycle and the discharge cycle. In an example, variable stators can be added to both the compressor and the turbine, thus allowing the compression ratio to be tuned. The ability to vary compression ratio between charge and discharge modes may enable heat to be rejected at the lower temperature only (e.g., heat may be rejected in section 38 in the charge cycle but not in section 39 in the discharge cycle). In some examples, a greater portion (or all) of the heat rejected to the environment is transferred at a lower temperature, which may increase the roundtrip efficiency of the system.

Figure 18:
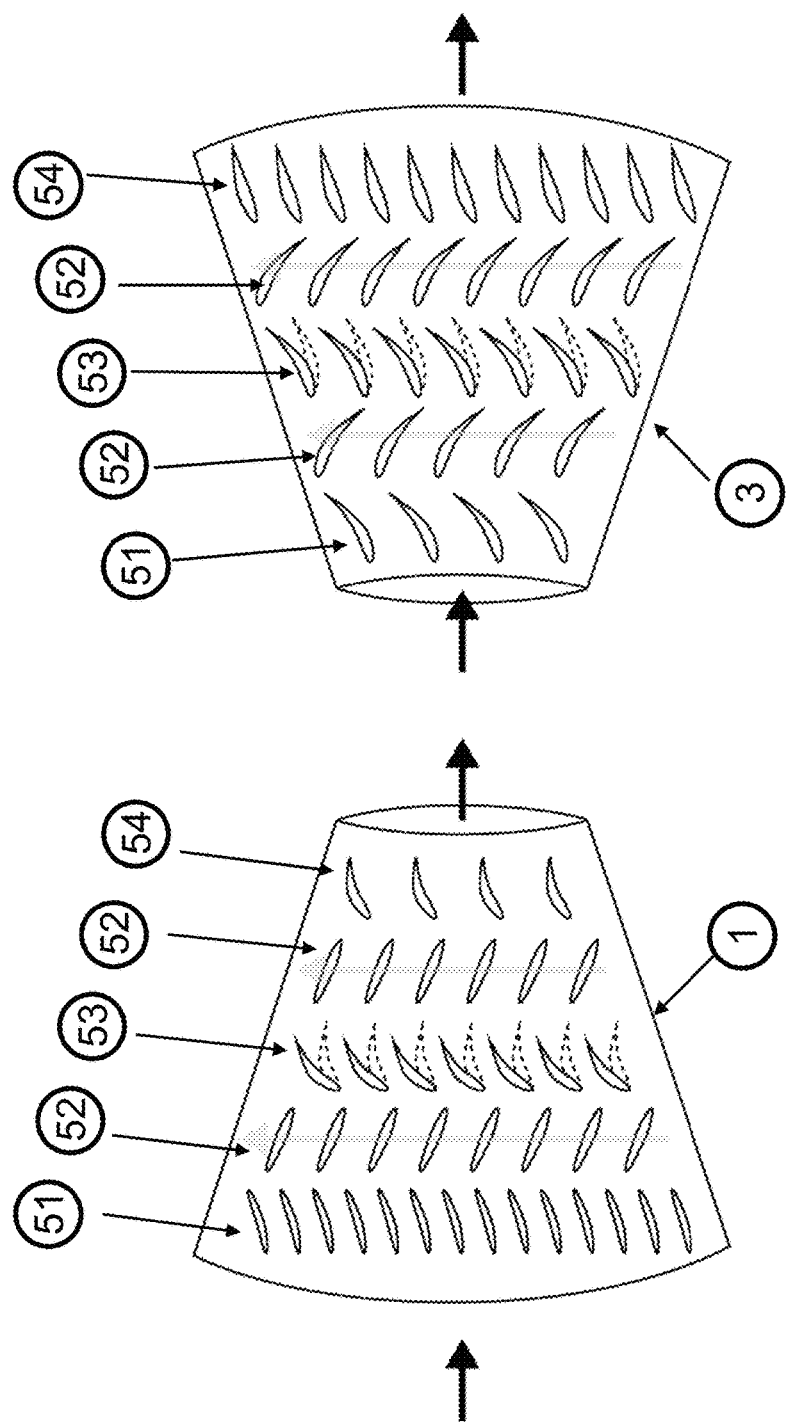
FIG. 18 is an example of variable stators in a compressor/turbine pair.

FIG. 18 is an example of variable stators in a compressor/turbine pair. The compressor 1 and the turbine 3 can both have variable stators, so that the compression ratio for each can be tuned. Such tuning may increase roundtrip efficiency.

The compressor and/or the turbine can (each) include one or more compression stages. For example, the compressor and/or the turbine can have multiple rows of repeating features distributed along its circumference. Each compression stage can comprise one or more rows of features. The rows may be arranged in a given order. In one example, the compressor 1 and the turbine 3 each comprise a sequence of a plurality of inlet guide vanes 51, a first plurality of rotors 52, a plurality of stators 53, a second plurality of rotors 52 and a plurality of outlet guide vanes 54. Each plurality of features can be arranged in a row along the circumference of the compressor/turbine. The configuration (e.g., direction or angle) of the stators 53 can be varied, as indicated in FIG. 18.

The compressor/turbine pair can be matched. In some cases, an outlet pressure of the compressor can be about the same as an inlet pressure of the turbine, and an inlet pressure of the compressor can be about the same as the outlet pressure of the turbine; thus, the pressure ratio across the turbine can be the same as the pressure ratio across the compressor. In some cases, the inlet/outlet pressures and/or the pressure ratios may differ by a given amount (e.g., to account for pressure drop in the system). The use of variable stators on both the compressor and the turbine can allow the compressor and the turbine to remain matched as the compression ratio is varied. For example, using the variable stators, operation of the compressor and the turbine can remain within suitable operating conditions (e.g. within a given range or at a given point on their respective operating maps) as the compression ratio is varied. Operation within given ranges or at given points on turbomachinery operating maps may allow turbomachinery efficiencies (e.g., isentropic efficiencies) and resulting roundtrip storage efficiency to be maintained within a desired range. In some implementations, the use of variable stators can be combined with other methods for varying the compression ratios (e.g. variable shaft rotation speed, bypassing of turbomachinery stages, gears, power electronics, etc.).

Pumped Thermal System Units Comprising Pumped Thermal System Subunits

A further aspect of the disclosure relates to control of charging and discharging rate over a full range from maximum charging/power input to maximum discharging/power output by building composite pumped thermal system units comprised of pumped thermal system subunits. In some examples, pumped thermal systems may have a minimum power input and/or output (e.g., minimum power input and/or minimum power output) above 0% of maximum power input and/or output (e.g., maximum power input and/or maximum power output), respectively. In such cases, a single unit by itself may be able to continuously ramp from the minimum power input to the maximum power input and from the minimum power output to the maximum power output, but may not be able to continuously ramp from the minimum power input to the minimum power output (i.e., from the minimum power input to zero power input/output, and from zero power input/output to the minimum power output). An ability to continuously ramp from the minimum power input to the minimum power output may enable the system to continuously ramp from the maximum power input to the maximum power output. For example, if both the output power and the input power may be turned down all the way to zero during operation, the system may be able to continuously vary the power consumed or supplied across a range from the maximum input (e.g., acting as a load on the grid) to the maximum output (e.g., acting as a generator on the grid). Such functionality may increase (e.g., more than double) the continuously rampable range of the pumped thermal system. Increasing the continuously rampable range of the pumped thermal system may be advantageous, for example, when continuously rampable power range is used as a metric for determining the value of grid assets. Further, such functionality may enable the systems of the disclosure to follow variable load, variable generation, intermittent generation, or any combination thereof.

In some implementations, composite pumped thermal system units comprised of multiple pumped thermal system subunits may be used. In some cases, each subunit may have a minimum power input and/or output above 0%. The continuous ramping of the power from the maximum power input to the maximum power output may include combining a given quantity of the subunits. For example, a suitable (e.g., sufficiently large) number of subunits may be needed to achieve continuous ramping. In some examples, the number of subunits can be at least about 2, 5, 10, 20, 30, 40, 50, 100, 200, 500, 750, 1000, and the like. In some examples, the number of subunits is 2, 5, 10, 20, 30, 40, 50, 100, 150, 200, 250, 300, 350, 400, 450, 500, 550, 600, 650, 700, 750, 800, 850, 900, 950, 1000 or more. Each subunit may have a given power capacity. For example, each subunit can have a power capacity that is less than about 0.1%, less than about 0.5%, less than about 1%, less than about 5%, less than about 10%, less than about 25%, less than about 50%, or less than about 90% of the total power capacity of the composite pumped thermal system. In some cases, different subunits may have different power capacities. In some examples, a subunit has a power capacity of about 10 kW, 100 kW, 500 kW, 1 MW, 2 MW, 5 MW, 10 MW, 20 MW, 50 MW, 100 MW, or more. The continuous ramping of the power from the maximum power input to the maximum power output may include controlling each subunit's power input and/or output (e.g., power input and/or power Output) separately. In some cases, the subunits may be operated in opposing directions (e.g., one or more subunits may operate in. power input mode while one or more subunits may operate in power output mode). In one example, if each pumped thermal system subunit can be continuously ramped between a maximum power input and/or output down to about 50% of the maximum power input and/or output, respectively, three or more such pumped thermal system subunits may be combined into a composite pumped thermal system unit that can be continuously ramped from the maximum input power to the maximum output power. In some implementations, the composite pumped thermal system may not have a fully continuous range between the maximum input power and the maximum output power, but may have an increased number of operating points in this range compared to a non-composite system.

Energy Storage System Units Comprising Energy Storage System Subunits

A further aspect of the disclosure relates to control of charging and discharging rate over a full range from maximum charging/power input to maximum discharging power output by building composite energy storage system units comprised of energy storage system subunits. In some examples, energy storage systems may have a minimum power input and/or output (e.g., minimum power input and/or minimum power output) above 0% of maximum power input and/or output (e.g., maximum power input and/or maximum power output), respectively. In such cases, a single unit by itself may be able to continuously ramp from the minimum power input to the maximum power input and from the minimum power output to the maximum power output, but may not be able to continuously ramp from the minimum power input to the minimum power output (i.e., from the minimum power input to zero power input/output, and from zero power input/output to the minimum power output). An ability to continuously ramp from the minimum power input to the minimum power output may enable the system to continuously ramp from the maximum power input to the maximum power output. For example, if both the output power and the input power may be turned down all the way to zero during operation. the system may be able to continuously vary the power consumed or supplied across a range from the maximum input (e.g., acting as a load on the grid) to the maximum output (e.g., acting as a generator on the grid). Such functionality may increase (e.g., more than double) the continuously rampable range of the energy storage system. Increasing the continuously rampable range of the energy storage system may be advantageous, for example, when continuously rampable power range is used as a. metric for determining the value of grid assets. Further, such functionality may enable the systems of the disclosure to follow variable load, variable generation, intermittent generation, or any combination thereof.

In some implementations, composite energy storage system units comprised of multiple energy storage system subunits may be used. In some examples, any energy storage system having power input/output characteristics that may benefit from a composite configuration may be used. In some examples, systems having power input and/or power output characteristics that may benefit from a composite configuration may include various power storage and/or generation systems such as, for example, natural gas or combined cycle power plants, fuel cell systems, battery systems, compressed air energy storage systems, pumped hydroelectric systems, etc. In some cases, each subunit may have a minimum power input and/or output above 0%. The continuous ramping of the power from the maximum power input to the maximum power output may include combining a given quantity of the subunits. For example, a suitable (e.g., sufficiently large) number of subunits may be needed to achieve continuous ramping. In some examples, the number of subunits can be at least about 2, 5, 10, 20, 30, 40, 50, 100, 200, 500, 750, 1000, and the like. In some examples, the number of subunits is 2, 5, 10, 20, 30, 40, 50, 100, 150, 200, 250, 300, 350, 400, 450, 500, 550, 600, 650, 700, 750, 800, 850, 900, 950, 1000 or more. Each subunit may have a given power capacity. For example, each subunit can have a power capacity that is less than about 0.1%, less than about 0.5%, less than about 1%, less than about 5%, less than about 10%, less than about 25%, less than about 50%, or less than about 90% of the total power capacity of the composite energy storage system. In some cases, different subunits may have different power capacities. In some examples, a subunit has a power capacity of about 10 kW, 100 kW, 500 kW, 1 MW, 2 MW, 5 MW, 10 MW, 20 MW, 50 MW, 100 MW, or more. The continuous ramping of the power from the maximum power input to the maximum power output may include controlling each subunit's power input and/or output (e.g., power input and/or power output) separately. In some cases, the subunits may be operated in opposing directions (e.g., one or more subunits may operate in power input mode while one or more subunits may operate in power output mode). In one example, if each energy storage system subunit can be continuously ramped between a maximum power input and/or output don to about 50% of the maximum power input and/or output, respectively, three or more such energy storage system subunits may be combined into a composite energy storage system unit that can be continuously ramped from the maximum input power to the maximum output power. In some implementations, the composite energy storage system may not have a fully continuous range between the maximum input power and the maximum output power, but may have an increased number of operating points in this range compared to a non-composite system.

Control Systems

Figure 19:
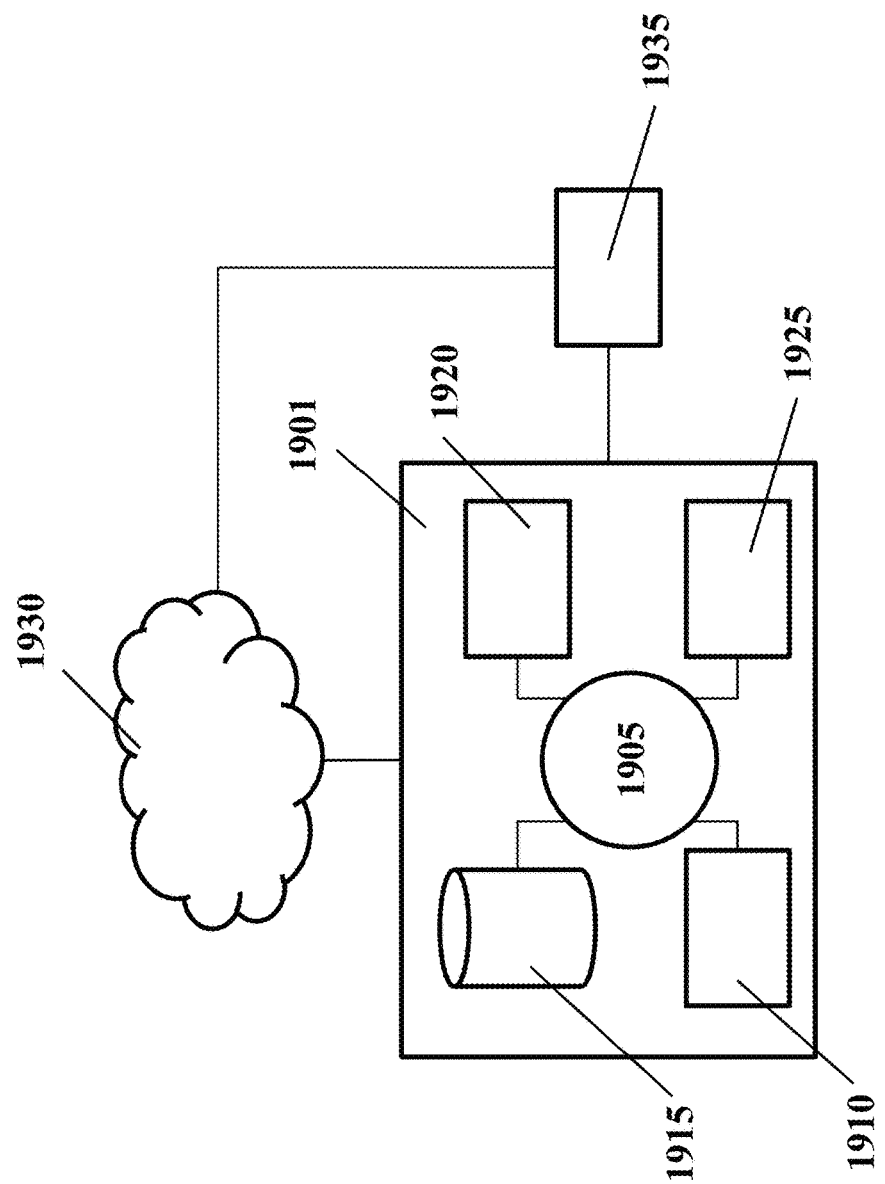
FIG. 19 shows a computer system that is programmed to implement various methods and/or regulate various systems of the present disclosure.

The present disclosure provides computer control systems (or controllers) that are programmed to implement methods of the disclosure. FIG. 19 shows a computer system 1901 (or controller) that is programmed or otherwise configured to regulate various process parameters of energy storage and/or retrieval systems disclosed herein. Such process parameters can include temperatures, flow rates, pressures and entropy changes.

The computer system 1901 includes a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet. The network 1930 in some cases is a telecommunication and/or data network. The network 1930 can include one or more computer servers, which can enable distributed computing, such as cloud computing. The network 1930, in some cases with the aid of the computer system 1901, can implement a peer-to-peer network, which may enable devices coupled to the computer system 1901 to behave as a client or a server.

The computer system 1901 is coupled to an energy storage and/or retrieval system 1935, which can be as described above or elsewhere herein. The computer system 1901 can be coupled to various unit operations of the system 1935, such as flow regulators (e.g., valves), temperature sensors, pressure sensors, compressor(s), turbine(s), electrical switches, and photovoltaic modules. The system 1901 can be directly coupled to, or be a part of, the system 1935, or be in communication with the system 1935 through the network 1930.

The CPU 1905 can execute a sequence of machine-readable instructions, which can be embodied in a program or software. The instructions may be stored in a memory location, such as the memory 1910. Examples of operations performed by the CPU 1905 can include fetch, decode, execute, and writeback.

With continue reference to FIG. 19, the storage unit 1915 can store files, such as drivers, libraries and saved programs. The storage unit 1915 can store programs generated by users and recorded sessions, as well as output(s) associated with the programs. The storage unit 1915 can store user data, e.g., user preferences and user programs. The computer system 1901 in some cases can include one or more additional data storage units that are external to the computer system 1901, such as located on a remote server that is in communication with the computer system 1901 through an intranet or the Internet.

The computer system 1901 can communicate with one or more remote computer systems through the network 1930. For instance, the computer system 1901 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system configured to operate in at least three modes, including a pumped thermal storage mode, a power generation mode, and a hybrid mode, the system comprising:
    a compressor;
    a hot side heat exchanger;
    a hot thermal storage ("HTS") medium;
    a combustion heat exchanger;
    a turbine;
    a cold side heat exchanger;
    a cold thermal storage ("CTS") medium;
    a cooling heat exchanger;
    a working fluid;
    a first fluid path configured to circulate the working fluid in the pumped thermal storage mode, wherein the first fluid path circulates the working fluid through, in sequence, the compressor, the hot side heat exchanger, the turbine, and the cold side heat exchanger, wherein the working fluid exchanges heat with the HTS medium in the hot side heat exchanger, and wherein the working fluid exchanges heat with the CTS medium in the cold side heat exchanger;
    a second fluid path configured to circulate the working fluid in the power generation mode, wherein the second fluid path circulates the working fluid through, in sequence, the compressor, the combustion heat exchanger, the turbine, and the cooling heat exchanger, wherein the working fluid exchanges heat with an external heat source in the combustion heat exchanger, and wherein the working fluid exchanges heat with an external heat sink in the cooling heat exchanger; and
    a third fluid path configured to circulate the working fluid in the hybrid mode, wherein the third fluid path circulates the working fluid through, in sequence, the compressor, both the hot side heat exchanger and the combustion heat exchanger, the turbine, and both the cold side heat exchanger and the cooling heat exchanger, wherein the working fluid exchanges heat with the HTS medium in the hot side heat exchanger, wherein the working fluid exchanges heat with an external heat source in the combustion heat exchanger, wherein the working fluid exchanges heat with the CTS medium in the cold side heat exchanger, and wherein the working fluid exchanges heat with an external heat sink in the cooling heat exchanger.

2. The system of claim 1, wherein the external heat source comprises a solar heater.

3. The system of claim 1, wherein the external heat source comprises a combustor.

4. The system of claim 1, wherein the external heat source comprises a flue gas from a combustor.

5. The system of claim 1, wherein the external heat source comprises a waste heat source.

6. The system of claim 1, wherein the external heat sink comprises a body of water.

7. The system of claim 1, wherein the external heat sink comprises an environmental heat sink.

8. The system of claim 1, wherein the third fluid path is further configured to circulate a first portion of the working fluid to the hot side heat exchanger and second portion of the working fluid to the combustion heat exchanger.

9. The system of claim 1, wherein the third fluid path is further configured to circulate a first portion of the working fluid to the cold side heat exchanger and second portion of the working fluid to the cooling heat exchanger.

10. The system of claim 1 further comprising a plurality of valves configured to switch circulation of the working fluid between the first fluid path configured to circulate the working fluid in the pumped thermal storage mode, the second fluid path configured to circulate the working fluid in the power generation mode, and the third fluid path configured to circulate the working fluid in the hybrid mode.

11. A system comprising:
    a compressor;
    a hot side heat exchanger;
    a hot thermal storage ("HTS") medium;
    a combustion heat exchanger;
    a turbine;
    a cold side heat exchanger;
    a cold thermal storage ("CTS") medium;

a cooling heat exchanger;

a working fluid; and a fluid path configured to circulate the working fluid through, in sequence, the compressor, both the hot side heat exchanger and the combustion heat exchanger, the turbine, and both the cold side heat exchanger and the cooling heat exchanger, wherein the working fluid exchanges heat with the HTS medium in the hot side heat exchanger, wherein the working fluid exchanges heat with an external heat source in the combustion heat exchanger, wherein the working fluid exchanges heat with the CTS medium in the cold side heat exchanger, and wherein the working fluid exchanges heat with an external heat sink in the cooling heat exchanger.

12. The system of claim 11, wherein the external heat source comprises a solar heater.

13. The system of claim 11, wherein the external heat source comprises a combustor.

14. The system of claim 11, wherein the external heat source comprises a flue gas from a combustor.

15. The system of claim 11, wherein the external heat source comprises a waste heat source.

16. The system of claim 11, wherein the external heat sink comprises a body of water.

17. The system of claim 11, wherein the external heat sink comprises an environmental heat sink.

18. The system of claim 11, wherein the fluid path is further configured to circulate a first portion of the working fluid to the hot side heat exchanger and second portion of the working fluid to the combustion heat exchanger.

19. The system of claim 11, wherein the fluid path is further configured to circulate a first portion of the working fluid to the cold side heat exchanger and second portion of the working fluid to the cooling heat exchanger.

* * * * *